United States Patent
Hyde et al.

(10) Patent No.: US 12,433,446 B2
(45) Date of Patent: Oct. 7, 2025

(54) TRANSVERSELY-LOADABLE ROTISSERIE SKEWER RACKS FOR GRILLS

(71) Applicant: Weber-Stephen Products LLC, Palatine, IL (US)

(72) Inventors: Christian Hyde, Schaumburg, IL (US); Daniel Ramirez, Des Plaines, IL (US); Robert Farmer, Naperville, IL (US); Romualdo Sonny Siazon, Woodstock, IL (US); Brian C. Donnelly, Naperville, IL (US); Cassandra A. S. McVey, Palatine, IL (US); Shannon Ella Cerny, Aurora, IL (US); Michelle Stohl, Glenview, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 752 days.

(21) Appl. No.: 17/834,718

(22) Filed: Jun. 7, 2022

(65) Prior Publication Data

US 2023/0043473 A1 Feb. 9, 2023

Related U.S. Application Data

(60) Provisional application No. 63/203,924, filed on Aug. 4, 2021.

(51) Int. Cl.
*A47J 37/04* (2006.01)
*A47J 37/07* (2006.01)

(52) U.S. Cl.
CPC ......... *A47J 37/041* (2013.01); *A47J 37/0786* (2013.01)

(58) Field of Classification Search
None
See application file for complete search history.

(56) References Cited

U.S. PATENT DOCUMENTS

| 2,762,293 A | 9/1956 | Boyajian |
| 2,882,812 A | 4/1959 | Greenwald |

(Continued)

FOREIGN PATENT DOCUMENTS

| EP | 1769710 | 9/2008 |
| EP | 2857757 | 3/2017 |

(Continued)

OTHER PUBLICATIONS

Australian Government, IP Australia, "Examination Report No. 1," issued in connection with Australian Patent Application No. 2022324999, dated Dec. 11, 2024, 3 pages.

(Continued)

*Primary Examiner* — Ibrahime A Abraham
*Assistant Examiner* — Franklin Jefferson Wang
(74) *Attorney, Agent, or Firm* — Avantech Law

(57) ABSTRACT

Example transversely-loadable rotisserie skewer racks are disclosed. An example rotisserie skewer rack includes a first support plate and a second support plate spaced apart from the first support plate. The example rotisserie skewer rack further includes a plurality of skewers extending between the first support plate and the second support plate. The example rotisserie skewer rack includes a first mounting bracket coupled to the first support plate, and a second mounting bracket coupled to the second support plate. The first mounting bracket and the second mounting bracket are respectively configured to be transversely loadable onto a rotisserie spit.

20 Claims, 38 Drawing Sheets

(56) References Cited

U.S. PATENT DOCUMENTS

| | | | |
|---|---|---|---|
| 3,104,605 | A | 9/1963 | McKinney |
| 3,126,814 | A | 3/1964 | Brown |
| 4,334,516 | A | 6/1982 | Dittmer et al. |
| 4,403,595 | A | 9/1983 | Maesk |
| 4,483,241 | A | 11/1984 | Vaughn |
| 4,688,477 | A | 8/1987 | Waltman |
| 5,001,971 | A | 3/1991 | Beller |
| 5,224,676 | A | 7/1993 | Johnston |
| 5,445,064 | A | 8/1995 | Lopata |
| 5,471,915 | A | 12/1995 | Lopata |
| 5,473,977 | A * | 12/1995 | Koether ............ A47J 37/042 29/401.1 |
| 5,715,744 | A | 2/1998 | Coutant |
| 6,047,633 | A | 4/2000 | Khaytman |
| 6,138,553 | A * | 10/2000 | Toebben ............ A47J 37/047 126/25 AA |
| 6,170,390 | B1 | 1/2001 | Backus et al. |
| 6,173,645 | B1 | 1/2001 | Backus et al. |
| 6,253,665 | B1 | 7/2001 | Backus et al. |
| 6,330,853 | B1 | 12/2001 | Yu |
| 6,347,577 | B1 | 2/2002 | Harneit |
| 6,354,195 | B1 | 3/2002 | Huang |
| 6,367,373 | B2 | 4/2002 | Bargman |
| 6,408,742 | B1 | 6/2002 | Backus et al. |
| 6,439,109 | B1 | 8/2002 | Rehill |
| 6,450,087 | B2 | 9/2002 | Backus et al. |
| 6,536,334 | B2 | 3/2003 | Backus et al. |
| 6,561,083 | B2 | 5/2003 | Hsu |
| 6,568,315 | B2 | 5/2003 | Backus et al. |
| 6,568,316 | B1 | 5/2003 | Backus et al. |
| 6,595,119 | B1 | 7/2003 | Cheung |
| 6,634,281 | B1 | 10/2003 | Conigliaro |
| 6,837,151 | B2 | 1/2005 | Chen |
| 6,965,095 | B1 | 11/2005 | Popeil et al. |
| 7,036,426 | B2 | 5/2006 | Cheung |
| 7,138,609 | B2 | 11/2006 | Popeil et al. |
| 7,475,629 | B2 | 1/2009 | Turatti |
| 7,487,716 | B2 | 2/2009 | Swank et al. |
| 7,500,428 | B2 | 3/2009 | Backus et al. |
| 7,514,651 | B2 | 4/2009 | Popeil et al. |
| 7,823,502 | B2 | 11/2010 | Hecker et al. |
| 8,017,167 | B2 | 9/2011 | Backus et al. |
| D650,228 | S | 12/2011 | Gardner |
| 8,122,817 | B2 | 2/2012 | Nimerovskiy |
| 8,850,966 | B2 | 10/2014 | Dondurur et al. |
| 9,022,047 | B2 | 5/2015 | Cantrell et al. |
| D740,069 | S | 10/2015 | Nichols et al. |
| D749,358 | S | 2/2016 | Dyp et al. |
| D749,900 | S | 2/2016 | Hyp |
| 9,603,485 | B2 | 3/2017 | Hopkins et al. |
| 9,603,486 | B2 | 3/2017 | James |
| 9,610,803 | B2 | 4/2017 | Schlanger |
| 9,820,608 | B2 | 11/2017 | Kessell |
| 9,993,109 | B2 | 6/2018 | Brown |
| 10,045,661 | B2 | 8/2018 | Mollet |
| 10,136,760 | B2 | 11/2018 | Markussen et al. |
| 10,638,877 | B2 | 5/2020 | Kessell |
| 10,800,206 | B2 | 10/2020 | Chang |
| 2001/0037584 | A1 * | 11/2001 | Behm ............ A23N 12/10 34/218 |
| 2003/0047552 | A1 * | 3/2003 | Hsu ............ A47J 37/0664 219/400 |
| 2003/0101877 | A1 | 6/2003 | Backus et al. |
| 2009/0277339 | A1 | 11/2009 | Andrade |
| 2014/0216271 | A1 | 8/2014 | Arling et al. |
| 2017/0055768 | A1 | 3/2017 | Brown |
| 2018/0263414 | A1 | 9/2018 | Mansueto et al. |
| 2018/0317703 | A1 | 11/2018 | Khachatrian |
| 2019/0038074 | A1 | 2/2019 | Maraggi |
| 2019/0082883 | A1 * | 3/2019 | Jones ............ A47J 37/041 |
| 2019/0208958 | A1 | 7/2019 | Zhang |
| 2019/0239686 | A1 | 8/2019 | Mansueto et al. |
| 2020/0288910 | A1 | 9/2020 | Broadrick et al. |
| 2025/0009171 | A1 * | 1/2025 | Cleveland ............ A47J 37/041 |

FOREIGN PATENT DOCUMENTS

| | | |
|---|---|---|
| EP | 3476261 | 5/2019 |
| FR | 2809945 B3 | 4/2002 |
| FR | 2949655 | 8/2013 |
| KR | 20000009297 | 2/2000 |
| KR | 101874249 | 7/2018 |
| WO | 2014120239 A1 | 8/2014 |

OTHER PUBLICATIONS

International Searching Authority, "International Search Report and Written Opinion," issued in connection with International Patent Application No. PCT/US2022/033789, mailed Oct. 7, 2022, 9 pages.

International Searching Authority, "International Search Report and Written Opinion," issued in connection with International Patent Application No. PCT/US2022/033791, mailed Oct. 11, 2022, 9 pages.

International Searching Authority, "International Search Report and Written Opinion," issued in connection with International Patent Application No. PCT/US2022/033795, mailed Oct. 7, 2022, 9 pages.

European Patent Office, "Extended European Search Report," issued in connection with European Patent Application No. 22853667.8, dated Apr. 10, 2025, 7 pages.

Canadian Intellectual Property Office, "Office Action No. 1," issued in connection with Canadian Patent Application No. 3,223,482, dated Apr. 17, 2025, 5 pages.

Australian Government, IP Australia, "Examination Report No. 2," issued in connection with Australian Patent Application No. 2022324999, dated Apr. 2, 2025, 4 pages.

International Bureau, "International Preliminary Report on Patentability," issued in connection with International Patent Application No. PCT/US2022/033789, mailed Feb. 15, 2024, 6 pages.

Australian Government, IP Australia, "Examination Report No. 3," issued in connection with Australian Patent Application No. 2022324999, dated May 29, 2025, 5 pages.

Onlyfire BRK-6038 Stainless Steel Rotating Skewer System Fits for Any Rotisserie Grill Spit Rods, dated Dec. 25, 2019, available at URL: https://www.amazon.com.au/Onlyfire-BRK-6038-Stainless-Rotating-Rotisserie/dp/B07C2FWL9D.

Napoleon 64008 Rotisserie Shish-Kebab Skewer Set Grill Accessory, Stainless Steel, dated Apr. 22, 2020, available at URL: https://www.amazon.com.au/Napoleon-64008-Wheel-BBQ-Rotisserie-Accessory/dp/B084RGZBRG/ref=asc_df_B084RGZBRG?mcid=98be6fbbf0d833fdbe60cc01d089fb88&tag=googleshopdsk-22&linkCode=df0&hvadid=712289750584&hvpos=&hvnetw=g&hvrand=7543375316495060557&hvpone=&hvptwo=&hvqmt=&hvdev=c&hvdvcmdi=&hvlocint=&hvlocphy=9.

Australian Government, IP Australia, "Examination Report No. 4," issued in connection with Australian Patent Application No. 2022324999, dated Jul. 14, 2025, 3 pages.

* cited by examiner

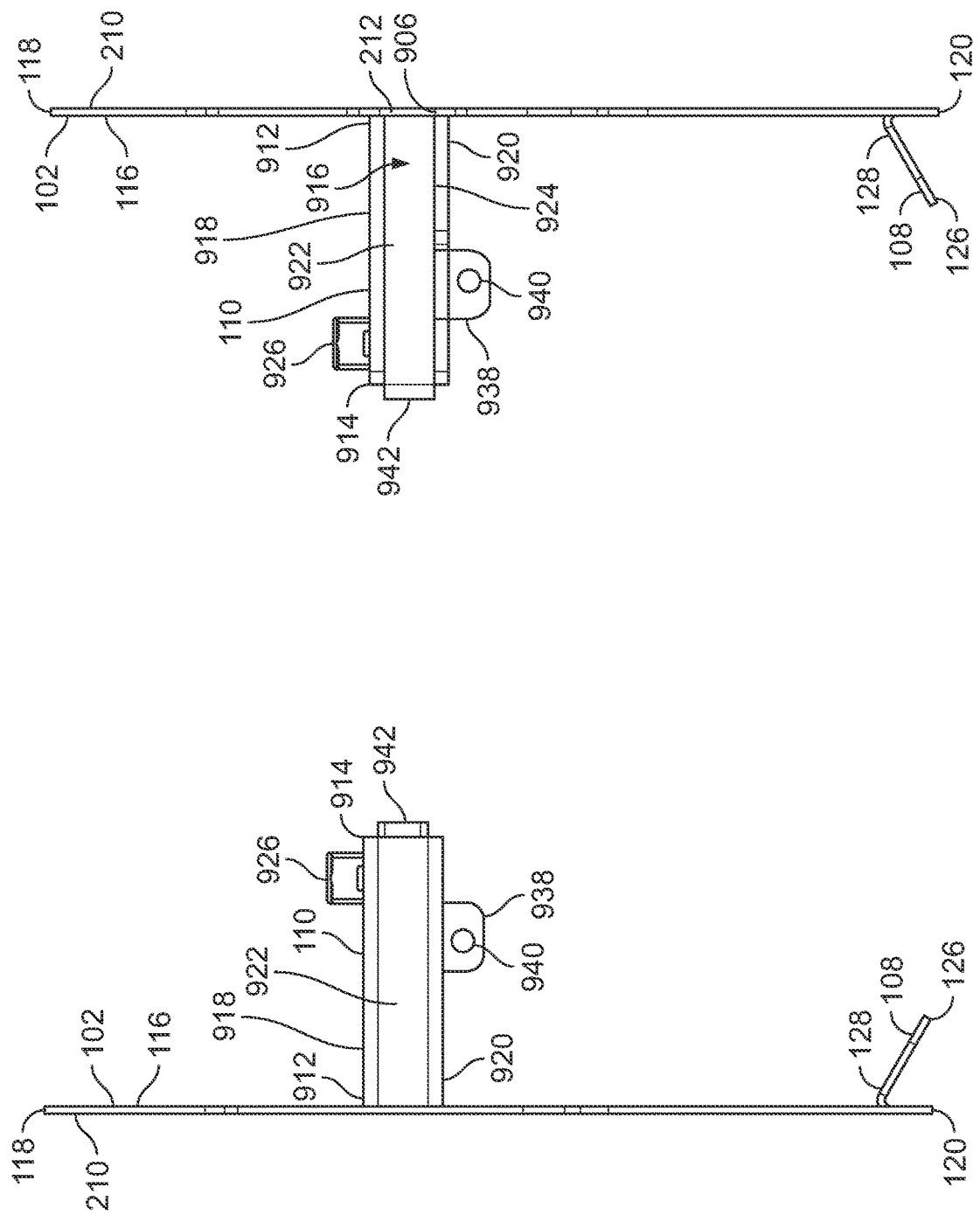

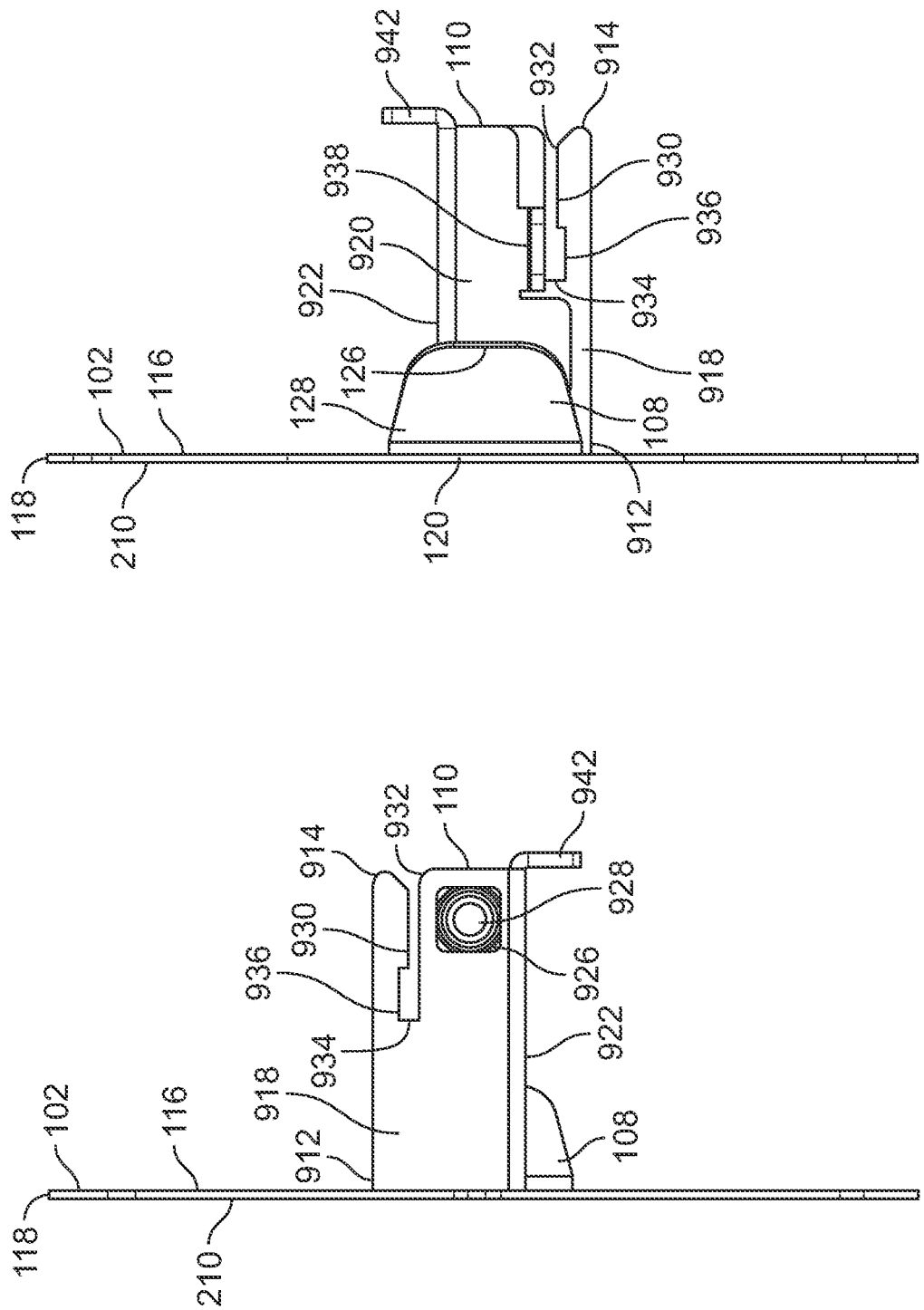

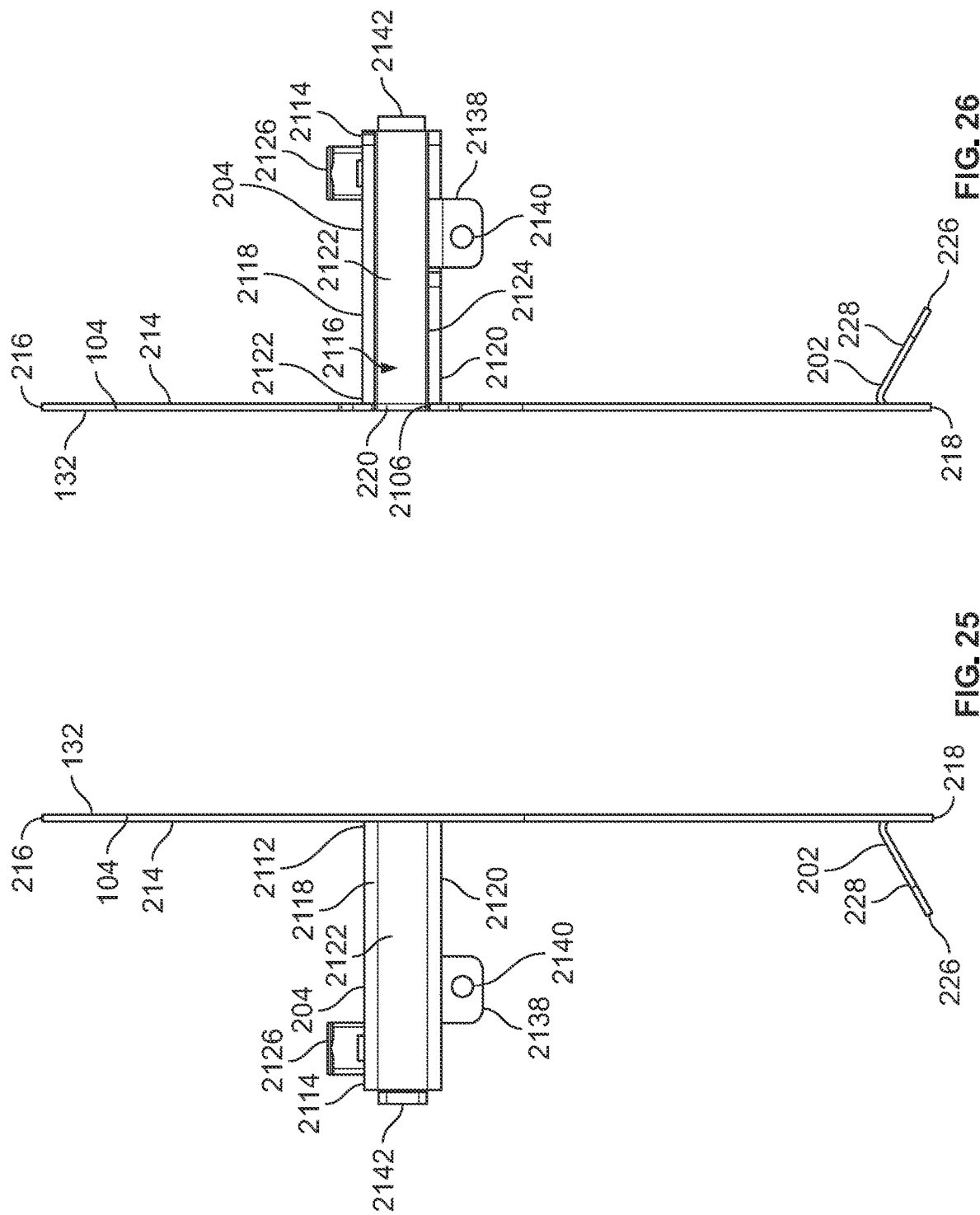

TRANSVERSELY-LOADABLE ROTISSERIE SKEWER RACKS FOR GRILLS

RELATED APPLICATIONS

This application claims priority to U.S. Provisional Patent Application No. 63/203,924, filed Aug. 4, 2021. The entirety of U.S. Provisional Patent Application No. 63/203,924 is hereby incorporated by reference herein.

FIELD OF THE DISCLOSURE

This disclosure relates generally to rotisserie skewer racks and, more specifically, to transversely-loadable rotisserie skewer racks for grills.

BACKGROUND

Rotisserie skewer racks are routinely used in connection with grills (e.g., gas grills, charcoal grills, electric grills, etc.) to facilitate rotisserie-style cooking of one or more food item(s) (e.g., kebabs) within the grill. Known rotisserie skewer racks typically include a plurality of skewers extending between two spaced-apart support plates. The support plates of such known rotisserie skewer racks commonly include a plurality of notches and/or through holes that are respectively configured to receive either a spiked tip portion or a neck portion of one of the skewers. Each skewer is configured to be loaded with one or more food item(s), with such food item(s) being conventionally loaded onto the skewer by being placed onto and/or pierced by the spiked tip portion of the skewer, and then slid toward the neck portion of the skewer.

The support plates of such known rotisserie skewer racks are commonly coupled together by a centrally-located shaft having a lateral (e.g., axial) passageway that extends through the shaft (e.g., along the longitudinal axis of the shaft) as well as the support plates. The lateral passageway is configured to receive and/or accommodate the cross-sectional area of a rotisserie spit. In this regard, known rotisserie skewer racks are configured to be attached to a rotisserie spit by (1) removing the rotisserie spit from its supported position on and/or within a cookbox of a grill, (2) loading the rotisserie skewer rack onto an end of the rotisserie spit such that the lateral passageway of the shaft of the rotisserie skewer rack is coaxially aligned with a longitudinal axis of the rotisserie spit, (3) sliding the rotisserie skewer rack along the longitudinal axis of the rotisserie spit until the rotisserie skewer rack reaches a desired position (e.g., typically a centralized position) on the rotisserie spit, and (4) replacing the rotisserie spit in its supported position on and/or within the cookbox of the grill. In some instances, the performance of steps (1) and (4) requires detaching and/or attaching one end of the rotisserie spit to a motor of a rotisserie cooking system of the grill, whereby the motor is configured to rotate the rotisserie spit (e.g., about the longitudinal axis of the rotisserie spit) within the cookbox of the grill. Detaching and/or removing such known rotisserie skewer racks from a rotisserie spit involves a reversal of the aforementioned four-step process.

BRIEF DESCRIPTION OF THE DRAWINGS

FIG. 13 is a front view of the first support plate of FIGS. 1-12.

FIG. 14 is a rear view of the first support plate of FIGS. 1-13.

FIG. 15 is a top view of the first support plate of FIGS. 1-14.

FIG. 16 is a bottom view of the first support plate of FIGS. 1-15.

FIG. 25 is a front view of the second support plate of FIGS. 1-8 and 21-24.

FIG. 26 is a rear view of the second support plate of FIGS. 1-8 and 21-25.

Figure 1:
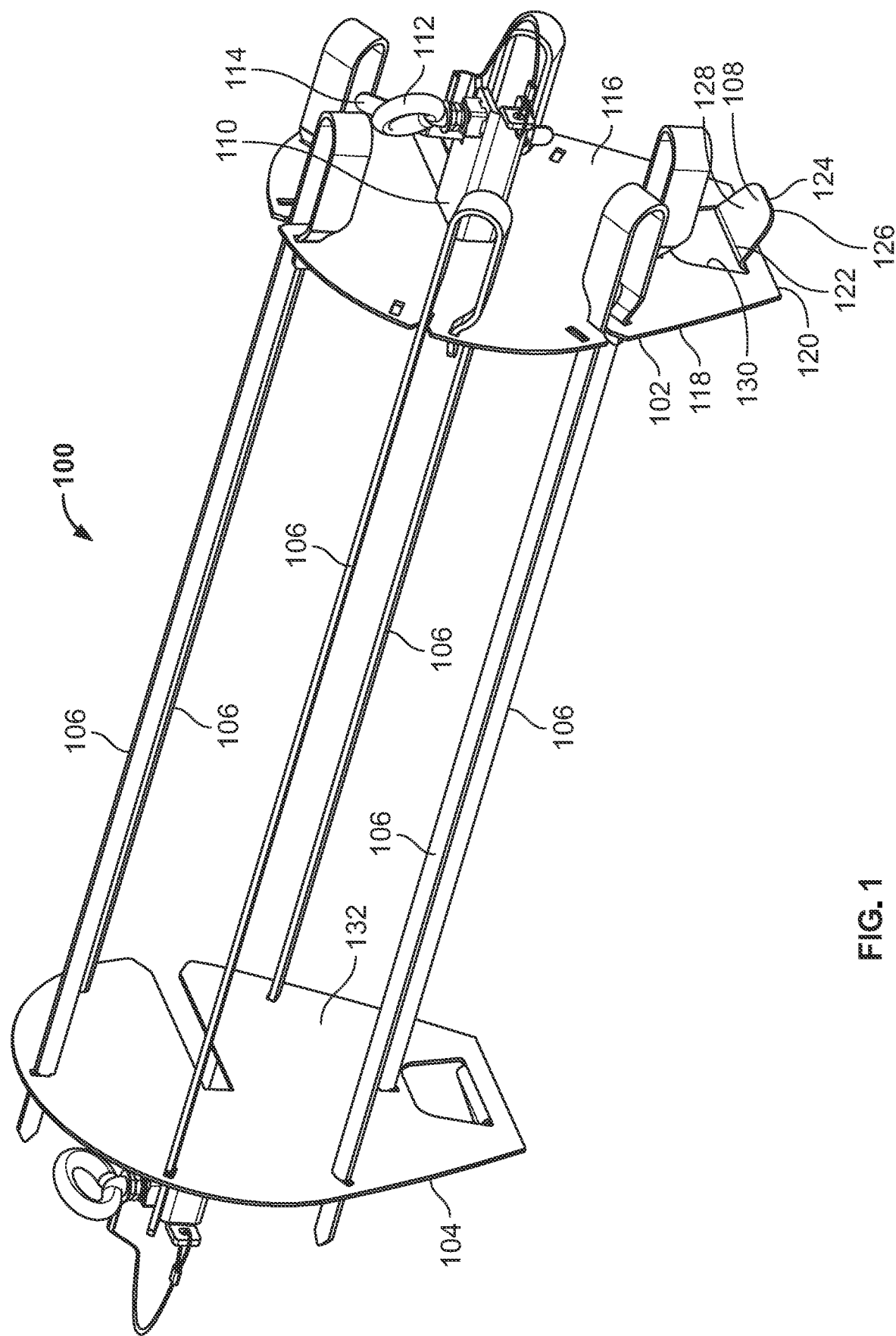
FIG. 1 is a first perspective view of an example rotisserie skewer rack constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known rotisserie skewer racks are configured to be attached to a rotisserie spit by (1) removing the rotisserie spit from its supported position on and/or within a cookbox of a grill, (2) loading the rotisserie skewer rack onto an end of the rotisserie spit such that the lateral passageway of the shaft of the rotisserie skewer rack is coaxially aligned with a longitudinal axis of the rotisserie spit, (3) sliding the rotisserie skewer rack along the longitudinal axis of the rotisserie spit until the rotisserie skewer rack reaches a desired position (e.g., typically a centralized position) on the rotisserie spit, and (4) replacing the rotisserie spit in its supported position on and/or within the cookbox of the grill. In some instances, the performance of steps (1) and (4) is further complicated by requiring that one end of the rotisserie spit be detached and/or attached to a motor of a rotisserie cooking system of the grill, whereby the motor is configured to rotate the rotisserie spit (e.g., about the longitudinal axis of the rotisserie spit) within the cookbox of the grill. Detaching and/or removing such known rotisserie skewer racks from a rotisserie spit involves a reversal of the aforementioned four-step process. Performing such a four-step process can often be difficult for an end user and, at a minimum, is undesirably time consuming.

Unlike known rotisserie skewer racks that are configured to be longitudinally loaded onto a rotisserie spit, example rotisserie skewer racks disclosed herein are advantageously configured to be transversely loaded onto a rotisserie spit. By comparison to the above-described four-step process associated with longitudinally loading known rotisserie skewer racks onto a rotisserie spit, example rotisserie skewer racks disclosed herein can advantageously be transversely loaded onto (and transversely unloaded from) a rotisserie spit without removing the rotisserie spit from its supported position on and/or within a cookbox of a grill, without having to thread the rotisserie skewer rack onto an end of the rotisserie spit, and without having to slide the rotisserie skewer rack along a longitudinal axis of the rotisserie spit to a desired position. These advantages attributed to the transversely-loadable nature of the example rotisserie skewer racks disclosed herein provide a user experience that is drastically improved relative to the user experience associated with known rotisserie skewer racks that are only capable of being longitudinally loaded onto a rotisserie spit.

The above-identified features as well as other advantageous features of example transversely-loadable rotisserie skewer racks as disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
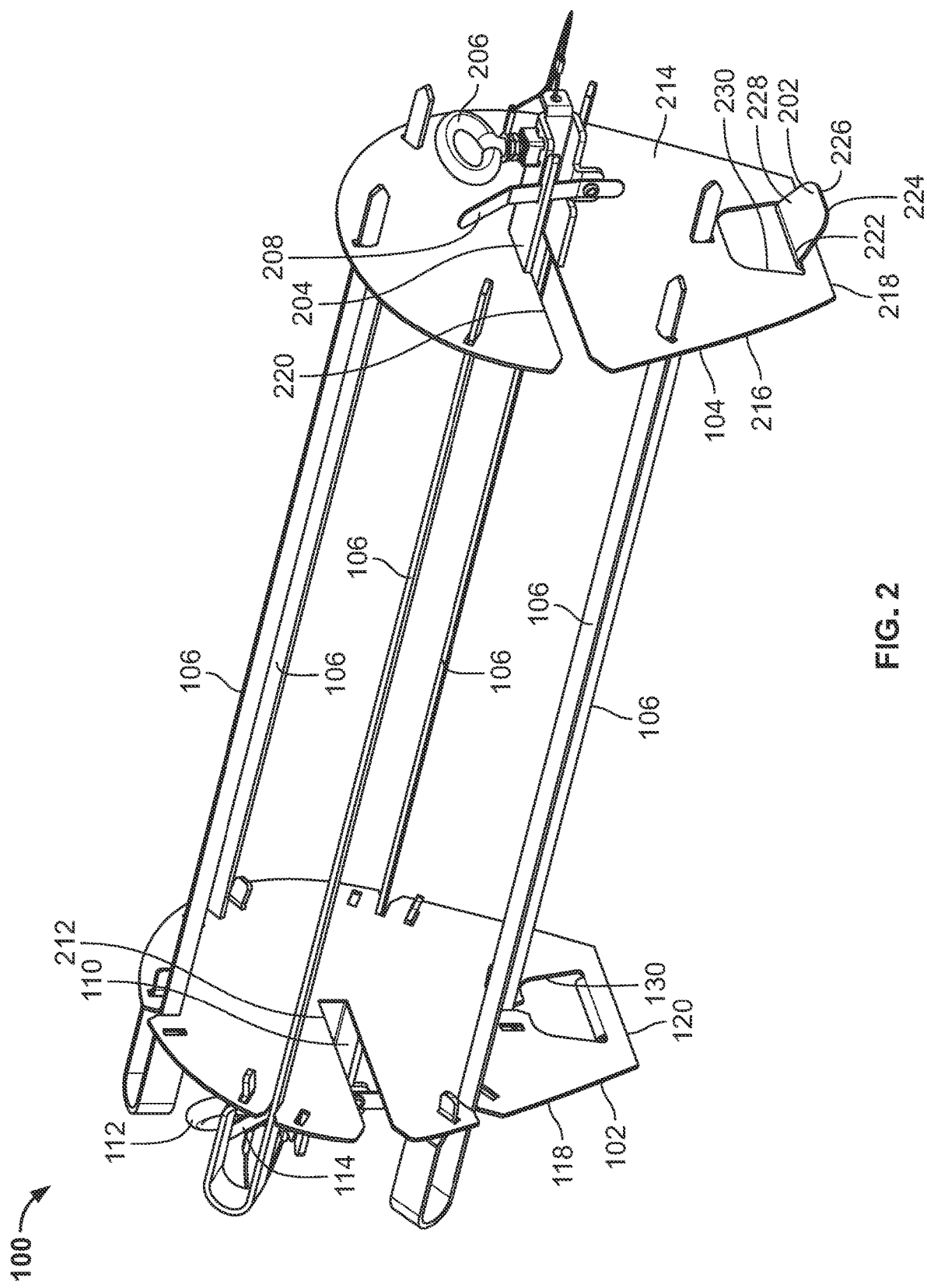
FIG. 2 is a second perspective view of the rotisserie skewer rack of FIG. 1.
Figure 3:
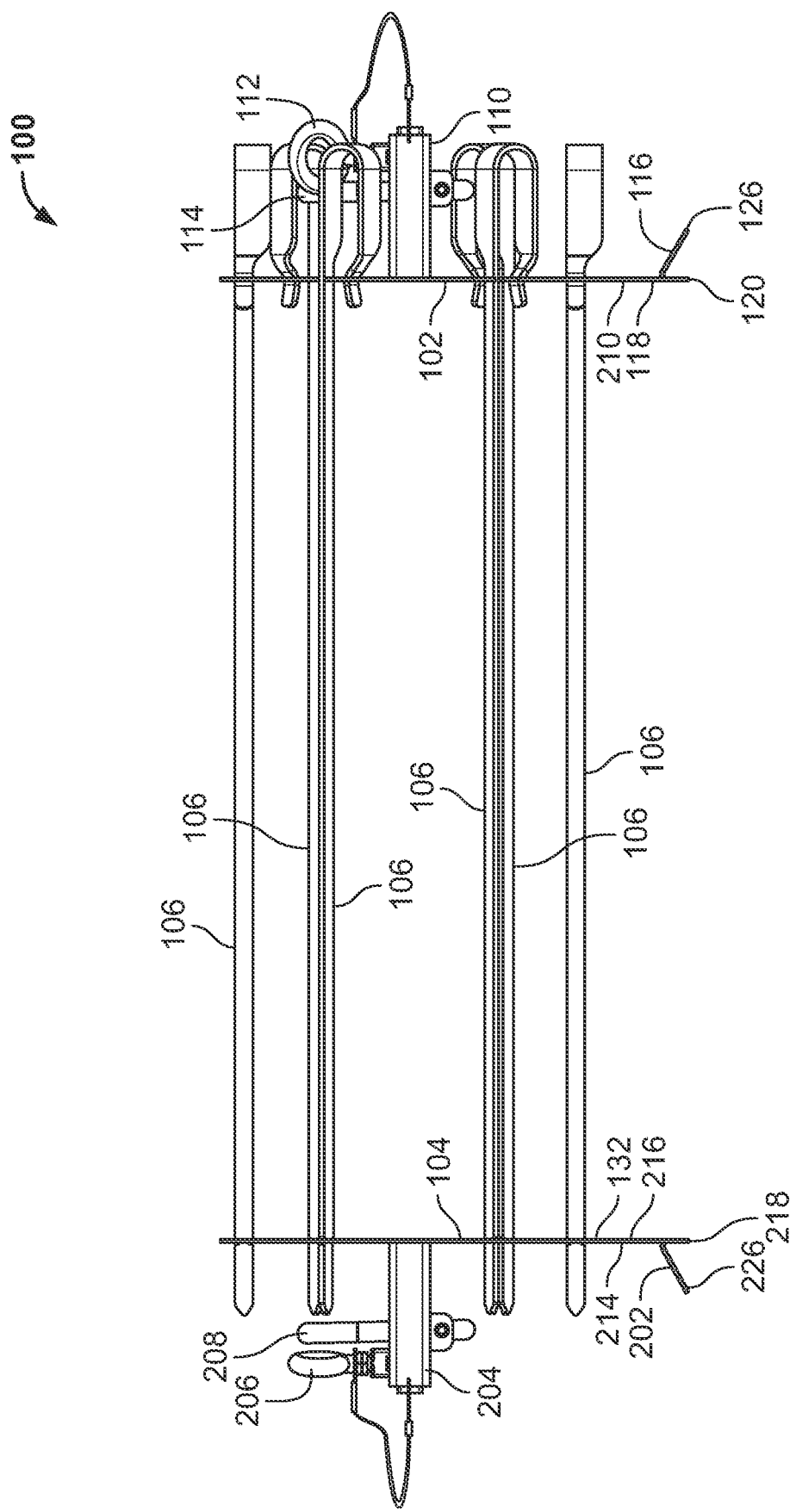
FIG. 3 is a front view of the rotisserie skewer rack of FIGS. 1 and 2.
Figure 4:
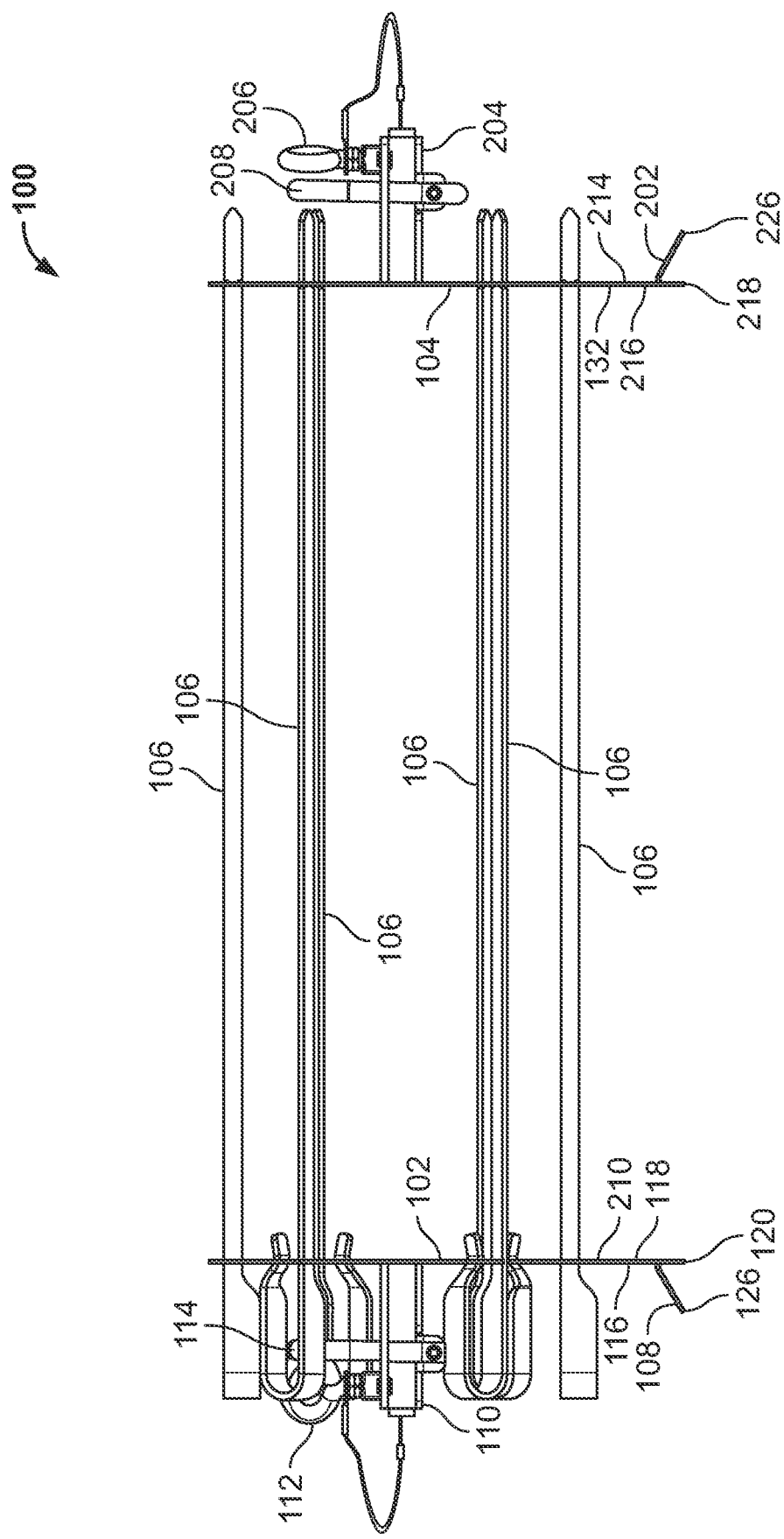
FIG. 4 is a rear view of the rotisserie skewer rack of FIGS. 1-3.

FIG. 1 is a first perspective view of an example rotisserie skewer rack 100 constructed in accordance with teachings of this disclosure. FIG. 2 is a second perspective view of the rotisserie skewer rack 100 of FIG. 1. FIG. 3 is a front view of the rotisserie skewer rack 100 of FIGS. 1 and 2. FIG. 4 is a rear view of the rotisserie skewer rack 100 of FIGS. 1-3.

Figure 5:
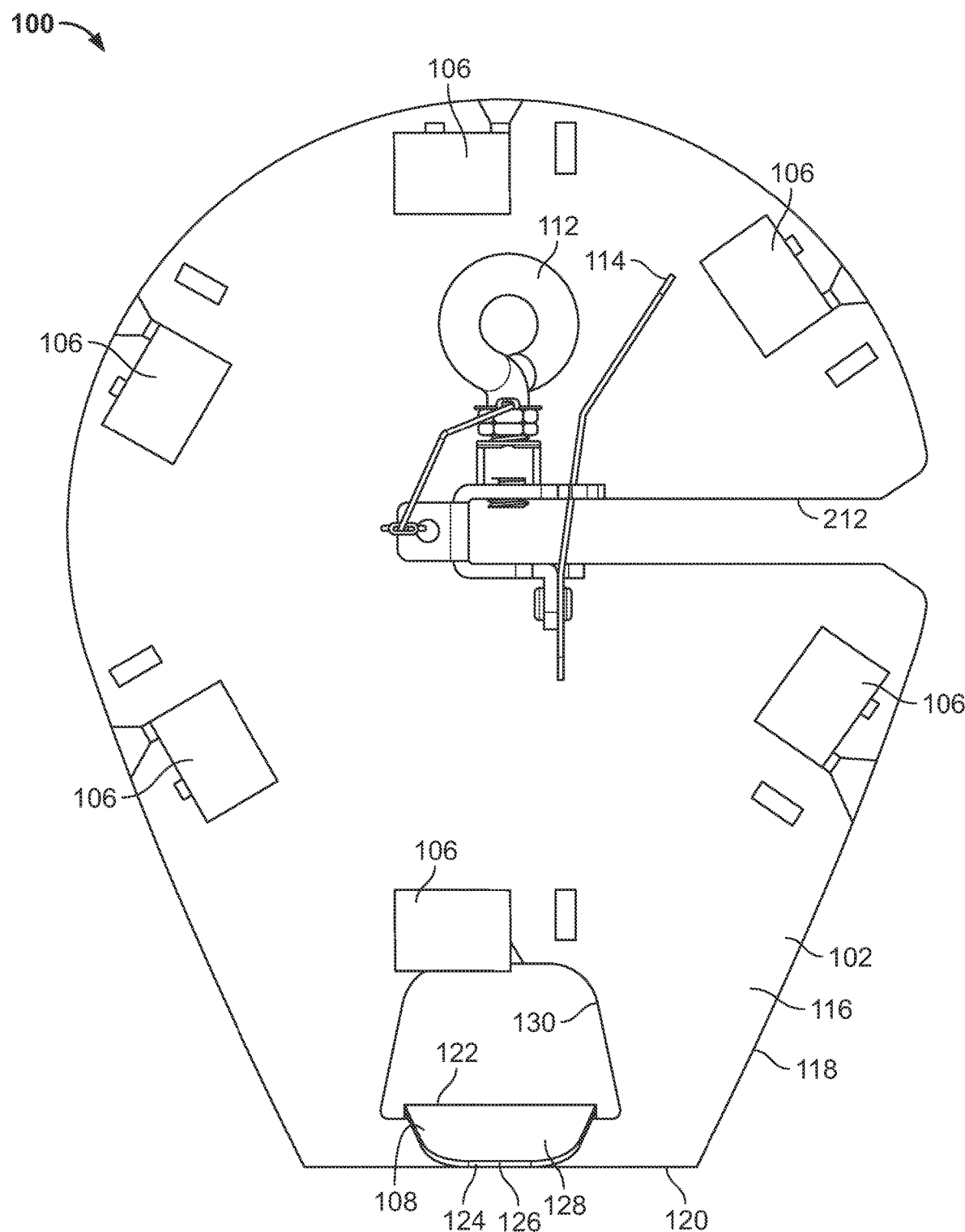
FIG. 5 is a right side view of the rotisserie skewer rack of FIGS. 1-4.
Figure 6:
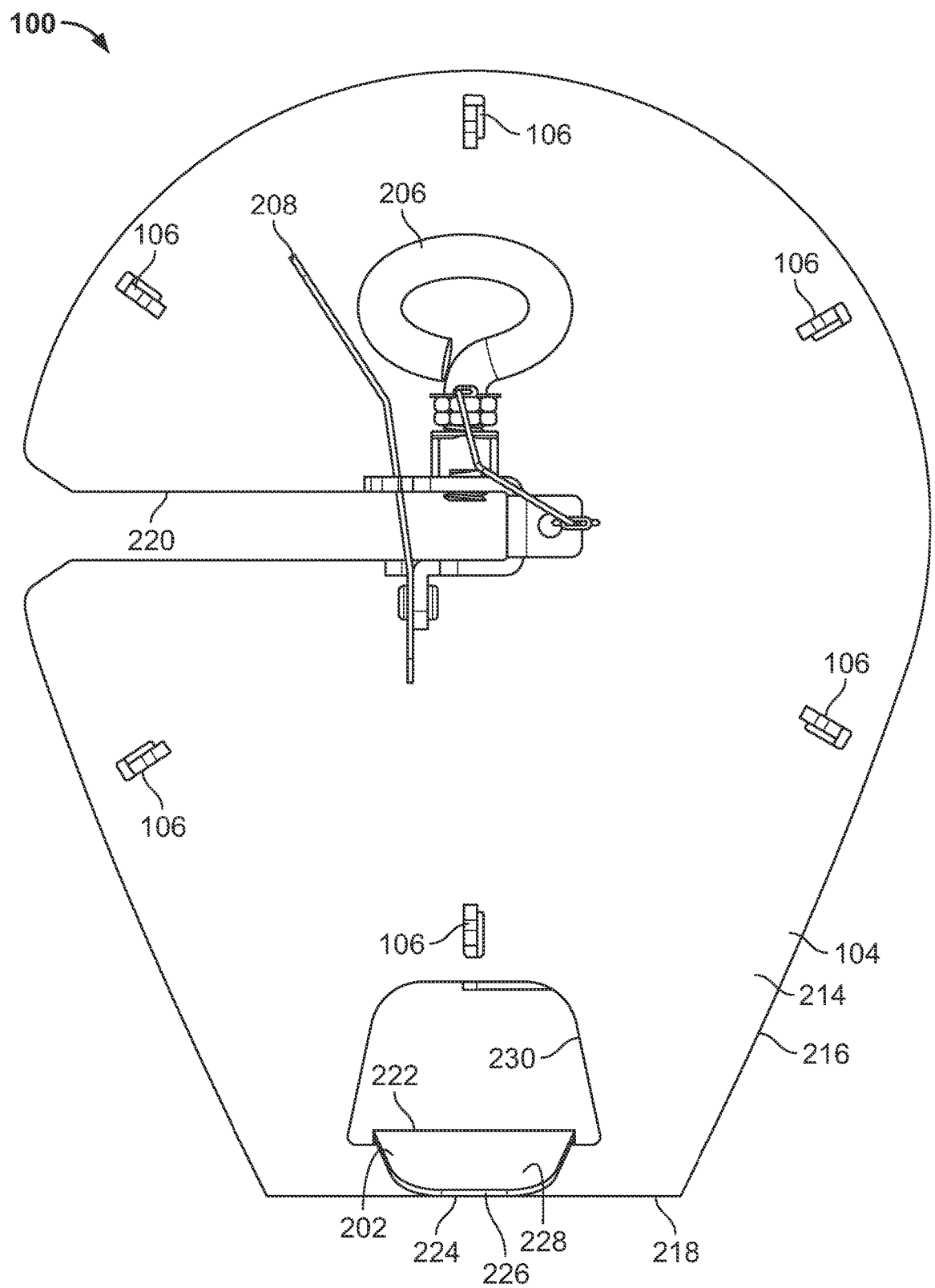
FIG. 6 is a left side view of the rotisserie skewer rack of FIGS. 1-5.
Figure 7:
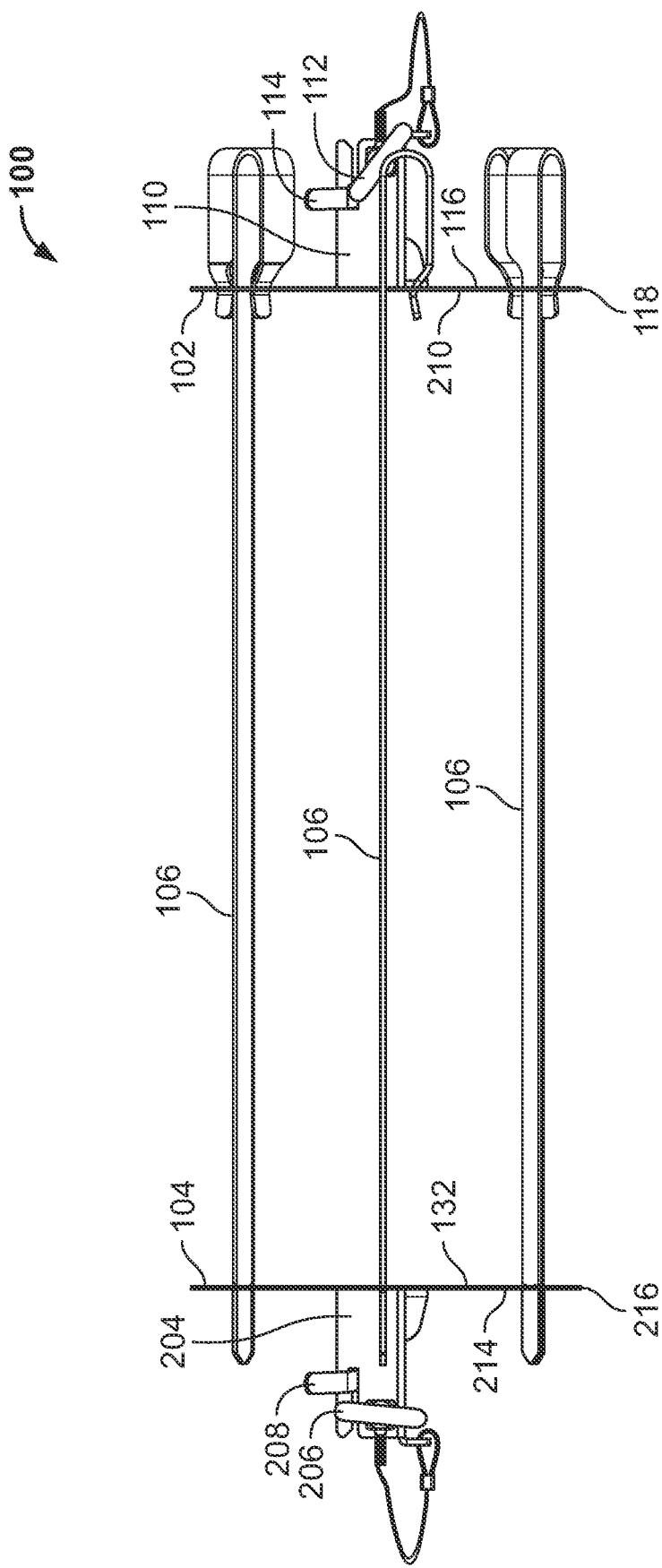
FIG. 7 is a top view of the rotisserie skewer rack of FIGS. 1-6.
Figure 8:
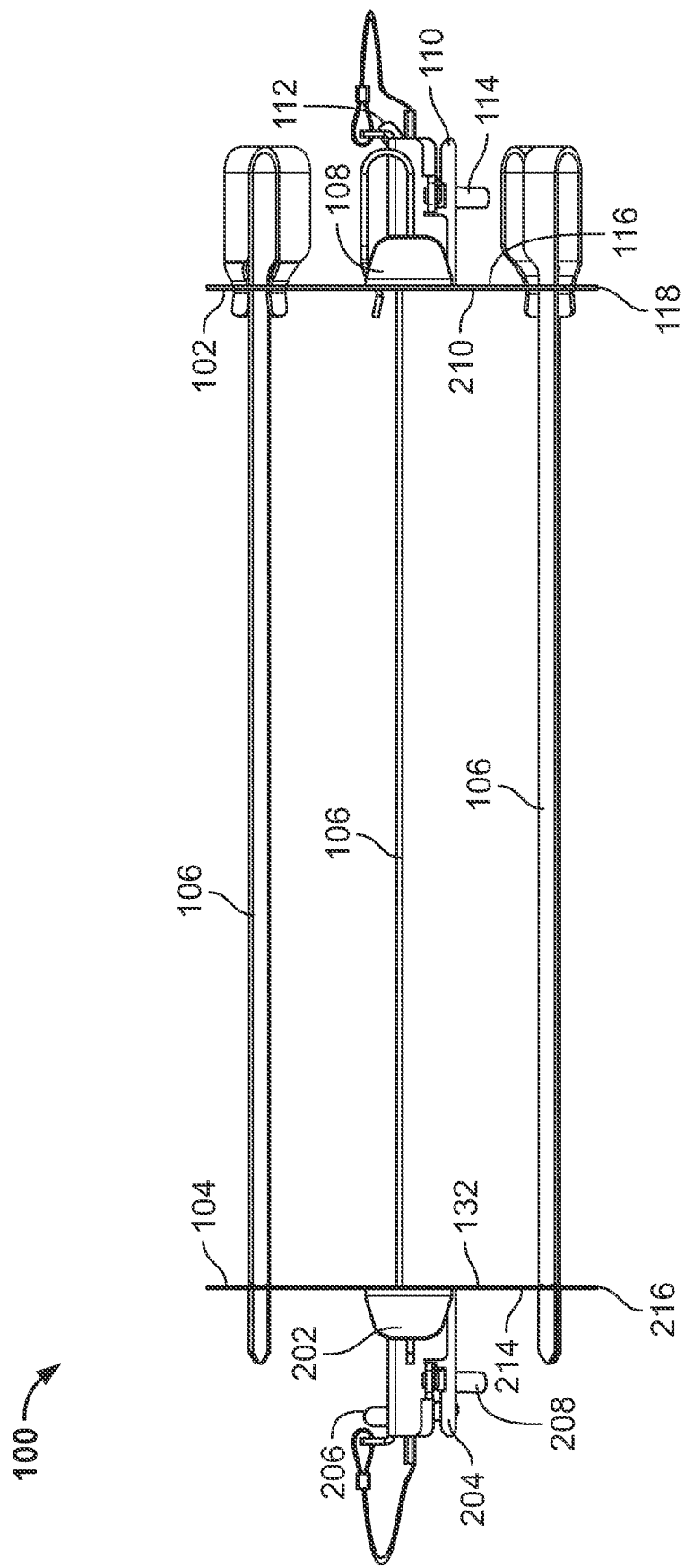
FIG. 8 is a bottom view of the rotisserie skewer rack of FIGS. 1-7.

FIG. 5 is a right side view of the rotisserie skewer rack 100 of FIGS. 1-4. FIG. 6 is a left side view of the rotisserie skewer rack 100 of FIGS. 1-5. FIG. 7 is a top view of the rotisserie skewer rack 100 of FIGS. 1-6. FIG. 8 is a bottom view of the rotisserie skewer rack 100 of FIGS. 1-7.

In the illustrated example of FIGS. 1-8, the rotisserie skewer rack 100 includes an example first support plate 102 (e.g., a right support plate), an example second support plate 104 (e.g., a left support plate), and a plurality of example skewers 106. The second support plate 104 is laterally (e.g., axially) spaced apart from the first support plate 102. Each one of the skewers 106 extends between the first support plate 102 and the second support plate 104 such that the skewers 106 individually and/or collectively couple the first support plate 102 to the second support plate 104. In the illustrated example of FIGS. 1-8, the rotisserie skewer rack 100 includes six skewers 106. In other examples, the rotisserie skewer rack 100 can include a different number (e.g., 1, 2, 3, 4, 8, etc.) of skewers 106.

In the illustrated example of FIGS. 1-8, the skewers 106 are the only structural members of the rotisserie skewer rack 100 that extend between the first support plate 102 and the second support plate 104. The first support plate 102 and the second support plate 104 of the rotisserie skewer rack 100 are accordingly separable from one another when the skewers 106 are removed from the rotisserie skewer rack 100. The separability of the first support plate 102 and the second support plate 104 advantageously enables the rotisserie skewer rack 100 to be broken down and/or disassembled into component structural parts (e.g., the first support plate 102, the second support plate 104, and the skewers 106) for cleaning. In this regard, the rotisserie skewer rack 100 is configured such that the first support plate 102, the second support plate 104, and the skewers 106, when disassembled from one another, can easily fit within a standard-sized residential dishwasher appliance.

In other examples, the rotisserie skewer rack 100 can additionally include one or more support rod(s) that extend between the first support plate 102 and the second support plate 104. In some such examples, the support rod(s) rigidly and/or irremovably couple the first support plate 102 to the second support plate 104 such that the second support plate 104 cannot readily be separated from the first support plate 102.

In addition to the first support plate 102, the second support plate 104, and the skewers 106 described above, the rotisserie skewer rack 100 of FIGS. 1-8 further includes an example first stabilization foot 108, an example first mounting bracket 110, an example first fastener 112, an example first clip 114, an example second stabilization foot 202, an example second mounting bracket 204, an example second fastener 206, and an example second clip 208. The first stabilization foot 108, the first mounting bracket 110, the first fastener 112, and the first clip 114 of the rotisserie skewer rack 100 are respectively associated with the first support plate 102 of the rotisserie skewer rack 100. The second stabilization foot 202, the second mounting bracket 204, the second fastener 206, and the second clip 208 of the rotisserie skewer rack 100 are respectively associated with the second support plate 104 of the rotisserie skewer rack 100. The first mounting bracket 110, the first fastener 112, and the first clip 114 are respectively configured to facilitate transverse loading of the first support plate 102 onto a rotisserie spit. Similarly, the second mounting bracket 204, the second fastener 206, and the second clip 208 are respectively configured to facilitate transverse loading of the second support plate 104 onto a rotisserie spit.

Figure 9:
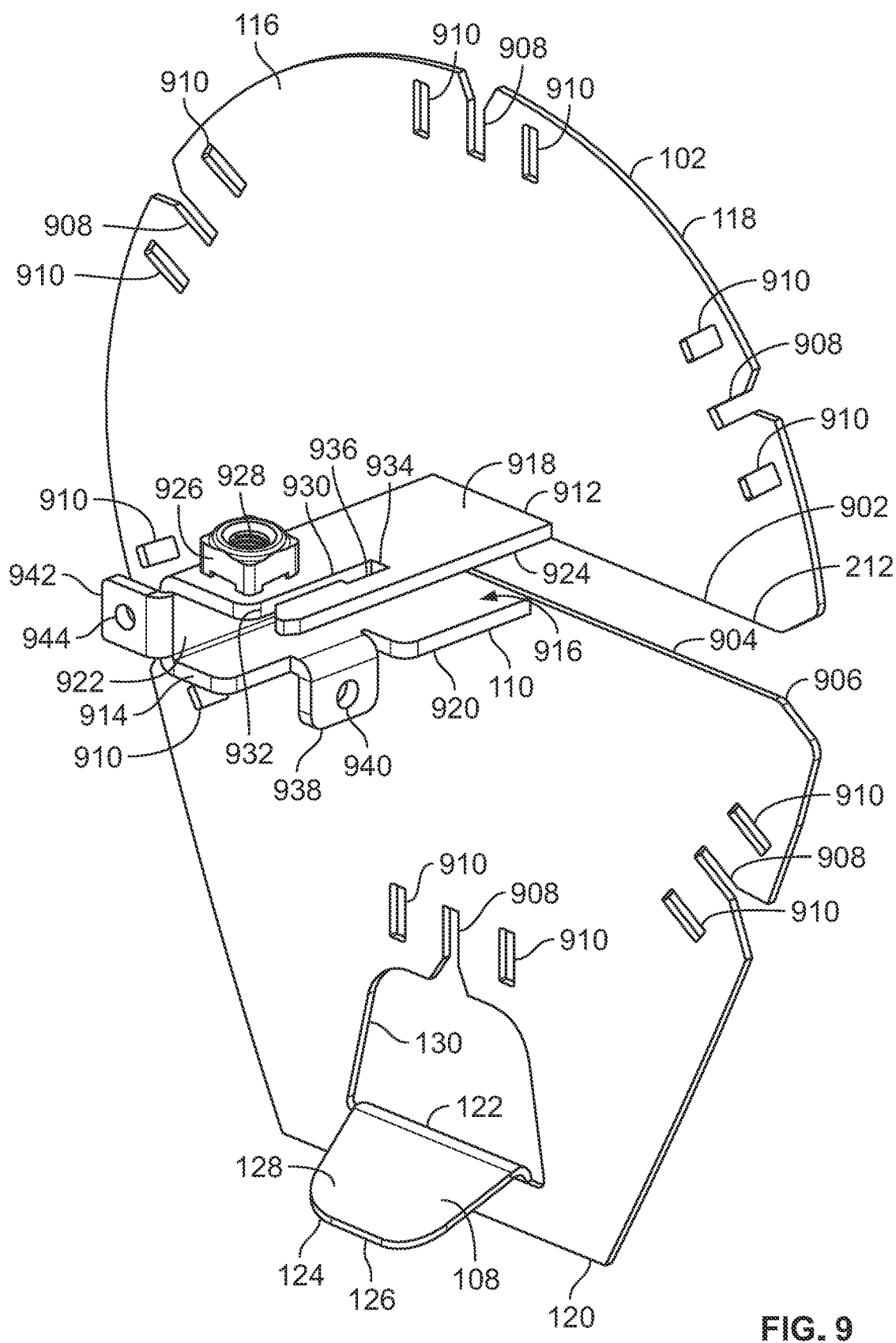
FIG. 9 is a first perspective view of the first support plate of FIGS. 1-8.
Figure 10:
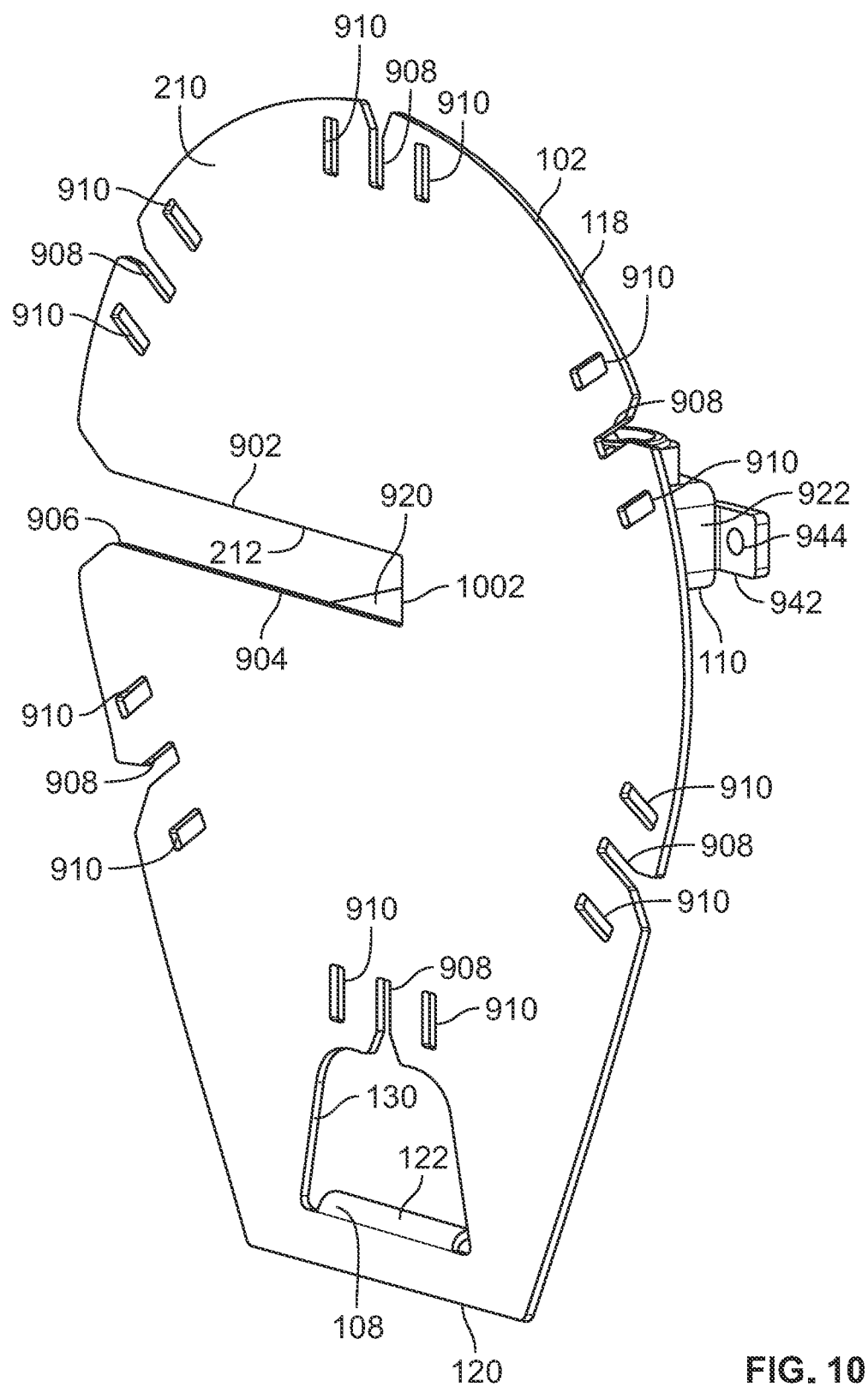
FIG. 10 is a second perspective view of the first support plate of FIGS. 1-9.
Figure 11:
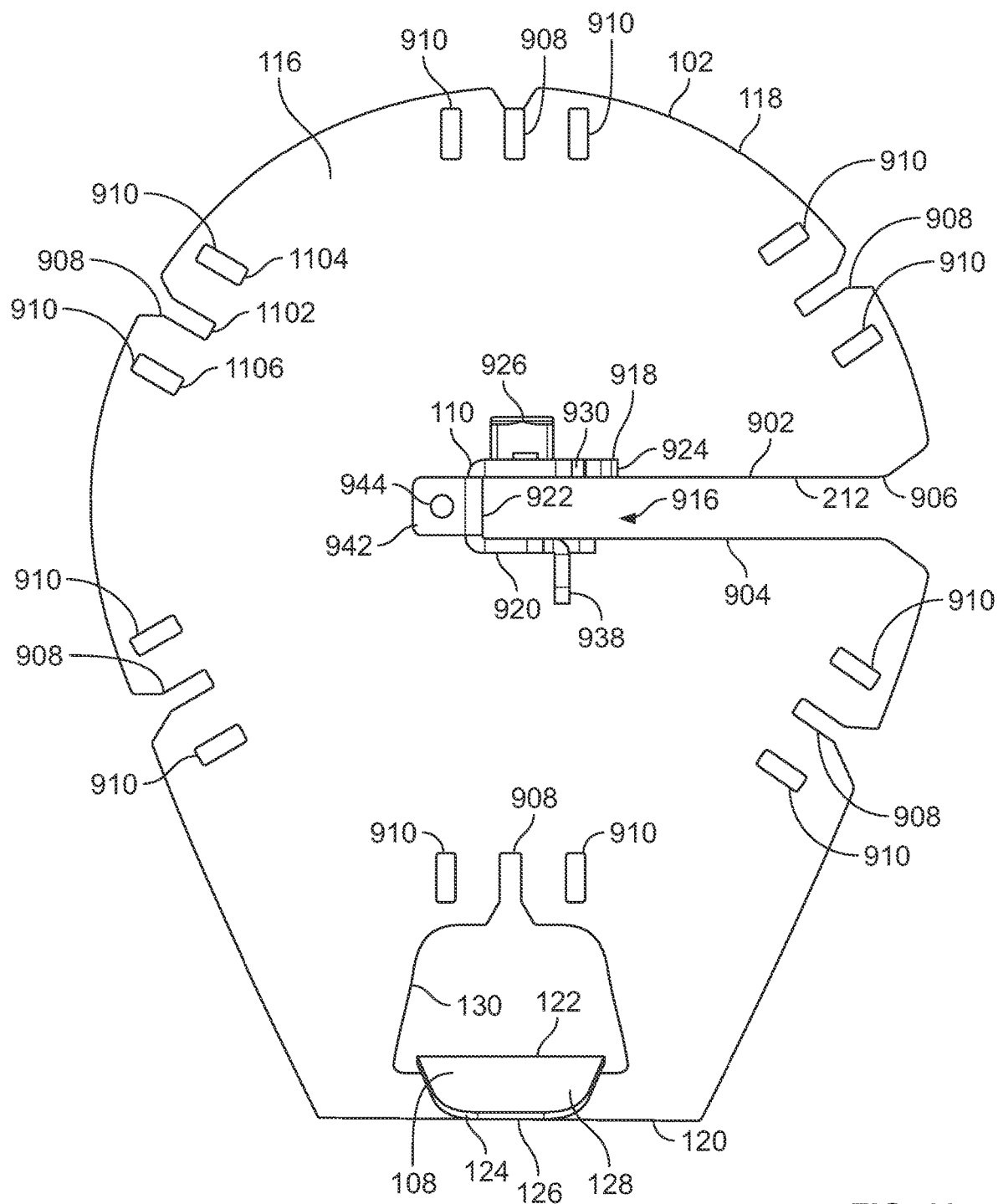
FIG. 11 is a right side view of the first support plate of FIGS. 1-10.
Figure 12:
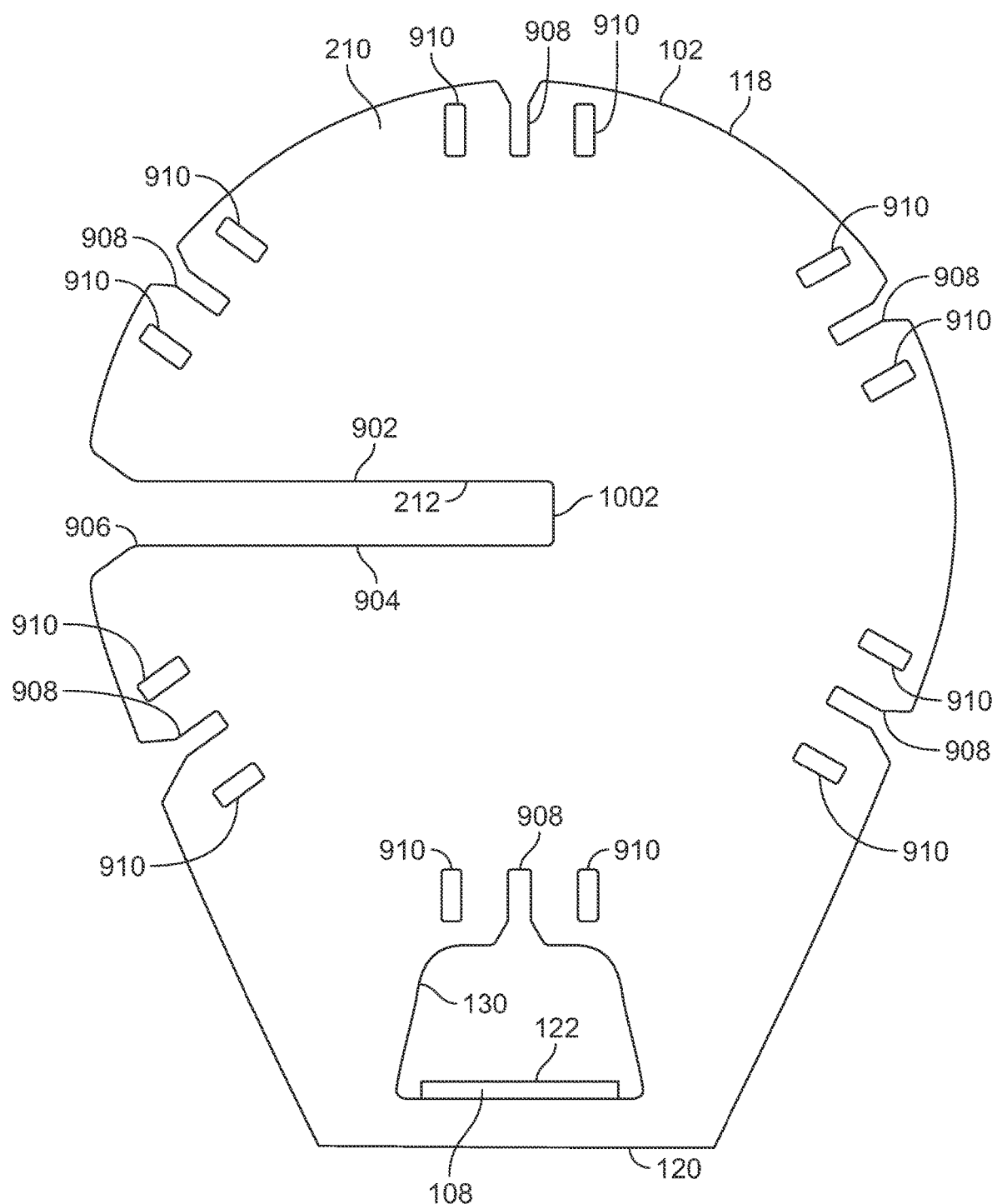
FIG. 12 is a left side view of the first support plate of FIGS. 1-11.

Additional views of the first support plate 102 (as well as the associated first stabilization foot 108 and the first mounting bracket 110) of the rotisserie skewer rack 100 of FIGS. 1-8 are shown in FIGS. 9-16. In this regard, FIG. 9 is a first perspective view of the first support plate 102 of FIGS. 1-8. FIG. 10 is a second perspective view of the first support plate 102 of FIGS. 1-9. FIG. 11 is a right side view of the first support plate 102 of FIGS. 1-10. FIG. 12 is a left side view of the first support plate 102 of FIGS. 1-11. FIG. 13 is a front view of the first support plate 102 of FIGS. 1-12. FIG. 14 is a rear view of the first support plate 102 of FIGS. 1-13. FIG. 15 is a top view of the first support plate 102 of FIGS. 1-14. FIG. 16 is a bottom view of the first support plate 102 of FIGS. 1-15. In the illustrated views of FIGS. 9-16, the first fastener 112 and the first clip 114 associated with the first support plate 102 have been omitted for clarity.

The first support plate 102 of FIGS. 1-16 includes an example first side 116 (e.g., a right side), an example second side 210 (e.g., a left side) located opposite the first side 116, and an example peripheral edge 118 located between the first side 116 and the second side 210. Ignoring the first stabilization foot 108 and the first mounting bracket 110 which, as further described below, respectively extend laterally away from (e.g., outwardly from) the first side 116 of the first support plate 102, the first side 116 and the second side 210 of the first support plate 102 of FIGS. 1-16 are otherwise formed by and/or as planar surfaces. The peripheral edge 118 of the first support plate 102 defines an outer profile of the first support plate 102. In the illustrated example of FIGS. 1-16, the outer profile of the first support plate 102 (e.g., as defined by the peripheral edge 118) includes an upper portion (e.g., generally located above the position of the first mounting bracket 110) having a generally hemispherical shape, and a lower portion (e.g., generally located below the position of the first mounting bracket 110) having a generally trapezoidal shape. In other examples, the outer profile of the first support plate 102 (e.g., as defined by the peripheral edge 118) may differ in shape relative to the shape shown in FIGS. 1-16.

The peripheral edge 118 of the first support plate 102 of FIGS. 1-16 includes an example flat portion 120 located along the bottom of the peripheral edge 118 and/or, more generally, along the bottom of the first support plate 102. The flat portion 120 of the peripheral edge 118 advantageously enables the first support plate 102 to be positioned on an underlying flat support surface (e.g., a countertop, a tabletop, etc.) in a stabilized manner without the first support plate 102 rolling (e.g., in a forward direction and/or a backward direction) relative to the underlying flat support surface. The resultant stability provided by the flat portion 120 of the peripheral edge 118 enhances the ease with which an end user of the rotisserie skewer rack 100 can attach and/or detach the skewers 106 of the rotisserie skewer rack 100 to the first support plate 102 of the rotisserie skewer rack 100. Such stability also prevents the first support plate 102 and/or, more generally, the rotisserie skewer rack 100 from unintentionally rolling and/or otherwise shifting position relative to an underlying flat support surface on which the first support plate 102 and/or, more generally, the rotisserie skewer rack 100 may be placed.

The first support plate 102 of FIGS. 1-16 further includes an example plate channel 212 that extends laterally (e.g., in a right-to-left direction) from the first side 116 of the first support plate 102 through to the second side 210 of the first support plate 102, thereby providing a lateral (e.g., axial) passageway through the first support plate 102. As best shown in FIGS. 9-16, the plate channel 212 of the first support plate 102 includes an example upper surface 902, an example lower surface 904 located opposite the upper surface 902, an example front surface 1002 extending between the upper surface 902 and the lower surface 904, and an example rear opening 906 located opposite the front surface 1002 and extending between the upper surface 902 and the lower surface 904. In the illustrated example of FIGS. 1-16, the upper surface 902, the lower surface 904, and the front surface 1002 of the plate channel 212 are respectively formed as planar (e.g., linear) surfaces. In other examples, one or more of the upper surface 902, the lower surface 904, and/or the front surface 1002 of the plate channel 212 can alternatively be formed as a curved (e.g., non-linear) surface. In the illustrated example of FIGS. 1-16, the plate channel 212 has a C-shaped profile. In the other examples, the plate channel 212 can alternatively have a profile that differs from the C-shaped profile shown in FIGS. 1-16.

The upper surface 902, the lower surface 904, the front surface 1002, and the rear opening 906 of the plate channel 212 are collectively configured to receive and/or accommodate a rotisserie spit. In this regard, the plate channel 212 of the first support plate 102 is configured as a rearwardly-facing and/or rearwardly-opening channel that extends radially inward from the peripheral edge 118 of the first support plate 102 toward and/or to a central portion of the first support plate 102, with the plate channel 212 being advantageously configured to receive a rotisserie spit via the rear opening 906 of the plate channel 212. The first support plate 102 can accordingly be loaded onto and/or unloaded from a rotisserie spit in a transverse direction (e.g., relative to a longitudinal axis of the rotisserie spit) via the rear opening 906 of the plate channel 212, as further described below.

The first support plate 102 of FIGS. 1-16 further includes a plurality of example notches 908 that respectively extend laterally (e.g., in a right-to-left direction) from the first side 116 of the first support plate 102 through to the second side 210 of the first support plate 102. In the illustrated example of FIGS. 1-16, the first support plate 102 includes a total of six notches 908, with respective ones of the notches 908 being circumferentially spaced apart from one another along the outer profile of the first support plate 102. In other examples, the first support plate 102 can include a different number (e.g., 1, 2, 3, 4, 8, etc.) of notches 908.

Each notch 908 of the first support plate 102 is configured to receive and/or accommodate a neck portion of one of the skewers 106 of the rotisserie skewer rack 100, as generally shown in FIGS. 1-8. As best shown in FIGS. 9-16, five out of the six illustrated notches 908 extend radially inward from the peripheral edge 118 of the first support plate 102 toward a central portion of the first support plate 102, while the sixth one of the illustrated notches 908 extends radially inward from a cutout opening associated with the first stabilization foot 108 toward a central portion of the first support plate 102.

The first support plate 102 of FIGS. 1-16 further includes a plurality of example slots 910 that respectively extend laterally (e.g., in a right-to-left direction) from the first side 116 of the first support plate 102 through to the second side 210 of the first support plate 102. In the illustrated example of FIGS. 1-16, the first support plate 102 includes a total of twelve slots 910, with respective ones of the slots 910 being circumferentially spaced apart from one another along the outer profile of the first support plate 102. In other examples, the first support plate 102 can include a different number (e.g., 2, 4, 6, 8, 16, etc.) of slots 910. In the illustrated example of FIGS. 1-16, the first support plate 102 is configured to have a number of slots 910 (e.g., twelve such slots 910) that is double the number of notches 908 (e.g., six such notches 908) of the first support plate 102. In other examples, the first support plate 102 can alternatively be configured to have a number of slots 910 that equals the number of notches 908 of the first support plate 102.

Each slot 910 of the first support plate 102 is configured to receive and/or accommodate a free end of a head portion of one of the skewers 106 of the rotisserie skewer rack 100, as generally shown in FIGS. 1-8. As shown in FIGS. 9-16, each notch 908 is positioned between a neighboring pair of the slots 910. Such an arrangement enables each skewer 106 of the rotisserie skewer rack 100 to advantageously be configurable for use in two separate orientations relative to a single one of the notches 908. In this regard, one of the skewers 106 can be attached and/or coupled to the first support plate 102 with a neck portion of the skewer 106 positioned in an example first one 1102 of the notches 908 and a free end of a head portion of the skewer 106 positioned in an example first one 1104 of the slots 910 located adjacent a first side of the first one 1102 of the notches 908. The same skewer 106 can alternatively be attached and/or coupled to the first support plate 102 with the neck portion of the skewer 106 positioned in the first one 1102 of the notches 908 and the free end of the head portion of the skewer 106 positioned in an example second one 1106 of the slots 910 located adjacent a second side of the first one 1102 of the notches 908.

The first stabilization foot 108 of the rotisserie skewer rack 100 extends laterally away from the first side 116 of the first support plate 102 of the rotisserie skewer rack 100. In the illustrated example of FIGS. 1-16, the first stabilization foot 108 extends away from the first side 116 of the first support plate 102 at a downward angle. The first stabilization foot 108 is accordingly oriented and/or positioned non-orthogonally relative to the first side 116 of the first support plate 102. In other examples, the first stabilization foot 108 can alternatively be oriented and/or positioned orthogonally relative to the first side 116 of the first support plate 102. In the illustrated example of FIGS. 1-16, the first stabilization foot 108 is integrally formed with (e.g., mechanically inseparable from) the first support plate 102. In other examples, the first stabilization foot 108 can alternatively be removably coupled to the first support plate 102 via one or more fastener(s).

The first stabilization foot 108 of FIGS. 1-16 includes an example first end 122 positioned adjacent (e.g., in contact with) the first side 116 of the first support plate 102, and an example second end 124 (e.g., a free end) located opposite the first end 122. The second end 124 of the first stabilization foot 108 includes an example flat portion 126 that is spaced apart from and laterally aligned with (e.g., located at the same vertical position as) the flat portion 120 of the peripheral edge 118 of the first support plate 102. The flat portion 126 of the second end 124 of the first stabilization foot 108 further enhances that above-described stability benefits provided by the flat portion 120 of the peripheral edge 118 of the first support plate 102. In this regard, The flat portion 126 of the second end 124 of the first stabilization foot 108 advantageously enables the first support plate 102 to be positioned on an underlying flat support surface (e.g., a countertop, a tabletop, etc.) in a stabilized manner without the first support plate 102 tipping (e.g., in a right direction and/or a left direction) and/or without the first support plate 102 rolling (e.g., in a forward direction and/or a backward direction) relative to the underlying flat support surface. The resultant stability provided by the flat portion 126 of the second end 124 of the first stabilization foot 108 accordingly enhances the ease with which an end user of the rotisserie skewer rack 100 can attach and/or detach the skewers 106 of the rotisserie skewer rack 100 to the first support plate 102 of the rotisserie skewer rack 100. The added stability provided by the first stabilization foot 108 also prevents the first support plate 102 and/or, more generally, the rotisserie skewer rack 100 from unintentionally tipping, rolling and/or otherwise shifting position relative to an underlying flat support surface on which the first support plate 102 and/or, more generally, the rotisserie skewer rack 100 may be placed.

In the illustrated example of FIGS. 1-16, the first stabilization foot 108 is advantageously fabricated by an example cutout 128 of the first support plate 102. During fabrication of the first support plate 102, the cutout 128 is formed by making one or more cut(s) that extend though the first side 116 and the second side 210 of the first support plate 102. The cutout 128 is thereafter folded outwardly and downwardly away from the first side 116 of the first support plate 102 to form the first stabilization foot 108 having the form shown in FIGS. 1-16. An example cutout opening 130 associated with the first stabilization foot 108 is formed in the first support plate 102 as a result of the cutout 128 being folded outwardly and downwardly away from the first side 116 of the first support plate 102 to form the first stabilization foot 108.

The first mounting bracket 110 of the rotisserie skewer rack 100 extends laterally away from the first side 116 of the first support plate 102 of the rotisserie skewer rack 100. In the illustrated example of FIGS. 1-16, the first mounting bracket 110 is oriented and/or positioned orthogonally relative to the first side 116 of the first support plate 102. In other examples, the first mounting bracket 110 can alternatively be oriented and/or positioned non-orthogonally relative to the first side 116 of the first support plate 102. In the illustrated example of FIGS. 1-16, the first mounting bracket 110 is integrally formed with (e.g., mechanically inseparable from) the first support plate 102. In other examples, the first mounting bracket 110 can alternatively be removably coupled to the first support plate 102 via one or more fastener(s).

The first mounting bracket 110 of FIGS. 1-16 includes an example first end 912 positioned adjacent (e.g., in contact with) the first side 116 of the first support plate 102, and an example second end 914 (e.g., a free end) located opposite the first end 912. The first mounting bracket 110 defines an example mounting channel 916 that extends laterally (e.g., in a right-to-left direction) from the second end 914 of the first mounting bracket 110 through to the first end 912 of the first mounting bracket 110, thereby providing a lateral (e.g., axial) passageway through the first mounting bracket 110. As shown in FIGS. 9-16, the mounting channel 916 of the first mounting bracket 110 includes an example upper wall 918, an example lower wall 920 located opposite the upper wall 918, an example front wall 922 extending between the upper wall 918 and the lower wall 920, and an example rear opening 924 located opposite the front wall 922 and extending between the upper wall 918 and the lower wall 920.

In the illustrated example of FIGS. 1-16, the upper wall 918, the lower wall 920, the front wall 922, and the rear opening 924 of the mounting channel 916 respectively extend from the first end 912 of the first mounting bracket 110 to the second end 914 of the first mounting bracket 110. In other examples, the upper wall 918, the lower wall 920, and/or the front wall 922 can alternatively extend only partially between the first end 912 of the first mounting bracket 110 and the second end 914 of the first mounting bracket 110. In the illustrated example of FIGS. 1-16, the upper wall 918, the lower wall 920, and the front wall 922 of the mounting channel 916 are respectively formed as planar (e.g., linear) walls. In other examples, one or more of the upper wall 918, the lower wall 920, and/or the front wall 922 of the mounting channel 916 can alternatively be formed as a curved (e.g., non-linear) wall. In the illustrated example of FIGS. 1-16, the mounting channel 916 has a C-shaped profile. In the other examples, the mounting channel 916 can alternatively have a profile that differs from the C-shaped profile shown in FIGS. 1-16.

The upper wall 918, the lower wall 920, the front wall 922, and the rear opening 924 of the mounting channel 916 are collectively configured to receive and/or accommodate a rotisserie spit. In this regard, the mounting channel 916 of the first mounting bracket 110 is configured as a rearwardly-facing and/or rearwardly-opening channel that is laterally (e.g., axially) aligned with the plate channel 212 of the first support plate 102, with the mounting channel 916 being advantageously configured to receive a rotisserie spit via the rear opening 924 of the mounting channel 916 (e.g., in conjunction with the plate channel 212 receiving the rotisserie spit via the rear opening 906 of the plate channel 212). The first mounting bracket 110 can accordingly be loaded onto and/or unloaded from a rotisserie spit in a transverse direction (e.g., relative to a longitudinal axis of the rotisserie spit) via the rear opening 924 of the mounting channel 916, as further described below.

The first mounting bracket 110 of FIGS. 1-16 further includes an example nut 926 fixedly coupled (e.g., welded) to a topside of the upper wall 918 of the first mounting bracket 110. In the illustrated example of FIGS. 1-16, the nut 926 of the first mounting bracket 110 includes an example threaded opening 928 that is vertically aligned with (e.g., coaxially positioned relative to) an opening (e.g., a through hole) formed in and extending through the upper wall 918 of the first mounting bracket 110. The nut 926 is configured to threadedly receive and/or accommodate a threaded portion of a shaft of the first fastener 112 associated with the first mounting bracket 110, as further described below.

The first mounting bracket 110 of FIGS. 1-16 further includes an example slot 930 formed in and extending through the upper wall 918 of the first mounting bracket 110. In the illustrated example of FIGS. 1-16, the slot 930 includes an example first end 932 (e.g., an open end) and an example second end 934 (e.g., a closed end) located opposite the first end 932. The first end 932 of the slot 930 is configured to receive an engagement portion of the first clip 114 associated with the first mounting bracket 110, as further described below. In this regard, the first clip 114 is slidable and/or rotatable into and out of the first end 932 of the slot 930, and is further slidable and/or rotatable within the slot 930 between the first end 932 and the second end 934 of the slot 930. In the illustrated example of FIGS. 1-16, the second end 934 of the slot 930 includes an example expansion notch 936 that is configured to receive the engagement portion of the first clip 114 as the first clip 114 slides and/or rotates from the first end 932 to the second end 934 of the slot 930. The expansion notch 936 is further configured to function as a mechanical stop that restricts the engagement portion of the first clip 114 from inadvertently sliding and/or rotating from the second end 934 of the slot 930 back to the first end 932 of the slot 930 absent physical manipulation of the first clip 114 by a user. In other examples, the expansion notch 936 can instead be omitted from the slot 930.

The first mounting bracket 110 of FIGS. 1-16 further includes an example clip flange 938 that extends downwardly from the lower wall 920 of the first mounting bracket 110. In the illustrated example of FIGS. 1-16, the clip flange 938 is integrally formed with (e.g., mechanically inseparable from) the first mounting bracket 110. In other examples, the clip flange 938 can alternatively be removably coupled to the first mounting bracket 110 via one or more fastener(s). The clip flange 938 includes an example opening 940 that facilitates the attachment of the first clip 114 to the first mounting bracket 110 and/or, more generally, to the first support plate 102, as further described below.

The first mounting bracket 110 of FIGS. 1-16 further includes an example cable flange 942 that extends forwardly from the front wall 922 of the first mounting bracket 110. In the illustrated example of FIGS. 1-16, the cable flange 942 is integrally formed with (e.g., mechanically inseparable from) the first mounting bracket 110. In other examples, the cable flange 942 can alternatively be removably coupled to the first mounting bracket 110 via one or more fastener(s). The cable flange 942 includes an example opening 944 that facilitates the attachment of a first end of a metal cable to the cable flange 942. A second end of the metal cable located opposite the first end of the metal cable can be attached to a portion (e.g., a shaft or a looped portion) of the first fastener 112, as shown in FIGS. 1-8. Attachment of the first fastener 112 to the cable flange 942 via the metal cable advantageously tethers the first fastener 112 to the first mounting bracket 110 so as to prevent the first fastener 112 from becoming completely separated from the first mounting bracket 110 and/or, more generally, from the first support plate 102 when the first fastener 112 is not threadedly coupled to the nut 926 of the first mounting bracket 110.

Figure 17:
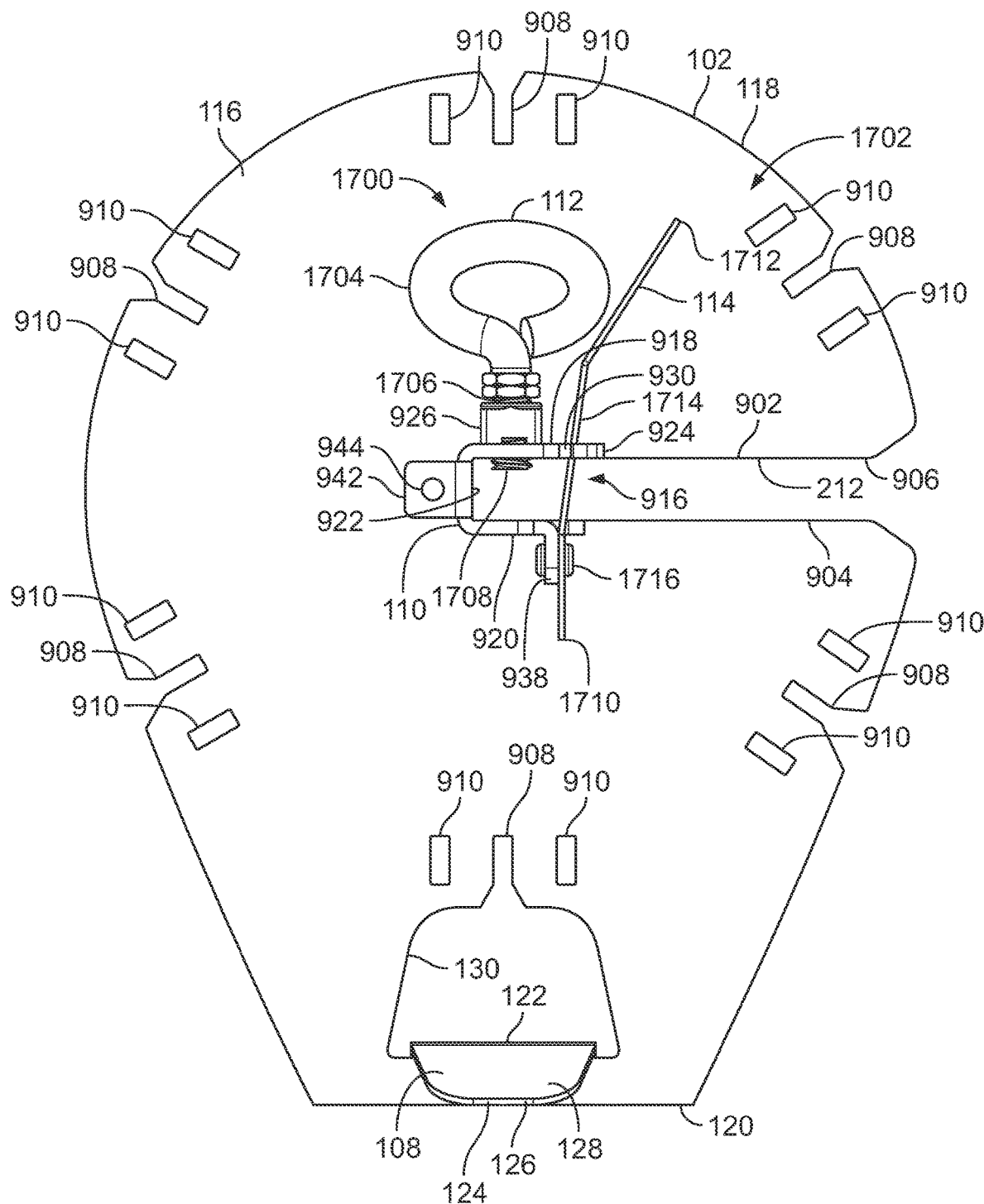
FIG. 17 is a right side view of the first support plate of FIGS. 1-16, with the first fastener of FIGS. 1-8 shown in an example locked position, and with the first clip of FIGS. 1-8 shown in an example closed position.
Figure 18:
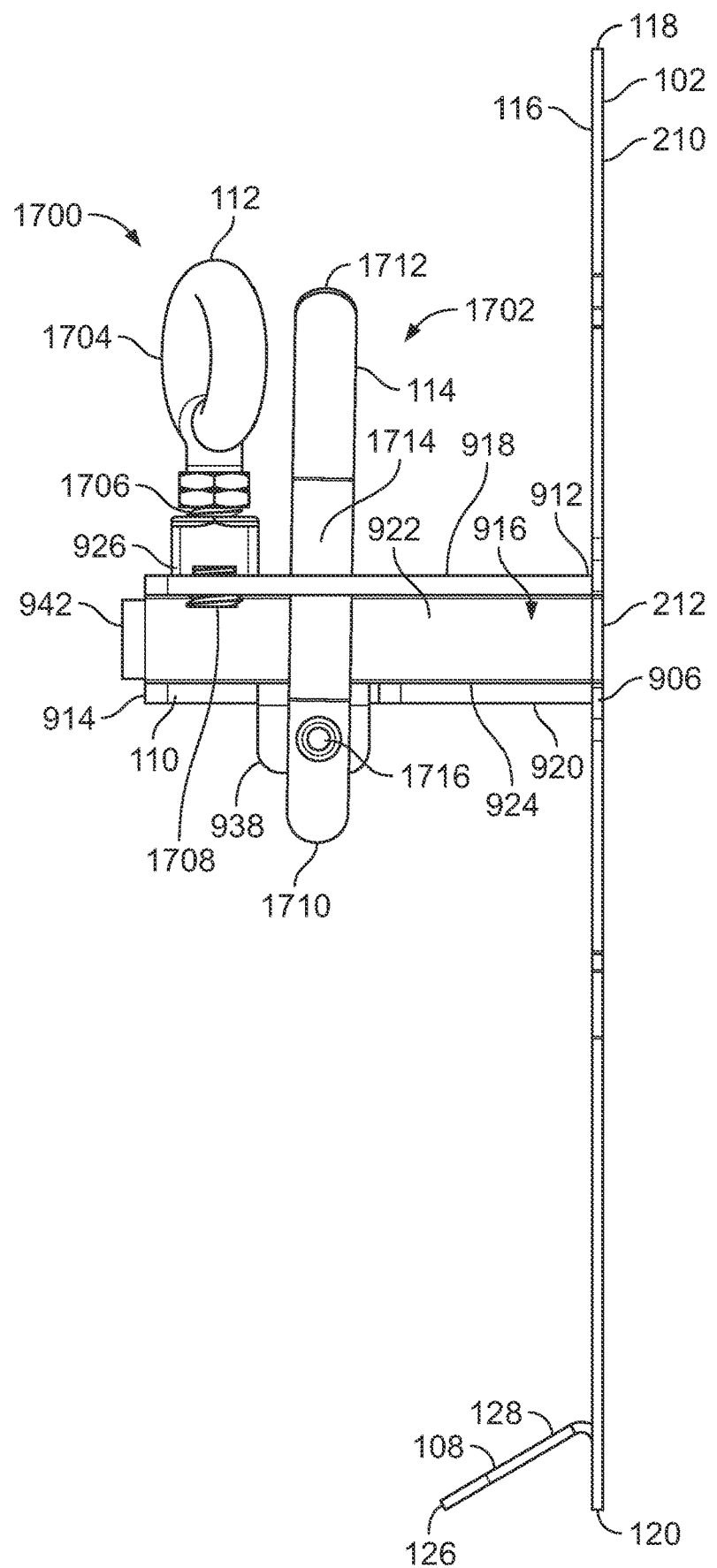
FIG. 18 is a rear view of the first support plate of FIGS. 1-17, with the first fastener of FIGS. 1-8 and 17 shown in the locked position of FIG. 17, and with the first clip of FIGS. 1-8 and 17 shown in the closed position of FIG. 17.
Figure 19:
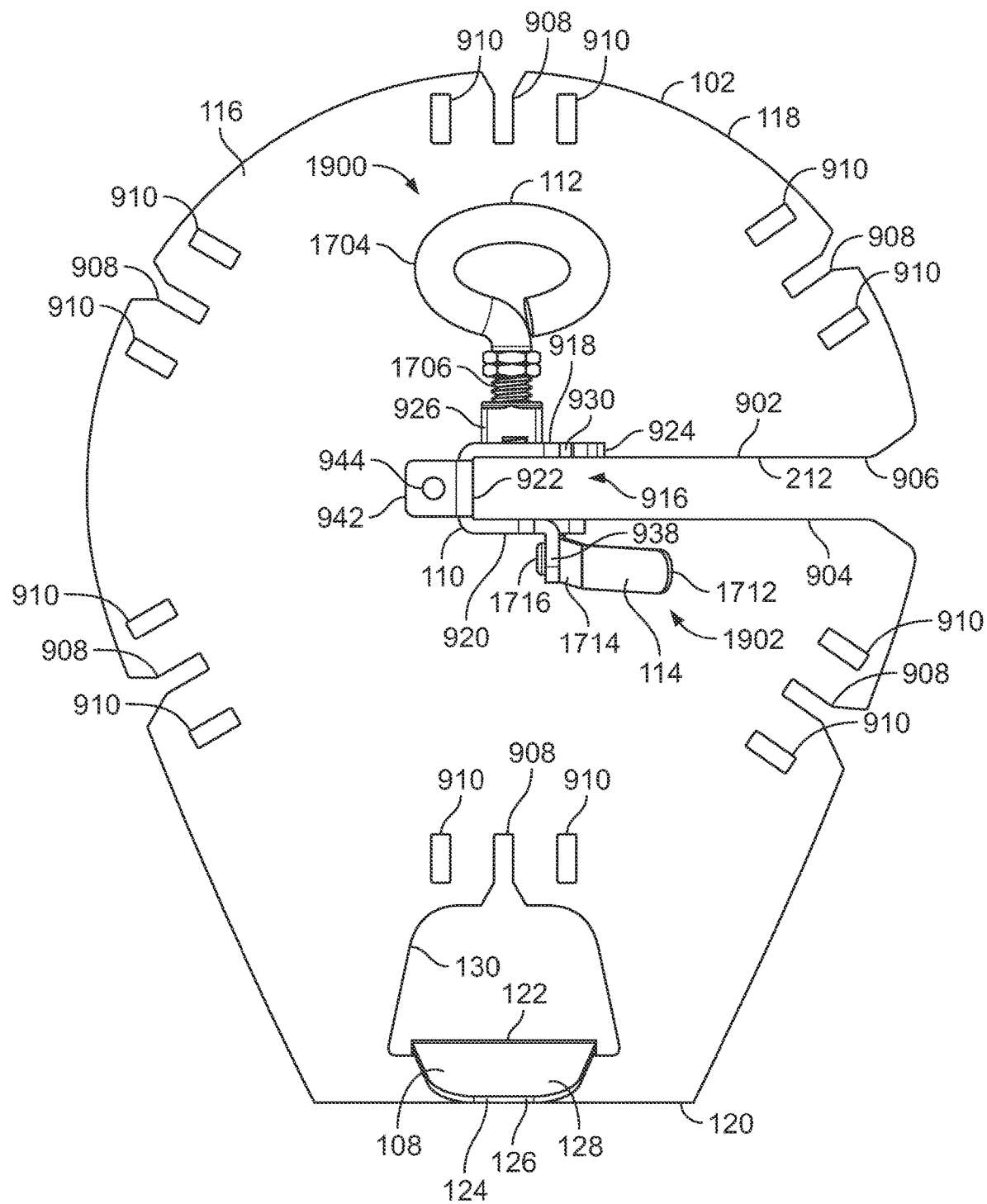
FIG. 19 is a right side view of the first support plate of FIGS. 1-18, with the first fastener of FIGS. 1-8, 17, and 18 shown in an example unlocked position, and with the first clip of FIGS. 1-8, 17, and 18 shown in an example open position.
Figure 20:
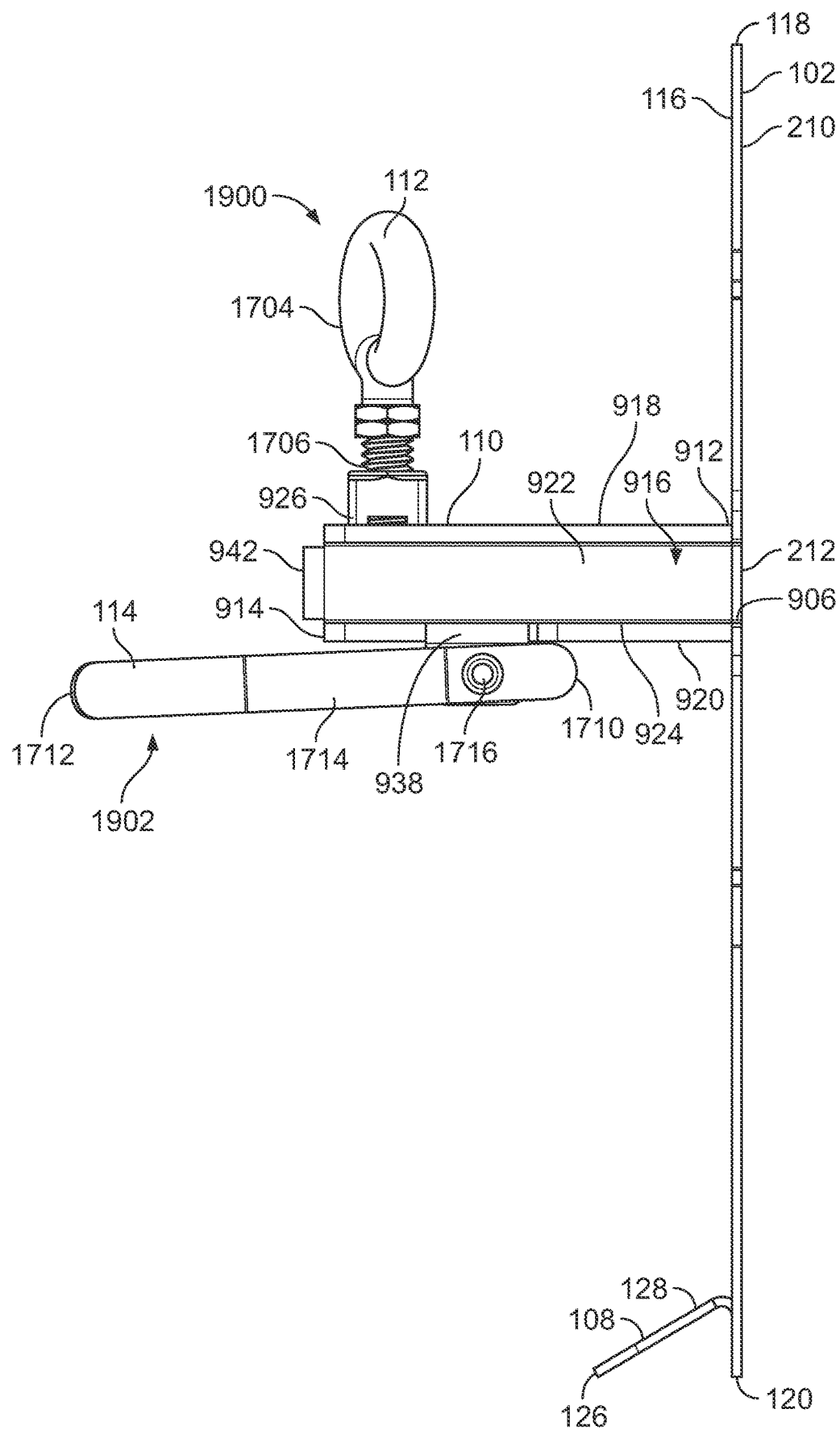
FIG. 20 is a rear view of the first support plate of FIGS. 1-19, with the first fastener of FIGS. 1-8 and 17-19 shown in the unlocked position of FIG. 19, and with the first clip of FIGS. 1-8 and 17-19 shown in the open position of FIG. 19.

FIG. 17 is a right side view of the first support plate 102 of FIGS. 1-16, with the first fastener 112 of FIGS. 1-8 shown in an example locked position 1700, and with the first clip 114 of FIGS. 1-8 shown in an example closed position 1702. FIG. 18 is a rear view of the first support plate 102 of FIGS. 1-17, with the first fastener 112 of FIGS. 1-8 and 17 shown in the locked position 1700 of FIG. 17, and with the first clip 114 of FIGS. 1-8 and 17 shown in the closed position 1702 of FIG. 17. FIG. 19 is a right side view of the first support plate 102 of FIGS. 1-18, with the first fastener 112 of FIGS. 1-8, 17, and 18 shown in an example unlocked position 1900, and with the first clip 114 of FIGS. 1-8, 17, and 18 shown in an example open position 1902. FIG. 20 is a rear view of the first support plate 102 of FIGS. 1-19, with the first fastener 112 of FIGS. 1-8 and 17-19 shown in the unlocked position 1900 of FIG. 19, and with the first clip 114 of FIGS. 1-8 and 17-19 shown in the open position 1902 of FIG. 19.

In the illustrated example of FIGS. 1-8 and 17-20, the first fastener 112 is constructed as an eyebolt having an example looped portion 1704 and an example shaft 1706 extending from the looped portion 1704. The shaft 1706 of the first fastener 112 includes an example free end 1708 located opposite the looped portion 1704 of the first fastener 112. In the illustrated example of FIGS. 1-8 and 17-20, the shaft 1706 of the first fastener 112 is threaded along a substantial entirety of its length. In other examples, the shaft 1706 of the first fastener 112 can alternatively be threaded along only a portion of the length of the shaft 1706. Although the first fastener 112 of the first support plate 102 of FIGS. 1-8 and 17-20 is constructed as an eyebolt, the first fastener 112 can alternatively be constructed as any type of known fastener having a threaded shaft (e.g., a bolt, a screw, etc.).

The shaft 1706 of the first fastener 112 of FIGS. 1-8 and 17-20 is configured to be threadedly received in the threaded opening 928 of the nut 926 of the first mounting bracket 110 such that the shaft 1706 and/or, more generally, the first fastener 112 is movable between the locked position 1700 shown in FIGS. 17 and 18 and the unlocked position 1900 shown in FIGS. 19 and 20. In this regard, the first fastener 112 can be threadedly coupled to the threaded opening 928 of the nut 926 of the first mounting bracket 110 by placing the free end 1708 of the shaft 1706 into the threaded opening 928 of the nut 926, and then rotating the first fastener 112 (e.g., in a clockwise direction) so as to engage the threaded portion of the shaft 1706 with the threaded opening 928 of the nut 926. As shown in FIGS. 17 and 18, the free end 1708 of the shaft 1706 of the first fastener 112 partially blocks, obstructs, and/or otherwise interferes with an upper aspect of a forward portion of the mounting channel 916 of the first mounting bracket 110 when the first fastener 112 is positioned in the locked position 1700. Conversely, as shown in FIGS. 19 and 20, the free end 1708 of the shaft 1706 of the first fastener 112 does not block, obstruct, and/or otherwise interfere with any aspect of the forward portion of the mounting channel 916 of the first mounting bracket 110 when the first fastener 112 is positioned in the unlocked position 1900.

In the illustrated example of FIGS. 17-20, the first fastener 112 is movable from the locked position 1700 to the unlocked position 1900 by rotating the first fastener 112 in a counter-clockwise direction, and is conversely movable from the unlocked position 1900 to the locked position 1700 by rotating the first fastener 112 in a clockwise direction. In other examples, the first fastener 112 can instead be movable from the locked position 1700 to the unlocked position 1900 by rotating the first fastener 112 in a clockwise direction, and can conversely be movable from the unlocked position 1900 to the locked position 1700 by rotating the first fastener 112 in a counter-clockwise direction.

As described in greater detail below, the first fastener 112 is to be removed from the locked position 1700 of FIGS. 17 and 18 prior to the first mounting bracket 110 being transversely loaded onto a rotisserie spit. In this regard, the first fastener 112 will typically be unthreaded from the locked position 1700 of FIGS. 17 and 18 to the unlocked position 1900 of FIGS. 19 and 20 such that the free end 1708 of the shaft 1706 of the first fastener 112 is not blocking any aspect of the forward portion of the mounting channel 916 of the first mounting bracket 110 in preparation of the first mounting bracket 110 being transversely loaded onto the rotisserie spit. Subsequent to the first mounting bracket 110 being transversely loaded onto the rotisserie spit via the rear opening 924 of the mounting channel 916 of the first mounting bracket 110, the first fastener 112 can thereafter be moved from the unlocked position 1900 of FIGS. 19 and 20 to the locked position 1700 of FIGS. 17 and 18 to securely couple the first mounting bracket 110 and/or, more generally, the first support plate 102 to the rotisserie spit.

When the first fastener 112 is placed in the locked position 1700, the free end 1708 of the shaft 1706 of the first fastener 112 extends into the mounting channel 916 of the first mounting bracket 110 so as to engage a rotisserie spit located therein. The engagement between the free end 1708 of the shaft 1706 of the first fastener 112 and the rotisserie spit forces the rotisserie spit into pressurized and/or forceable contact with the lower wall 920 of the mounting channel 916, thereby securely coupling the first mounting bracket 110 and/or, more generally, the first support plate 102 to the rotisserie spit. The first mounting bracket 110 and/or, more generally, the first support plate 102 can conversely be transversely unloaded from the rotisserie spit in response to the first fastener 112 being unthreaded from the locked position 1700 of FIGS. 17 and 18 to the unlocked position 1900 of FIGS. 19 and 20 such that the free end 1708 of the shaft 1706 of the first fastener 112 is no longer contacting the rotisserie spit, and/or such that the free end 1708 of the shaft 1706 of the first fastener 112 is no longer blocking any aspect of the forward portion of the mounting channel 916 of the first mounting bracket 110 that would interfere with the rotisserie spit being removed therefrom.

In the illustrated example of FIGS. 1-8 and 17-20, the first clip 114 is constructed as a thin, semi-flexible rod having an example first end 1710, an example second end 1712 located opposite the first end 1710, and an example engagement portion 1714 located between the first end 1710 and the second end 1712. A portion of the first clip 114 located proximate the first end 1710 is configured to be pivotably coupled to the clip flange 938 of the first mounting bracket 110 of the first support plate 102 such that the first clip 114 is rotatable relative to the first mounting bracket 110, and such that the engagement portion 1714 of the first clip 114 is receivable and/or movable within the slot 930 of the first mounting bracket 110. For example, as shown in FIGS. 17-20, the first clip 114 is pivotably coupled to the clip flange 938 of the first mounting bracket 110 of the first support plate 102 via an example rivet 1716 located proximate the first end 1710 of the first clip 114, with the rivet 1716 extending through an opening formed in the first clip 114 and further extending through the opening 940 formed in the clip flange 938.

In the illustrated example of FIGS. 17-20, the engagement portion 1714 of the first clip 114 is movable between the closed position 1702 shown in FIGS. 17 and 18 and the open position 1902 shown in FIGS. 19 and 20. In this regard, the first clip 114 can be moved between the closed position 1702 and the open position 1902 by physically manipulating the second end 1712 of the first clip 114 so as to cause the engagement portion 1714 of the first clip 114 to rotate and/or pivot relative to the slot 930 of the first mounting bracket 110. As shown in FIGS. 17 and 18, the engagement portion 1714 of the first clip 114 blocks, obstructs, and/or otherwise interferes with a rearward portion of the mounting channel 916 of the first mounting bracket 110 when the first clip 114 is positioned in the closed position 1702. Conversely, as shown in FIGS. 19 and 20, the engagement portion 1714 of the first clip 114 does not block, obstruct, and/or otherwise interfere with any aspect of the rearward portion of the mounting channel 916 of the first mounting bracket 110 when the first clip 114 is positioned in the open position 1902.

As described in greater detail below, the first clip 114 is to be removed from the closed position 1702 of FIGS. 17 and 18 prior to the first mounting bracket 110 being transversely loaded onto a rotisserie spit. In this regard, the first clip 114 will typically be rotated from the closed position 1702 of FIGS. 17 and 18 to the open position 1902 of FIGS. 19 and 20 such that the engagement portion 1714 of the first clip 114 is not blocking any aspect of the rearward portion of the mounting channel 916 of the first mounting bracket 110 in preparation of the first mounting bracket 110 being transversely loaded onto the rotisserie spit. Subsequent to the first mounting bracket 110 being transversely loaded onto the rotisserie spit via the rear opening 924 of the mounting channel 916 of the first mounting bracket 110, the first clip 114 can thereafter be moved from the open position 1902 of FIGS. 19 and 20 to the closed position 1702 of FIGS. 17 and 18 to further couple the first mounting bracket 110 and/or, more generally, the first support plate 102 to the rotisserie spit.

When the first clip 114 is placed in the closed position 1702, the engagement portion 1714 of the first clip 114 extends through and/or across a rearward portion of the mounting channel 916 (e.g., between the upper wall 918 and the lower wall 920) so as to transversely capture a rotisserie spit located within a forward portion of the mounting channel 916. The first clip 114 accordingly functions as a safety clip that prevents the first mounting bracket 110 and/or, more generally, the first support plate 102 from inadvertently being transversely removed from the rotisserie spit. In this regard, the engagement portion 1714 of the first clip 114 is biased (e.g., rearwardly biased) into the expansion notch 936 of the slot 930 of the first mounting bracket 110 when the first clip 114 is placed in the closed position 1702, with the expansion notch 936 thereafter functioning as a mechanical stop that restricts the engagement portion 1714 of the first clip 114 from inadvertently sliding and/or rotating from the second end 934 of the slot 930 (e.g., out of the expansion notch 936) back to the first end 932 of the slot 930 absent physical manipulation of the first clip 114 by a user. Thus, the first mounting bracket 110 and/or, more generally, the first support plate 102 can only be transversely unloaded from the rotisserie spit in response to the first clip 114 being slid and/or rotated from the closed position 1702 of FIGS. 17 and 18 to the open position 1902 of FIGS. 19 and 20, such that the engagement portion 1714 of the first clip 114 is moved out of the expansion notch 936 of the slot 930, and such that the engagement portion 1714 of the first clip 114 is no longer blocking any aspect of the rearward portion of the mounting channel 916 of the first mounting bracket 110 that would interfere with the rotisserie spit being removed therefrom.

As described above, the first clip 114 serves as a mechanical failsafe against inadvertent transverse removal of the first mounting bracket 110 and/or, more generally, the first support plate 102 from the rotisserie spit. In this regard, it is the first fastener 112, rather than the first clip 114, that securely couples the first mounting bracket 110 and/or, more generally, the first support plate 102 to the rotisserie spit. Thus, in other examples, the first clip 114 (as well as the associated slot 930 and the associated clip flange 938) can be omitted from the first mounting bracket 110 and/or, more generally, the first support plate 102 without negatively impacting the capability of securely coupling the first mounting bracket 110 and/or, more generally, the first support plate 102 to the rotisserie spit.

Figure 21:
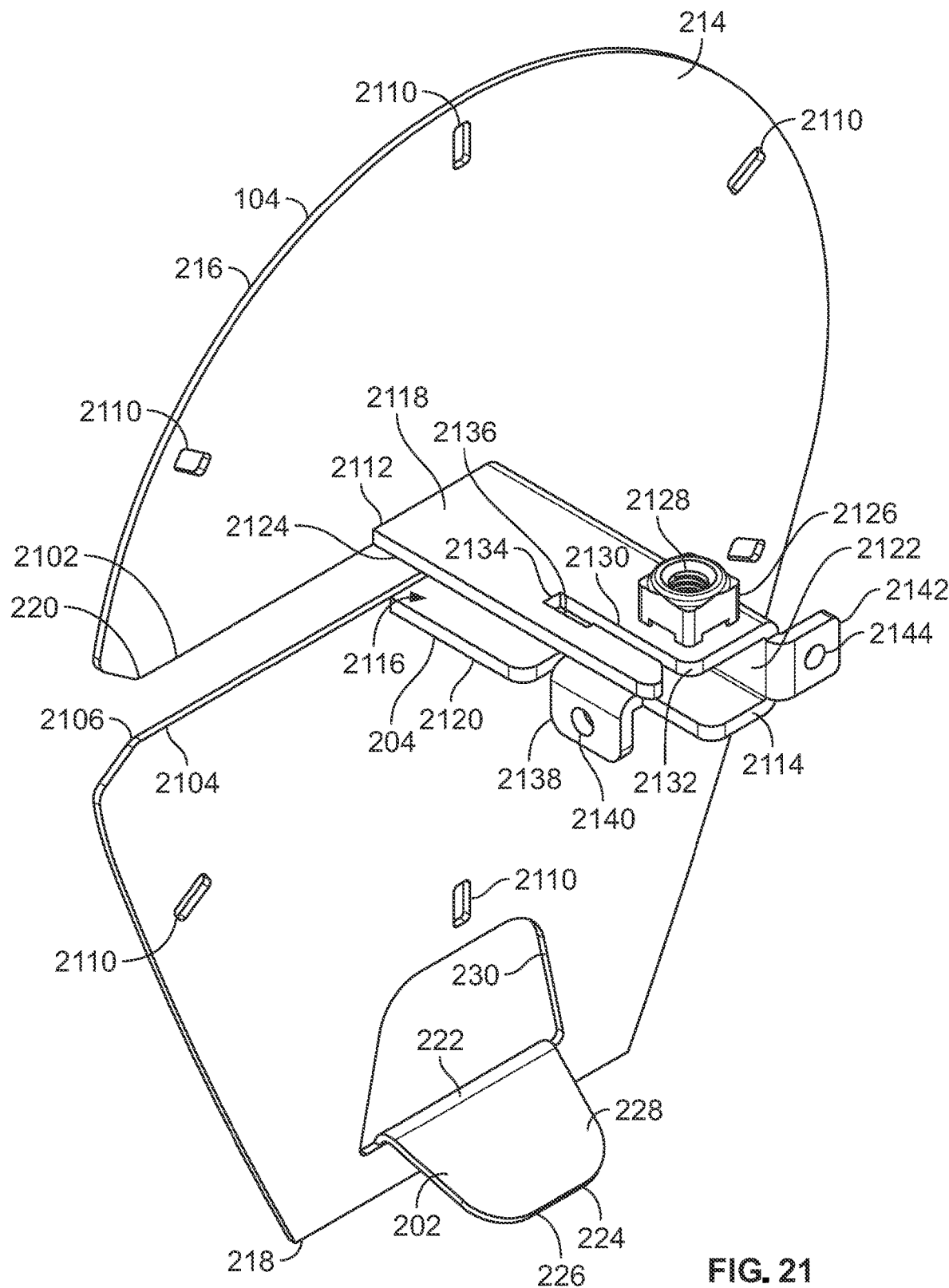
FIG. 21 is a first perspective view of the second support plate of FIGS. 1-8.
Figure 22:
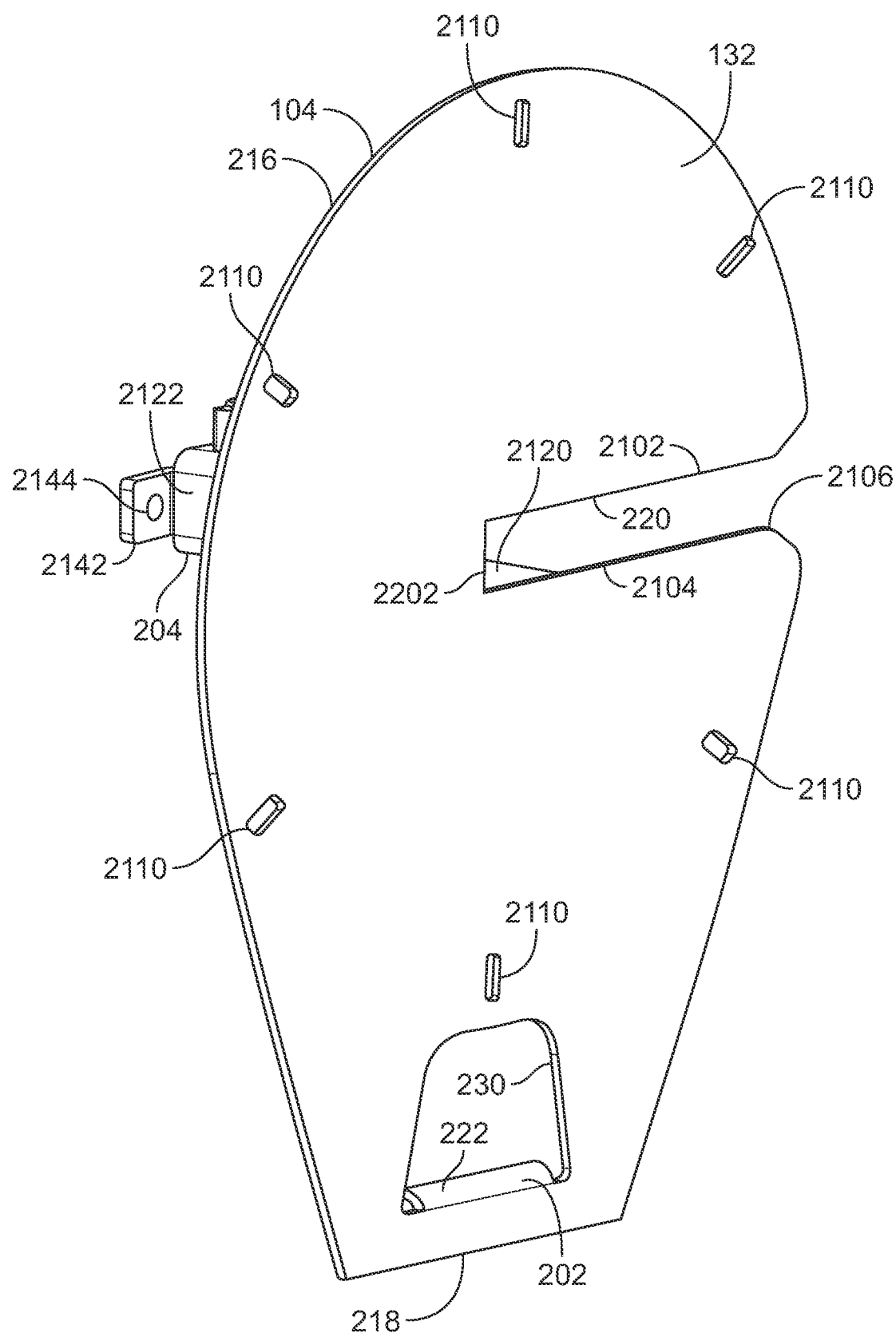
FIG. 22 is a second perspective view of the second support plate of FIGS. 1-8 and 21.
Figure 23:
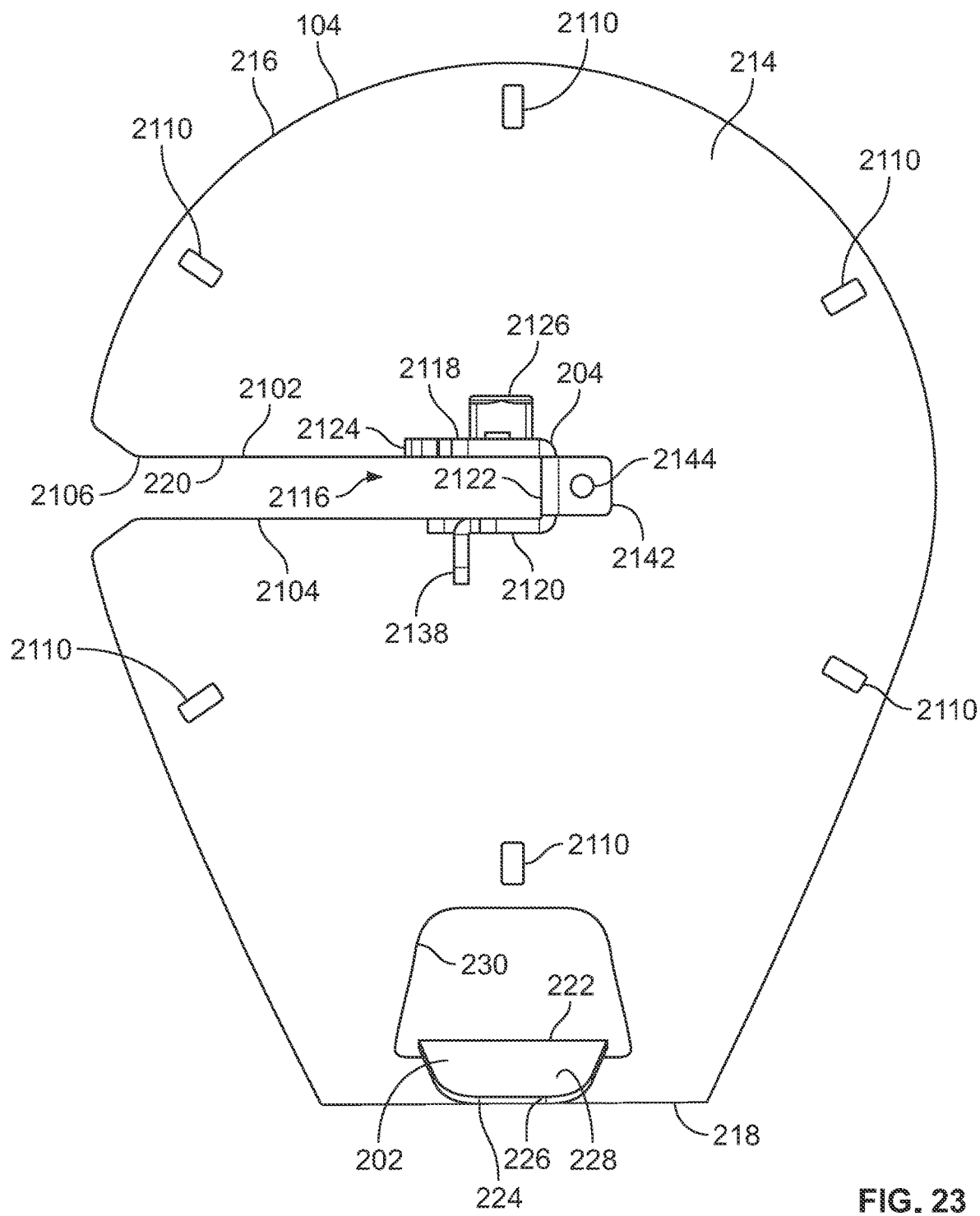
FIG. 23 is a left side view of the second support plate of FIGS. 1-8, 21 and 22.
Figure 24:
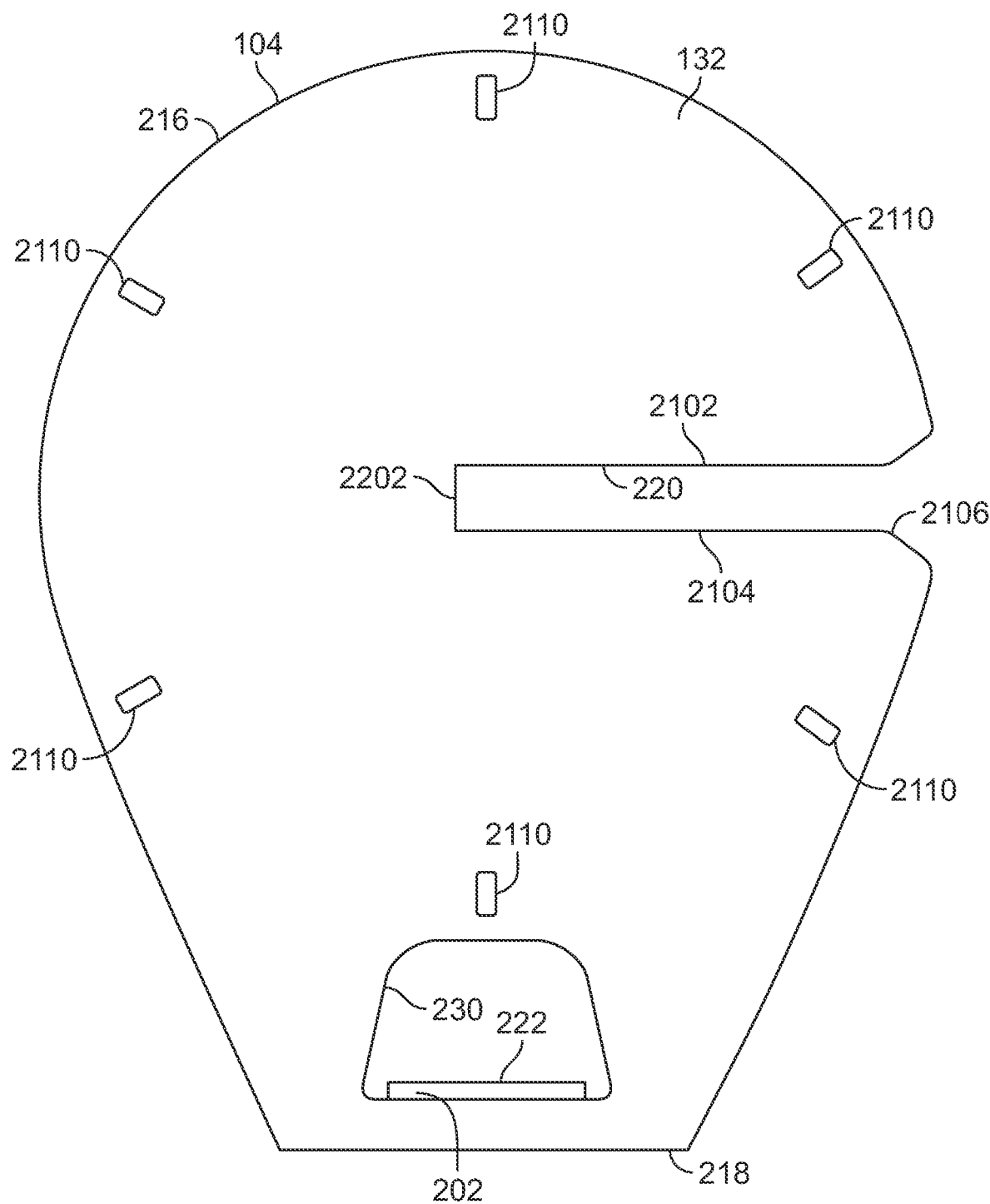
FIG. 24 is a right side view of the second support plate of FIGS. 1-8 and 21-23.
Figure 28:
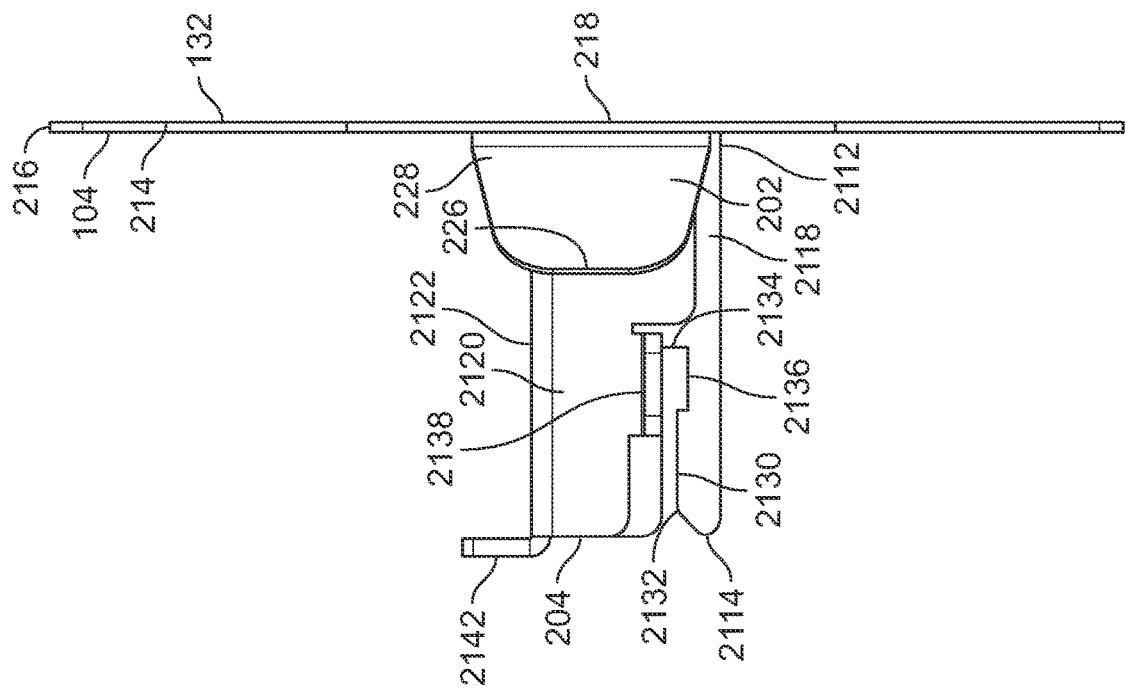
FIG. 28 is a bottom view of the second support plate of FIGS. 1-8 and 21-27.
Figure 27:
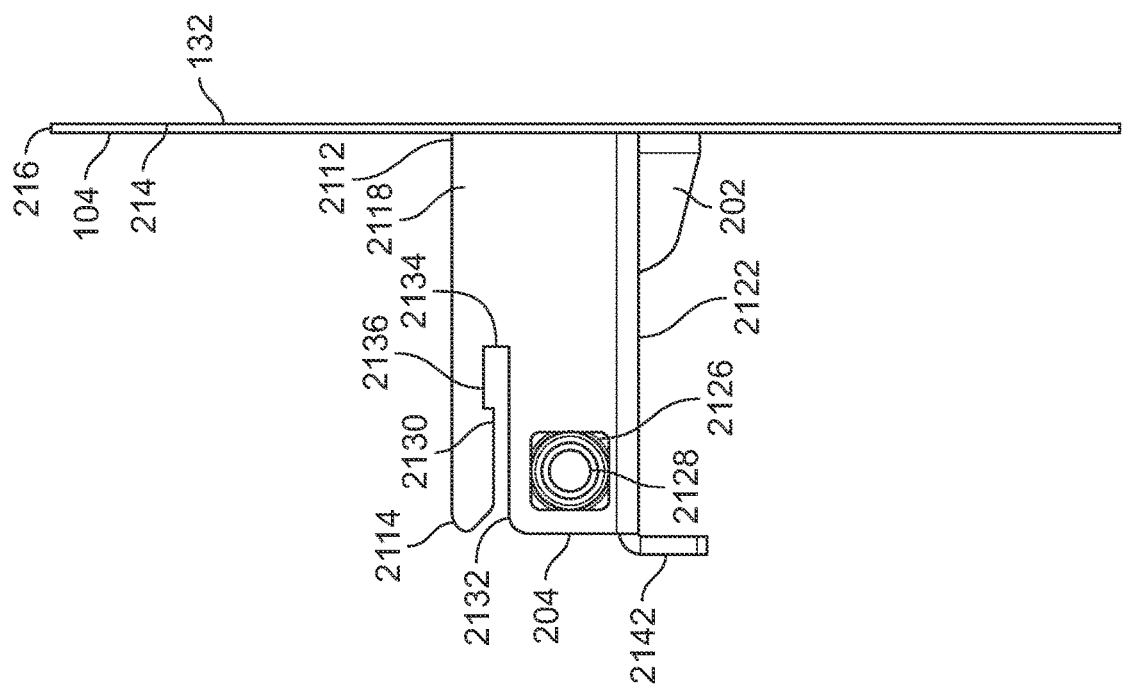
FIG. 27 is a top view of the second support plate of FIGS. 1-8 and 21-26.

The second support plate 104 of the rotisserie skewer rack 100 is generally structured as a mirrored image of the above-described first support plate 102 of the rotisserie skewer rack 100. Additional views of the second support plate 104 (as well as the associated second stabilization foot 202 and the second mounting bracket 204) of the rotisserie skewer rack 100 of FIGS. 1-8 are shown in FIGS. 21-28. In this regard, FIG. 21 is a first perspective view of the second support plate 104 of FIGS. 1-8. FIG. 22 is a second perspective view of the second support plate 104 of FIGS. 1-8 and 21. FIG. 23 is a left side view of the second support plate 104 of FIGS. 1-8, 21 and 22. FIG. 24 is a right side view of the second support plate 104 of FIGS. 1-8 and 21-23. FIG. 25 is a front view of the second support plate 104 of FIGS. 1-8 and 21-24. FIG. 26 is a rear view of the second support plate 104 of FIGS. 1-8 and 21-25. FIG. 27 is a top view of the second support plate 104 of FIGS. 1-8 and 21-26. FIG. 28 is a bottom view of the second support plate 104 of FIGS. 1-8 and 21-27. In the illustrated views of FIGS. 21-28, the second fastener 206 and the second clip 208 associated with the second support plate 104 have been omitted for clarity.

The second support plate 104 of FIGS. 1-8 and 21-28 includes an example first side 214 (e.g., a left side), an example second side 132 (e.g., a right side) located opposite the first side 214, and an example peripheral edge 216 located between the first side 214 and the second side 132. Ignoring the second stabilization foot 202 and the second mounting bracket 204 which, as further described below, respectively extend laterally away from (e.g., outwardly from) the first side 214 of the second support plate 104, the first side 214 and the second side 132 of the second support plate 104 of FIGS. 1-8 and 21-28 are otherwise formed by and/or as planar surfaces. The peripheral edge 216 of the second support plate 104 defines an outer profile of the second support plate 104. In the illustrated example of FIGS. 1-8 and 21-28, the outer profile of the second support plate 104 (e.g., as defined by the peripheral edge 216) includes an upper portion (e.g., generally located above the position of the second mounting bracket 204) having a generally hemispherical shape, and a lower portion (e.g., generally located below the position of the second mounting bracket 204) having a generally trapezoidal shape. In other examples, the outer profile of the second support plate 104 (e.g., as defined by the peripheral edge 216) may differ in shape relative to the shape shown in FIGS. 1-8 and 21-28.

The peripheral edge 216 of the second support plate 104 of FIGS. 1-8 and 21-28 includes an example flat portion 218 located along the bottom of the peripheral edge 216 and/or, more generally, along the bottom of the second support plate 104. The flat portion 218 of the peripheral edge 216 advantageously enables the second support plate 104 to be positioned on an underlying flat support surface (e.g., a countertop, a tabletop, etc.) in a stabilized manner without the second support plate 104 rolling (e.g., in a forward direction and/or a backward direction) relative to the underlying flat support surface. The resultant stability provided by the flat portion 218 of the peripheral edge 216 enhances the ease with which an end user of the rotisserie skewer rack 100 can attach and/or detach the skewers 106 of the rotisserie skewer rack 100 to the second support plate 104 of the rotisserie skewer rack 100. Such stability also prevents the second support plate 104 and/or, more generally, the rotisserie skewer rack 100 from unintentionally rolling and/or otherwise shifting position relative to an underlying flat support surface on which the second support plate 104 and/or, more generally, the rotisserie skewer rack 100 may be placed.

The second support plate 104 of FIGS. 1-8 and 21-28 further includes an example plate channel 220 that extends laterally (e.g., in a left-to-right direction) from the first side 214 of the second support plate 104 through to the second side 132 of the second support plate 104, thereby providing a lateral (e.g., axial) passageway through the second support plate 104. As best shown in FIGS. 21-28, the plate channel 220 of the second support plate 104 includes an example upper surface 2102, an example lower surface 2104 located opposite the upper surface 2102, an example front surface 2202 extending between the upper surface 2102 and the lower surface 2104, and an example rear opening 2106 located opposite the front surface 2202 and extending between the upper surface 2102 and the lower surface 2104. In the illustrated example of FIGS. 1-8 and 21-28, the upper surface 2102, the lower surface 2104, and the front surface 2202 of the plate channel 220 are respectively formed as planar (e.g., linear) surfaces. In other examples, one or more of the upper surface 2102, the lower surface 2104, and/or the front surface 2202 of the plate channel 220 can alternatively be formed as a curved (e.g., non-linear) surface. In the illustrated example of FIGS. 1-8 and 21-28, the plate channel 220 has a C-shaped profile. In the other examples, the plate channel 220 can alternatively have a profile that differs from the C-shaped profile shown in FIGS. 1-8 and 21-28.

In the illustrated example of FIGS. 1-8 and 21-28, the plate channel 220 of the second support plate 104 is configured to be laterally (e.g., axially) aligned with the plate channel 212 of the first support plate 102. For example, the plate channel 220 of the second support plate 104 can be laterally (e.g., axially) aligned with the plate channel 212 of the first support plate 102 in response to the second support plate 104 being coupled to the first support plate 102 via the skewers 106. As another example, the plate channel 220 of the second support plate 104 can additionally or alternatively be laterally (e.g., axially) aligned with the plate channel 212 of the first support plate 102 in response to the second support plate 104 and the first support plate 102 both being coupled to (e.g., transversely loaded onto) a rotisserie spit.

The upper surface 2102, the lower surface 2104, the front surface 2202, and the rear opening 2106 of the plate channel 220 are collectively configured to receive and/or accommodate a rotisserie spit. In this regard, the plate channel 220 of the second support plate 104 is configured as a rearwardly-facing and/or rearwardly-opening channel that extends radially inward from the peripheral edge 216 of the second support plate 104 toward and/or to a central portion of the second support plate 104, with the plate channel 220 being advantageously configured to receive a rotisserie spit via the rear opening 2106 of the plate channel 220. The second support plate 104 can accordingly be loaded onto and/or unloaded from a rotisserie spit in a transverse direction (e.g., relative to a longitudinal axis of the rotisserie spit) via the rear opening 2106 of the plate channel 220, as further described below.

The second support plate 104 of FIGS. 1-8 and 21-28 further includes a plurality of example slots 2110 that respectively extend laterally (e.g., in a left-to-right direction) from the first side 214 of the second support plate 104 through to the second side 132 of the second support plate 104. Each slot 2110 of the second support plate 104 is configured to receive and/or accommodate a piercing end of one of the skewers 106 of the rotisserie skewer rack 100, as generally shown in FIGS. 1-8. In the illustrated example of FIGS. 1-8 and 21-28, the second support plate 104 includes a total of six slots 2110, with respective ones of the slots 2110 being circumferentially spaced apart from one another along the outer profile of the second support plate 104. The second support plate 104 is configured to have a number of slots 2110 (e.g., six such slots 2110) that equals the number of notches 908 (e.g., six such notches 908) of the first support plate 102.

In the illustrated example of FIGS. 1-8 and 21-28, respective ones of the slots 2110 of the second support plate 104 are configured to be laterally (e.g., axially) aligned with corresponding ones of the notches 908 of the first support plate 102. For example, respective ones of the slots 2110 of the second support plate 104 can be laterally (e.g., axially) aligned with corresponding ones of the notches 908 of the first support plate 102 in response to the second support plate 104 being coupled to the first support plate 102 via the skewers 106. As another example, respective ones of the slots 2110 of the second support plate 104 can be laterally (e.g., axially) aligned with corresponding ones of the notches 908 of the first support plate 102 in response to the second support plate 104 and the first support plate 102 both being coupled to (e.g., transversely loaded onto) a rotisserie spit.

The second stabilization foot 202 of the rotisserie skewer rack 100 extends laterally away from the first side 214 of the second support plate 104 of the rotisserie skewer rack 100. In the illustrated example of FIGS. 1-8 and 21-28, the second stabilization foot 202 extends away from the first side 214 of the second support plate 104 at a downward angle. The second stabilization foot 202 is accordingly oriented and/or positioned non-orthogonally relative to the first side 214 of the second support plate 104. In other examples, the second stabilization foot 202 can alternatively be oriented and/or positioned orthogonally relative to the first side 214 of the second support plate 104. In the illustrated example of FIGS. 1-8 and 21-28, the second stabilization foot 202 is integrally formed with (e.g., mechanically inseparable from) the second support plate 104. In other examples, the second stabilization foot 202 can alternatively be removably coupled to the second support plate 104 via one or more fastener(s).

The second stabilization foot 202 of FIGS. 1-8 and 21-28 includes an example first end 222 positioned adjacent (e.g., in contact with) the first side 214 of the second support plate 104, and an example second end 224 (e.g., a free end) located opposite the first end 222. The second end 224 of the second stabilization foot 202 includes an example flat portion 226 that is spaced apart from and laterally aligned with (e.g., located at the same vertical position as) the flat portion 218 of the peripheral edge 216 of the second support plate 104. The flat portion 226 of the second end 224 of the second stabilization foot 202 further enhances that above-described stability benefits provided by the flat portion 218 of the peripheral edge 216 of the second support plate 104. In this regard, The flat portion 226 of the second end 224 of the second stabilization foot 202 advantageously enables the second support plate 104 to be positioned on an underlying flat support surface (e.g., a countertop, a tabletop, etc.) in a stabilized manner without the second support plate 104 tipping (e.g., in a right direction and/or a left direction) and/or without the second support plate 104 rolling (e.g., in a forward direction and/or a backward direction) relative to the underlying flat support surface. The resultant stability provided by the flat portion 226 of the second end 224 of the second stabilization foot 202 accordingly enhances the ease with which an end user of the rotisserie skewer rack 100 can attach and/or detach the skewers 106 of the rotisserie skewer rack 100 to the second support plate 104 of the rotisserie skewer rack 100. The added stability provided by the second stabilization foot 202 also prevents the second support plate 104 and/or, more generally, the rotisserie skewer rack 100 from unintentionally tipping, rolling and/or otherwise shifting position relative to an underlying flat support surface on which the second support plate 104 and/or, more generally, the rotisserie skewer rack 100 may be placed.

In the illustrated example of FIGS. 1-8 and 21-28, the second stabilization foot 202 is advantageously fabricated by an example cutout 228 of the second support plate 104. During fabrication of the second support plate 104, the cutout 228 is formed by making one or more cut(s) that extend though the first side 214 and the second side 132 of the second support plate 104. The cutout 228 is thereafter folded outwardly and downwardly away from the first side 214 of the second support plate 104 to form the second stabilization foot 202 having the form shown in FIGS. 1-8 and 21-28. An example cutout opening 230 associated with the second stabilization foot 202 is formed in the second support plate 104 as a result of the cutout 228 being folded outwardly and downwardly away from the first side 214 of the second support plate 104 to form the second stabilization foot 202.

The second mounting bracket 204 of the rotisserie skewer rack 100 extends laterally away from the first side 214 of the second support plate 104 of the rotisserie skewer rack 100. In the illustrated example of FIGS. 1-8 and 21-28, the second mounting bracket 204 is oriented and/or positioned orthogonally relative to the first side 214 of the second support plate 104. In other examples, the second mounting bracket 204 can alternatively be oriented and/or positioned non-orthogonally relative to the first side 214 of the second support plate 104. In the illustrated example of FIGS. 1-8 and 21-28, the second mounting bracket 204 is integrally formed with (e.g., mechanically inseparable from) the second support plate 104. In other examples, the second mounting bracket 204 can alternatively be removably coupled to the second support plate 104 via one or more fastener(s).

The second mounting bracket 204 of FIGS. 1-8 and 21-28 includes an example first end 2112 positioned adjacent (e.g., in contact with) the first side 214 of the second support plate 104, and an example second end 2114 (e.g., a free end) located opposite the first end 2112. The second mounting bracket 204 defines an example mounting channel 2116 that extends laterally (e.g., in a left-to-right direction) from the second end 2114 of the second mounting bracket 204 through to the first end 2112 of the second mounting bracket 204, thereby providing a lateral (e.g., axial) passageway through the second mounting bracket 204. As shown in FIGS. 21-28, the mounting channel 2116 of the second mounting bracket 204 includes an example upper wall 2118, an example lower wall 2120 located opposite the upper wall 2118, an example front wall 2122 extending between the upper wall 2118 and the lower wall 2120, and an example rear opening 2124 located opposite the front wall 2122 and extending between the upper wall 2118 and the lower wall 2120.

In the illustrated example of FIGS. 1-8 and 21-28, the upper wall 2118, the lower wall 2120, the front wall 2122, and the rear opening 2124 of the mounting channel 2116 respectively extend from the first end 2112 of the second mounting bracket 204 to the second end 2114 of the second mounting bracket 204. In other examples, the upper wall 2118, the lower wall 2120, and/or the front wall 2122 can alternatively extend only partially between the first end 2112 of the second mounting bracket 204 and the second end 2114 of the second mounting bracket 204. In the illustrated example of FIGS. 1-8 and 21-28, the upper wall 2118, the lower wall 2120, and the front wall 2122 of the mounting channel 2116 are respectively formed as planar (e.g., linear) walls. In other examples, one or more of the upper wall 2118, the lower wall 2120, and/or the front wall 2122 of the mounting channel 2116 can alternatively be formed as a curved (e.g., non-linear) wall. In the illustrated example of FIGS. 1-8 and 21-28, the mounting channel 2116 has a C-shaped profile. In the other examples, the mounting channel 2116 can alternatively have a profile that differs from the C-shaped profile shown in FIGS. 1-8 and 21-28.

In the illustrated example of FIGS. 1-8 and 21-28, the mounting channel 2116 of the second mounting bracket 204 is configured to be laterally (e.g., axially) aligned with the mounting channel 916 of the first mounting bracket 110. For example, the mounting channel 2116 of the second mounting bracket 204 can be laterally (e.g., axially) aligned with the mounting channel 916 of the first mounting bracket 110 in response to the second support plate 104 being coupled to the first support plate 102 via the skewers 106. As another example, the mounting channel 2116 of the second mounting bracket 204 can additionally or alternatively be laterally (e.g., axially) aligned with the mounting channel 916 of the first mounting bracket 110 in response to the second mounting bracket 204 and the first mounting bracket 110 both being coupled to (e.g., transversely loaded onto) a rotisserie spit.

The upper wall 2118, the lower wall 2120, the front wall 2122, and the rear opening 2124 of the mounting channel 2116 are collectively configured to receive and/or accommodate a rotisserie spit. In this regard, the mounting channel 2116 of the second mounting bracket 204 is configured as a rearwardly-facing and/or rearwardly-opening channel that is laterally (e.g., axially) aligned with the plate channel 220 of the second support plate 104, with the mounting channel 2116 being advantageously configured to receive a rotisserie spit via the rear opening 2124 of the mounting channel 2116 (e.g., in conjunction with the plate channel 220 receiving the rotisserie spit via the rear opening 2106 of the plate channel 220). The second mounting bracket 204 can accordingly be loaded onto and/or unloaded from a rotisserie spit in a transverse direction (e.g., relative to a longitudinal axis of the rotisserie spit) via the rear opening 2124 of the mounting channel 2116, as further described below.

The second mounting bracket 204 of FIGS. 1-8 and 21-28 further includes an example nut 2126 fixedly coupled (e.g., welded) to a topside of the upper wall 2118 of the second mounting bracket 204. In the illustrated example of FIGS. 1-8 and 21-28, the nut 2126 of the second mounting bracket 204 includes an example threaded opening 2128 that is vertically aligned with (e.g., coaxially positioned relative to) an opening (e.g., a through hole) formed in and extending through the upper wall 2118 of the second mounting bracket 204. The nut 2126 is configured to threadedly receive and/or accommodate a threaded portion of a shaft of the second fastener 206 associated with the second mounting bracket 204, as further described below.

The second mounting bracket 204 of FIGS. 1-8 and 21-28 further includes an example slot 2130 formed in and extending through the upper wall 2118 of the second mounting bracket 204. In the illustrated example of FIGS. 1-8 and 21-28, the slot 2130 includes an example first end 2132 (e.g., an open end) and an example second end 2134 (e.g., a closed end) located opposite the first end 2132. The first end 2132 of the slot 2130 is configured to receive an engagement portion of the second clip 208 associated with the second mounting bracket 204, as further described below. In this regard, the second clip 208 is slidable and/or rotatable into and out of the first end 2132 of the slot 2130, and is further slidable and/or rotatable within the slot 2130 between the first end 2132 and the second end 2134 of the slot 2130. In the illustrated example of FIGS. 1-8 and 21-28, the second end 2134 of the slot 2130 includes an example expansion notch 2136 that is configured to receive the engagement portion of the second clip 208 as the second clip 208 slides and/or rotates from the first end 2132 to the second end 2134 of the slot 2130. The expansion notch 2136 is further configured to function as a mechanical stop that restricts the engagement portion of the second clip 208 from inadvertently sliding and/or rotating from the second end 2134 of the slot 2130 back to the first end 2132 of the slot 2130 absent physical manipulation of the second clip 208 by a user. In other examples, the expansion notch 2136 can instead be omitted from the slot 2130.

The second mounting bracket 204 of FIGS. 1-8 and 21-28 further includes an example clip flange 2138 that extends downwardly from the lower wall 2120 of the second mounting bracket 204. In the illustrated example of FIGS. 1-8 and 21-28, the clip flange 2138 is integrally formed with (e.g., mechanically inseparable from) the second mounting bracket 204. In other examples, the clip flange 2138 can alternatively be removably coupled to the second mounting bracket 204 via one or more fastener(s). The clip flange 2138 includes an example opening 2140 that facilitates the attachment of the second clip 208 to the second mounting bracket 204 and/or, more generally, to the second support plate 104, as further described below.

The second mounting bracket 204 of FIGS. 1-8 and 21-28 further includes an example cable flange 2142 that extends forwardly from the front wall 2122 of the second mounting bracket 204. In the illustrated example of FIGS. 1-8 and 21-28, the cable flange 2142 is integrally formed with (e.g., mechanically inseparable from) the second mounting bracket 204. In other examples, the cable flange 2142 can alternatively be removably coupled to the second mounting bracket 204 via one or more fastener(s). The cable flange 2142 includes an example opening 2144 that facilitates the attachment of a first end of a metal cable to the cable flange 2142. A second end of the metal cable located opposite the first end of the metal cable can be attached to a portion (e.g., a shaft or a looped portion) of the second fastener 206, as shown in FIGS. 1-8. Attachment of the second fastener 206 to the cable flange 2142 via the metal cable advantageously tethers the second fastener 206 to the second mounting bracket 204 so as to prevent the second fastener 206 from becoming completely separated from the second mounting bracket 204 and/or, more generally, from the second support plate 104 when the second fastener 206 is not threadedly coupled to the nut 2126 of the second mounting bracket 204.

Figure 29:
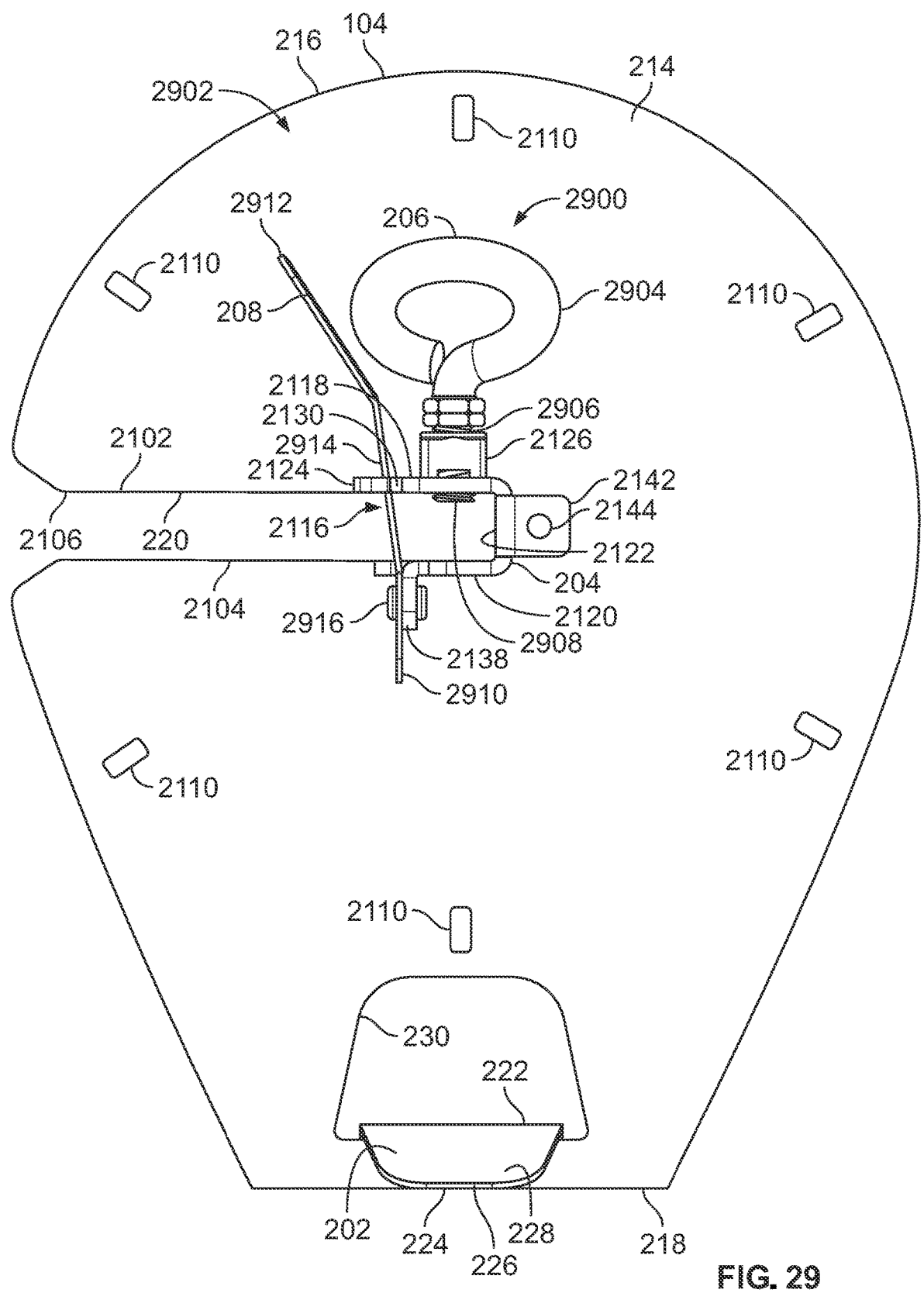
FIG. 29 is a left side view of the second support plate of FIGS. 1-8 and 21-28, with the second fastener of FIGS. 1-8 shown in an example locked position, and with the second clip of FIGS. 1-8 shown in an example closed position.
Figure 30:
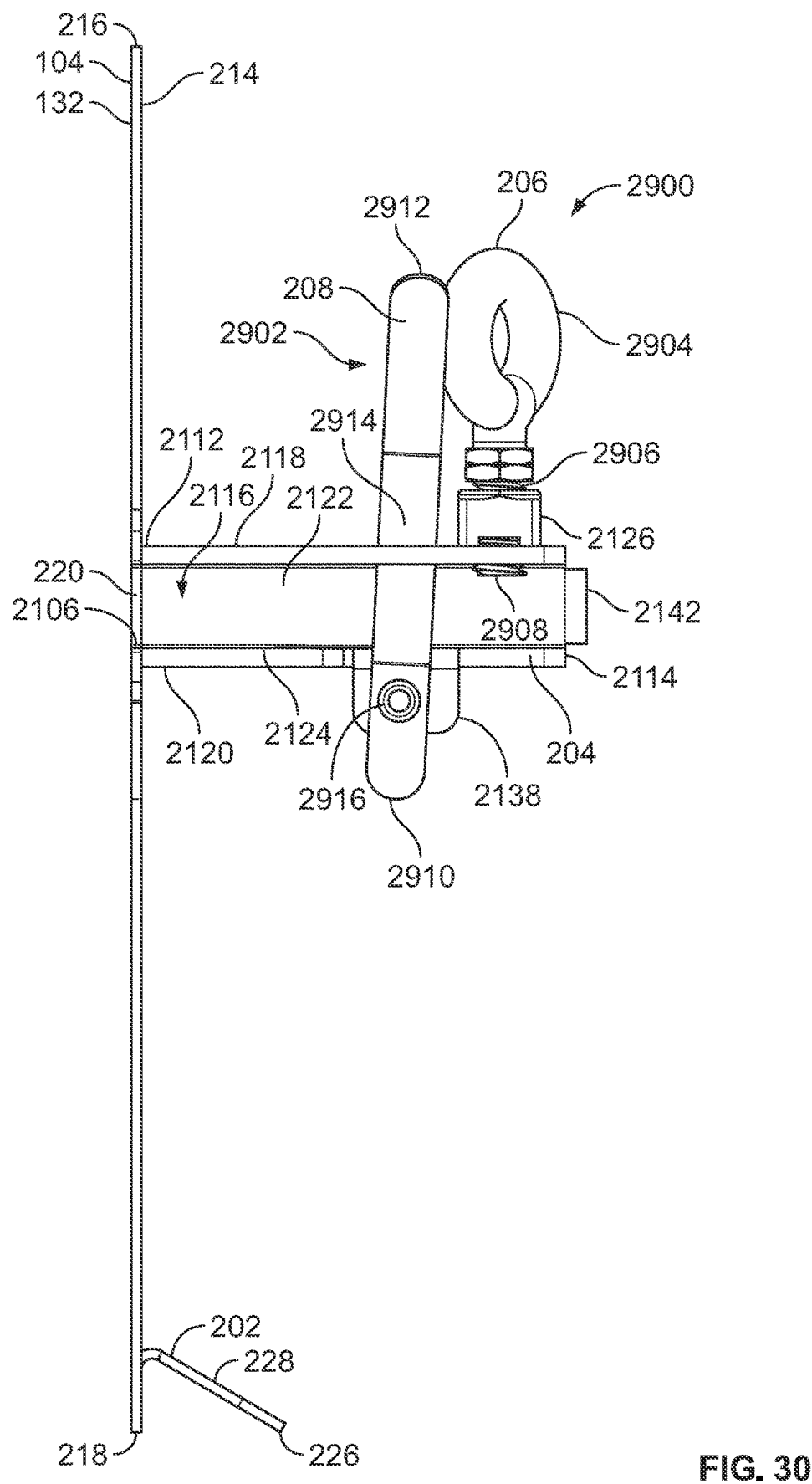
FIG. 30 is a rear view of the second support plate of FIGS. 1-8 and 21-29, with the second fastener of FIGS. 1-8 and 29 shown in the locked position of FIG. 29, and with the second clip of FIGS. 1-8 and 29 shown in the closed position of FIG. 29.
Figure 31:
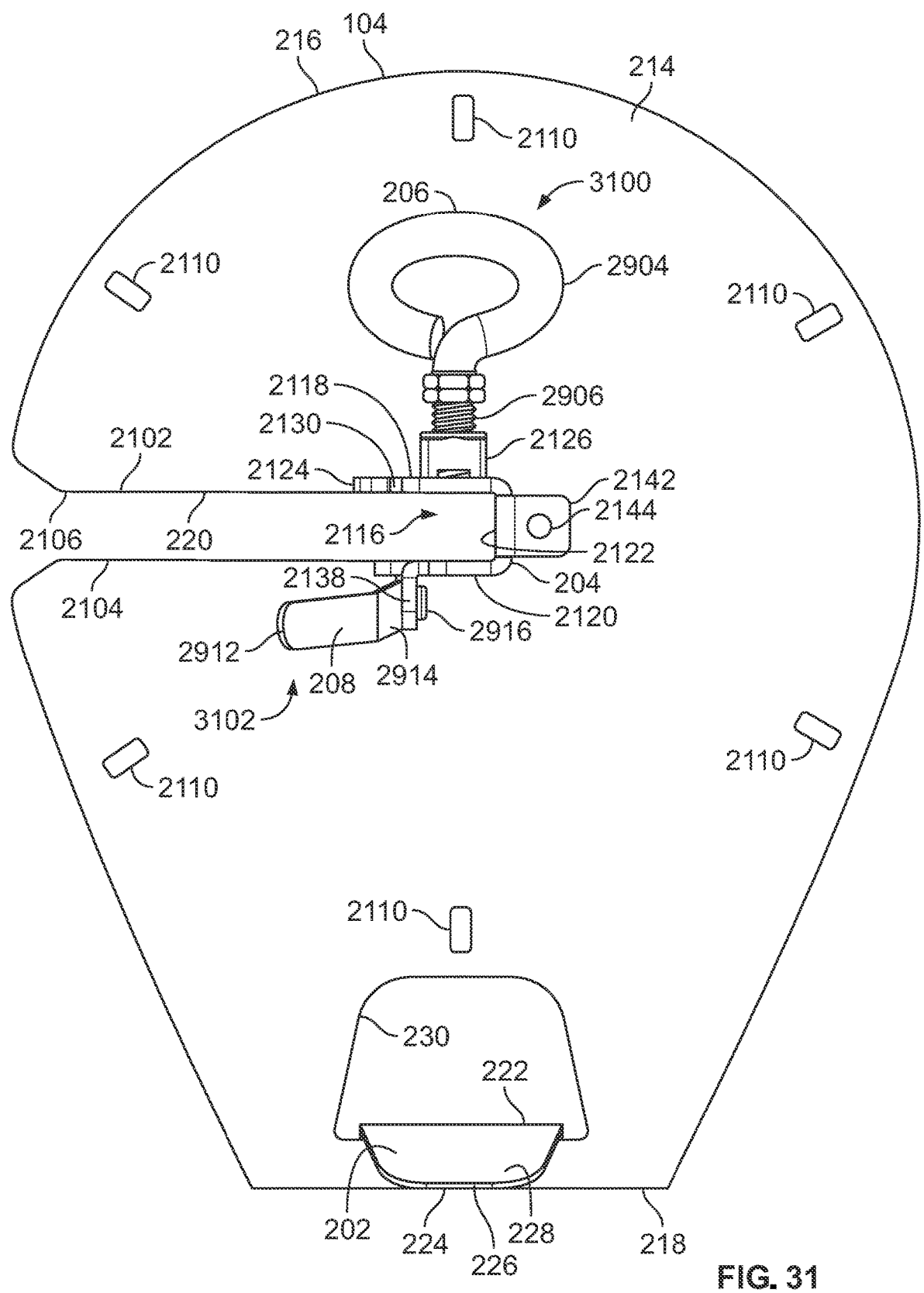
FIG. 31 is a left side view of the second support plate of FIGS. 1-8 and 21-30, with the second fastener of FIGS. 1-8, 29, and 30 shown in an example unlocked position, and with the second clip of FIGS. 1-8, 29, and 30 shown in an example open position.
Figure 32:
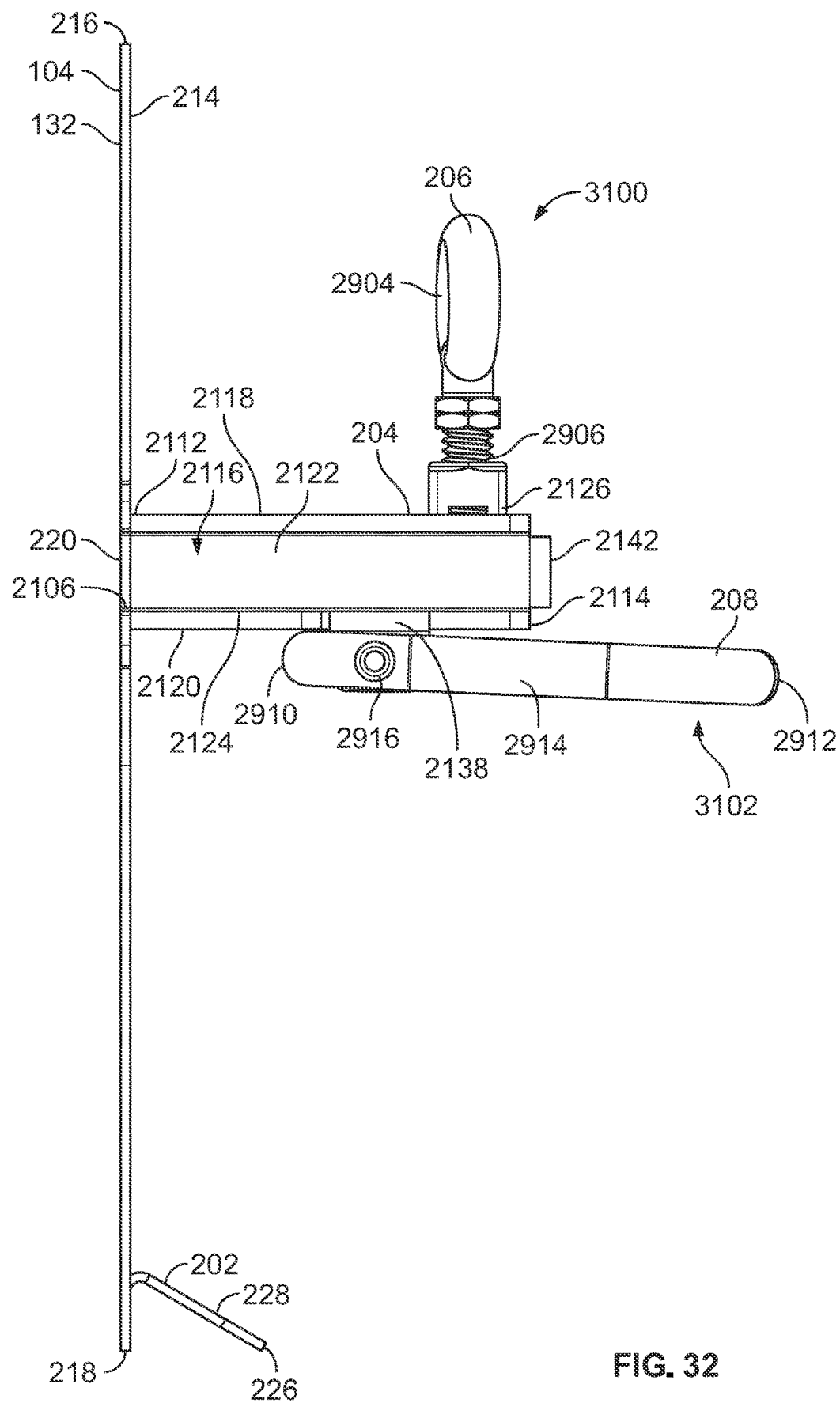
FIG. 32 is a rear view of the second support plate of FIGS. 1-8 and 21-31, with the second fastener of FIGS. 1-8 and 29-31 shown in the unlocked position of FIG. 31, and with the second clip of FIGS. 1-8 and 29-31 shown in the open position of FIG. 31.

FIG. 29 is a left side view of the second support plate 104 of FIGS. 1-8 and 21-28, with the second fastener 206 of FIGS. 1-8 shown in an example locked position 2900, and with the second clip 208 of FIGS. 1-8 shown in an example closed position 2902. FIG. 30 is a rear view of the second support plate 104 of FIGS. 1-8 and 21-29, with the second fastener 206 of FIGS. 1-8 and 29 shown in the locked position 2900 of FIG. 29, and with the second clip 208 of FIGS. 1-8 and 29 shown in the closed position 2902 of FIG. 29. FIG. 31 is a left side view of the second support plate 104 of FIGS. 1-8 and 21-30, with the second fastener 206 of FIGS. 1-8, 29, and 30 shown in an example unlocked position 3100, and with the second clip 208 of FIGS. 1-8, 29, and 30 shown in an example open position 3102. FIG. 32 is a rear view of the second support plate 104 of FIGS. 1-8 and 21-31, with the second fastener 206 of FIGS. 1-8 and 29-31 shown in the unlocked position 3100 of FIG. 31, and with the second clip 208 of FIGS. 1-8 and 29-31 shown in the open position 3102 of FIG. 31.

In the illustrated example of FIGS. 1-8 and 29-32, the second fastener 206 is constructed as an eyebolt having an example looped portion 2904 and an example shaft 2906 extending from the looped portion 2904. The shaft 2906 of the second fastener 206 includes an example free end 2908 located opposite the looped portion 2904 of the second fastener 206. In the illustrated example of FIGS. 1-8 and 29-32, the shaft 2906 of the second fastener 206 is threaded along a substantial entirety of its length. In other examples, the shaft 2906 of the second fastener 206 can alternatively be threaded along only a portion of the length of the shaft 2906. Although the second fastener 206 of the second support plate 104 of FIGS. 1-8 and 29-32 is constructed as an eyebolt, the second fastener 206 can alternatively be constructed as any type of known fastener having a threaded shaft (e.g., a bolt, a screw, etc.).

The shaft 2906 of the second fastener 206 of FIGS. 1-8 and 29-32 is configured to be threadedly received in the threaded opening 2128 of the nut 2126 of the second mounting bracket 204 such that the shaft 2906 and/or, more generally, the second fastener 206 is movable between the locked position 2900 shown in FIGS. 29 and 30 and the unlocked position 3100 shown in FIGS. 31 and 32. In this regard, the second fastener 206 can be threadedly coupled to the threaded opening 2128 of the nut 2126 of the second mounting bracket 204 by placing the free end 2908 of the shaft 2906 into the threaded opening 2128 of the nut 2126, and then rotating the second fastener 206 (e.g., in a clockwise direction) so as to engage the threaded portion of the shaft 2906 with the threaded opening 2128 of the nut 2126. As shown in FIGS. 29 and 30, the free end 2908 of the shaft 2906 of the second fastener 206 partially blocks, obstructs, and/or otherwise interferes with an upper aspect of a forward portion of the mounting channel 2116 of the second mounting bracket 204 when the second fastener 206 is positioned in the locked position 2900. Conversely, as shown in FIGS. 31 and 32, the free end 2908 of the shaft 2906 of the second fastener 206 does not block, obstruct, and/or otherwise interfere with any aspect of the forward portion of the mounting channel 2116 of the second mounting bracket 204 when the second fastener 206 is positioned in the unlocked position 3100.

In the illustrated example of FIGS. 29-32, the second fastener 206 is movable from the locked position 2900 to the unlocked position 3100 by rotating the second fastener 206 in a counter-clockwise direction, and is conversely movable from the unlocked position 3100 to the locked position 2900 by rotating the second fastener 206 in a clockwise direction. In other examples, the second fastener 206 can instead be movable from the locked position 2900 to the unlocked position 3100 by rotating the second fastener 206 in a clockwise direction, and can conversely be movable from the unlocked position 3100 to the locked position 2900 by rotating the second fastener 206 in a counter-clockwise direction.

As described in greater detail below, the second fastener 206 is to be removed from the locked position 2900 of FIGS. 29 and 30 prior to the second mounting bracket 204 being transversely loaded onto a rotisserie spit. In this regard, the second fastener 206 will typically be unthreaded from the locked position 2900 of FIGS. 29 and 30 to the unlocked position 3100 of FIGS. 31 and 32 such that the free end 2908 of the shaft 2906 of the second fastener 206 is not blocking any aspect of the forward portion of the mounting channel 2116 of the second mounting bracket 204 in preparation of the second mounting bracket 204 being transversely loaded onto the rotisserie spit. Subsequent to the second mounting bracket 204 being transversely loaded onto the rotisserie spit via the rear opening 2124 of the mounting channel 2116 of the second mounting bracket 204, the second fastener 206 can thereafter be moved from the unlocked position 3100 of FIGS. 31 and 32 to the locked position 2900 of FIGS. 29 and 30 to securely couple the second mounting bracket 204 and/or, more generally, the second support plate 104 to the rotisserie spit.

When the second fastener 206 is placed in the locked position 2900, the free end 2908 of the shaft 2906 of the second fastener 206 extends into the mounting channel 2116 of the second mounting bracket 204 so as to engage a rotisserie spit located therein. The engagement between the free end 2908 of the shaft 2906 of the second fastener 206 and the rotisserie spit forces the rotisserie spit into pressurized and/or forceable contact with the lower wall 2120 of the mounting channel 2116, thereby securely coupling the second mounting bracket 204 and/or, more generally, the second support plate 104 to the rotisserie spit. The second mounting bracket 204 and/or, more generally, the second support plate 104 can conversely be transversely unloaded from the rotisserie spit in response to the second fastener 206 being unthreaded from the locked position 2900 of FIGS. 29 and 30 to the unlocked position 3100 of FIGS. 31 and 32 such that the free end 2908 of the shaft 2906 of the second fastener 206 is no longer contacting the rotisserie spit, and/or such that the free end 2908 of the shaft 2906 of the second fastener 206 is no longer blocking any aspect of the forward portion of the mounting channel 2116 of the second mounting bracket 204 that would interfere with the rotisserie spit being removed therefrom.

In the illustrated example of FIGS. 1-8 and 29-32, the second clip 208 is constructed as a thin, semi-flexible rod having an example first end 2910, an example second end 2912 located opposite the first end 2910, and an example engagement portion 2914 located between the first end 2910 and the second end 2912. A portion of the second clip 208 located proximate the first end 2910 is configured to be pivotably coupled to the clip flange 2138 of the second mounting bracket 204 of the second support plate 104 such that the second clip 208 is rotatable relative to the second mounting bracket 204, and such that the engagement portion 2914 of the second clip 208 is receivable and/or movable within the slot 2130 of the second mounting bracket 204. For example, as shown in FIGS. 29-32, the second clip 208 is pivotably coupled to the clip flange 2138 of the second mounting bracket 204 of the second support plate 104 via an example rivet 2916 located proximate the first end 2910 of the second clip 208, with the rivet 2916 extending through an opening formed in the second clip 208 and further extending through the opening 2140 formed in the clip flange 2138.

In the illustrated example of FIGS. 29-32, the engagement portion 2914 of the second clip 208 is movable between the closed position 2902 shown in FIGS. 29 and 30 and the open position 3102 shown in FIGS. 31 and 32. In this regard, the second clip 208 can be moved between the closed position 2902 and the open position 3102 by physically manipulating the second end 2912 of the second clip 208 so as to cause the engagement portion 2914 of the second clip 208 to rotate and/or pivot relative to the slot 2130 of the second mounting bracket 204. As shown in FIGS. 29 and 30, the engagement portion 2914 of the second clip 208 blocks, obstructs, and/or otherwise interferes with a rearward portion of the mounting channel 2116 of the second mounting bracket 204 when the second clip 208 is positioned in the closed position 2902. Conversely, as shown in FIGS. 31 and 32, the engagement portion 2914 of the second clip 208 does not block, obstruct, and/or otherwise interfere with any aspect of the rearward portion of the mounting channel 2116 of the second mounting bracket 204 when the second clip 208 is positioned in the open position 3102.

As described in greater detail below, the second clip 208 is to be removed from the closed position 2902 of FIGS. 29 and 30 prior to the second mounting bracket 204 being transversely loaded onto a rotisserie spit. In this regard, the second clip 208 will typically be rotated from the closed position 2902 of FIGS. 29 and 30 to the open position 3102 of FIGS. 31 and 32 such that the engagement portion 2914 of the second clip 208 is not blocking any aspect of the rearward portion of the mounting channel 2116 of the second mounting bracket 204 in preparation of the second mounting bracket 204 being transversely loaded onto the rotisserie spit. Subsequent to the second mounting bracket 204 being transversely loaded onto the rotisserie spit via the rear opening 2124 of the mounting channel 2116 of the second mounting bracket 204, the second clip 208 can thereafter be moved from the open position 3102 of FIGS. 31 and 32 to the closed position 2902 of FIGS. 29 and 30 to further couple the second mounting bracket 204 and/or, more generally, the second support plate 104 to the rotisserie spit.

When the second clip 208 is placed in the closed position 2902, the engagement portion 2914 of the second clip 208 extends through and/or across a rearward portion of the mounting channel 2116 (e.g., between the upper wall 2118 and the lower wall 2120) so as to transversely capture a rotisserie spit located within a forward portion of the mounting channel 2116. The second clip 208 accordingly functions as a safety clip that prevents the second mounting bracket 204 and/or, more generally, the second support plate 104 from inadvertently being transversely removed from the rotisserie spit. In this regard, the engagement portion 2914 of the second clip 208 is biased (e.g., rearwardly biased) into the expansion notch 2136 of the slot 2130 of the second mounting bracket 204 when the second clip 208 is placed in the closed position 2902, with the expansion notch 2136 thereafter functioning as a mechanical stop that restricts the engagement portion 2914 of the second clip 208 from inadvertently sliding and/or rotating from the second end 2134 of the slot 2130 (e.g., out of the expansion notch 2136) back to the first end 2132 of the slot 2130 absent physical manipulation of the second clip 208 by a user. Thus, the second mounting bracket 204 and/or, more generally, the second support plate 104 can only be transversely unloaded from the rotisserie spit in response to the second clip 208 being slid and/or rotated from the closed position 2902 of FIGS. 29 and 30 to the open position 3102 of FIGS. 31 and 32, such that the engagement portion 2914 of the second clip 208 is moved out of the expansion notch 2136 of the slot 2130, and such that the engagement portion 2914 of the second clip 208 is no longer blocking any aspect of the rearward portion of the mounting channel 2116 of the second mounting bracket 204 that would interfere with the rotisserie spit being removed therefrom.

As described above, the second clip 208 serves as a mechanical failsafe against inadvertent transverse removal of the second mounting bracket 204 and/or, more generally, the second support plate 104 from the rotisserie spit. In this regard, it is the second fastener 206, rather than the second clip 208, that securely couples the second mounting bracket 204 and/or, more generally, the second support plate 104 to the rotisserie spit. Thus, in other examples, the second clip 208 (as well as the associated slot 2130 and the associated clip flange 2138) can be omitted from the second mounting bracket 204 and/or, more generally, the second support plate 104 without negatively impacting the capability of securely coupling the second mounting bracket 204 and/or, more generally, the second support plate 104 to the rotisserie spit.

Figure 33:
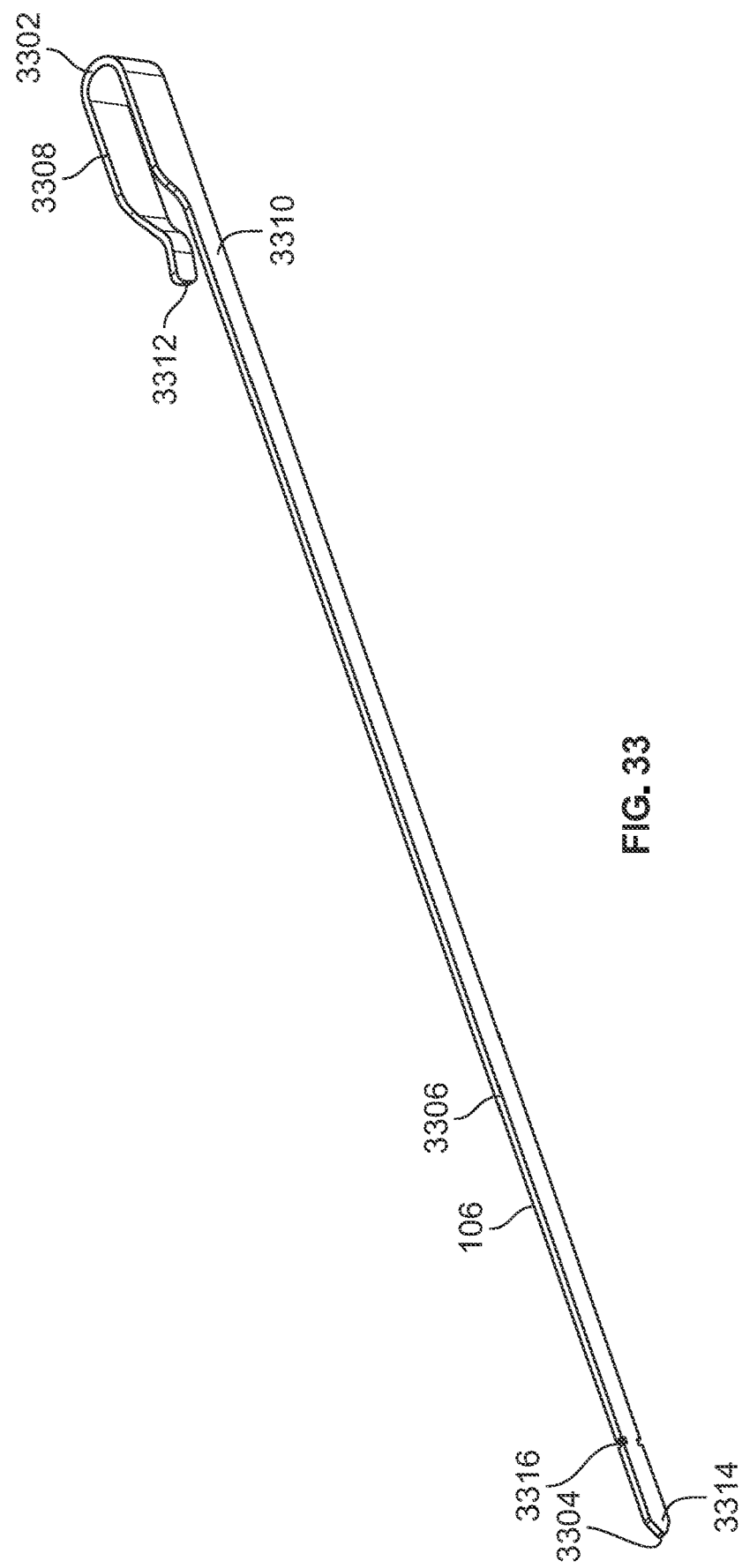
FIG. 33 is a perspective view of one of the skewers of FIGS. 1-8.

FIG. 33 is a perspective view of one of the skewers 106 of FIGS. 1-8. The skewer 106 includes an example first end 3302, an example second end 3304 located opposite the first end 3302, and an example shaft 3306 located between the first end 3302 and the second end 3304 of the skewer 106. The skewer 106 further includes an example head 3308 formed and/or located at the first end 3302 of the skewer 106. The head 3308 includes an example neck 3310 at which the head 3308 joins the shaft 3306 of the skewer 106. The head 3308 further includes an example free end 3312 spaced apart from the neck 3310, with the free end 3312 being oriented away from the first end 3302 and toward the second end 3304 of the skewer 106. The head 3308 of the skewer 106 has a flexible and/or compressible U-shaped profile such that the free end 3312 of the head 3308 is movable (e.g., flexible) toward the neck 3310 of the head 3308. The flexible nature of the head 3308 facilitates the creation of an interference fit when the skewer 106 is coupled to the first support plate 102 of the rotisserie skewer rack 100, as further described below. The second end 3304 of the skewer 106 includes an example spiked tip 3314 configured to pierce one or more item(s) of food to facilitate loading the item(s) of food onto the shaft 3306 of the skewer 106.

The skewer 106 is configured to be securely coupled to the first support plate 102 and the second support plate 104 of the rotisserie skewer rack 100. In this regard, the shaft 3306 of the skewer 106 includes an example notched segment 3316 located toward the second end 3304 of the skewer 106 (e.g., proximate the spiked tip 3314). The notched segment 3316 of the shaft 3306 of the skewer 106 is configured to be positioned and/or located within a chosen (e.g., user-selected) one of the slots 2110 of the second support plate 104, thereby securely coupling the skewer 106 to the second support plate 104 of the rotisserie skewer rack 100. The neck 3310 of the head 3308 of the skewer 106 is configured to be positioned and/or located within a corresponding chosen (e.g., user-selected) one of the notches 908 of the first support plate 102 while the free end 3312 of the head 3308 of the skewer 106 is flexibly positioned and/or located within an associated one of the slots 910 of the first support plate 102, thereby creating an interference fit that securely couples the skewer 106 to the first support plate 102 of the rotisserie skewer rack 100. As generally shown in FIGS. 1-8, the chosen one of the slots 2110 of the second support plate 104 within which the notched segment 3316 of the shaft 3306 of the skewer 106 is to be located will be laterally (e.g., axially) aligned with the corresponding chosen one of the notches 908 of the first support plate 102 within which the neck 3310 of the head 3308 of the skewer 106 is to be located.

Figure 34:
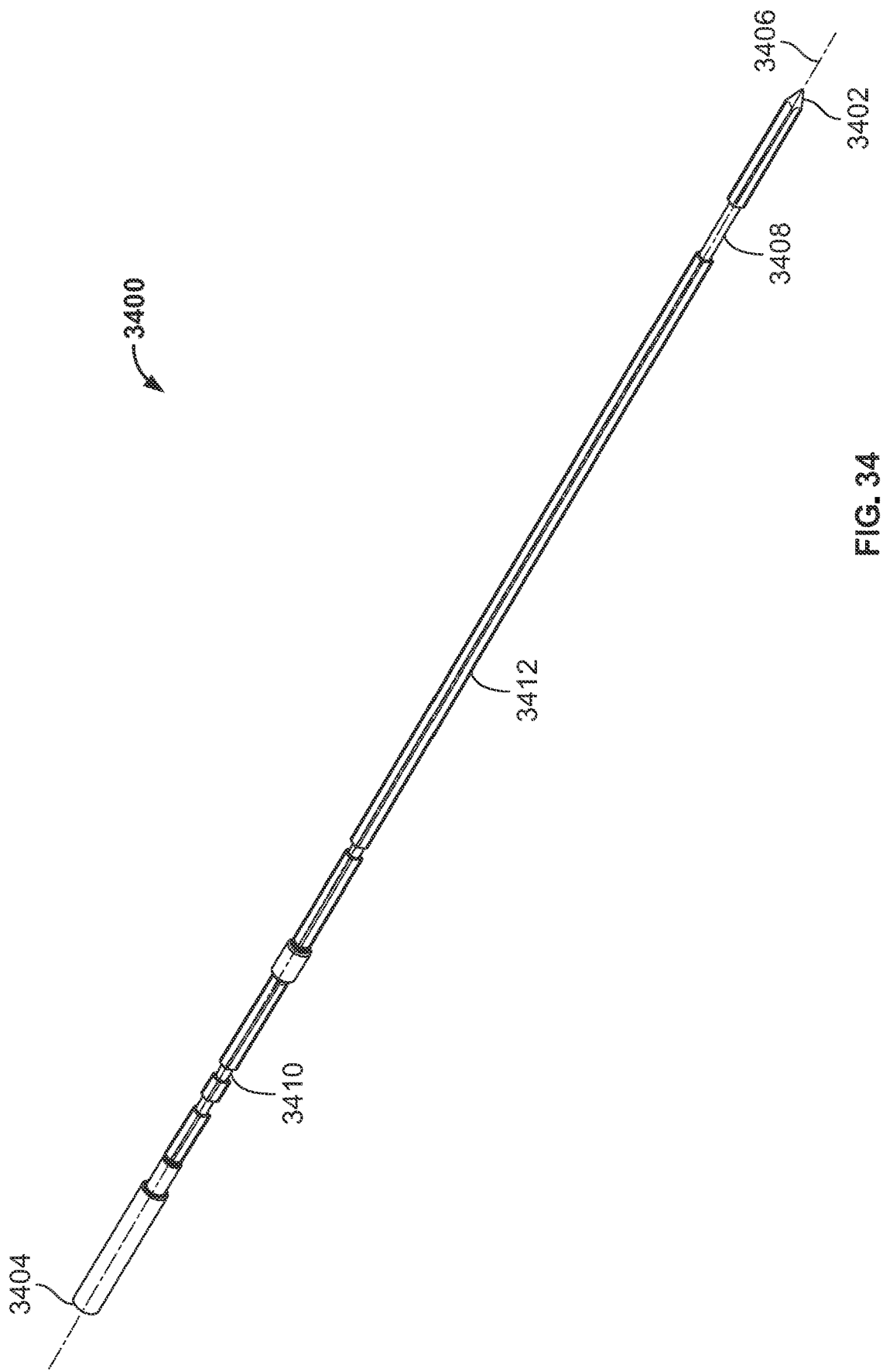
FIG. 34 is a perspective view of an example rotisserie spit.

FIG. 34 is a perspective view of an example rotisserie spit 3400. The rotisserie spit 3400 of FIG. 34 includes an example first end 3402, an example second end 3404 located opposite the first end 3402, and an example longitudinal axis 3406 extending between the first end 3402 and the second end 3404. The first end 3402 of the rotisserie spit 3400 is configured to be operatively coupled to a motor of a rotisserie cooking system, whereby the motor is configured to rotate the rotisserie spit 3400 about its longitudinal axis 3406 to facilitate rotisserie-style cooking.

The rotisserie spit 3400 of FIG. 34 is configured to extend across the width of a cookbox of a grill. In this regard, the rotisserie spit 3400 includes an example first axial segment 3408 located toward the first end 3402 of the rotisserie spit 3400, an example second axial segment 3410 located toward the second end 3404 of the rotisserie spit 3400, and an example third axial segment 3412 located between the first axial segment 3408 and the second axial segment 3410 of the rotisserie spit 3400. The first axial segment 3408 is configured to be positioned within and/or supported by a notched portion of a right sidewall of the cookbox of the grill. The second axial segment 3410 is configured to be positioned within and/or supported by a notched portion of a left sidewall of the cookbox of the grill. The third axial segment 3412 is configured to be positioned between the right sidewall and the left sidewall of the cookbox of the grill.

The first axial segment 3408 and the second axial segment 3410 of the rotisserie spit 3400 respectively have a circular cross-sectional profile that facilitates rotation of the rotisserie spit 3400 on and/or within the cookbox of the grill. The third axial segment 3412 of the rotisserie spit 3400 has a rectangular cross-sectional profile that facilitates (1) transversely loading the first mounting bracket 110, the second mounting bracket 204, and/or, more generally, the rotisserie skewer rack 100 onto the third axial segment 3412 of the rotisserie spit 3400, and (2) securely coupling the first mounting bracket 110, the second mounting bracket 204, and/or, more generally, the rotisserie skewer rack 100 to the third axial segment 3412 of the rotisserie spit 3400 such that the first mounting bracket 110, the second mounting bracket 204, and/or, more generally, the rotisserie skewer rack 100 rotate(s) along with the rotation (e.g., the motor-driven rotation) of the rotisserie spit 3400.

Figure 35:
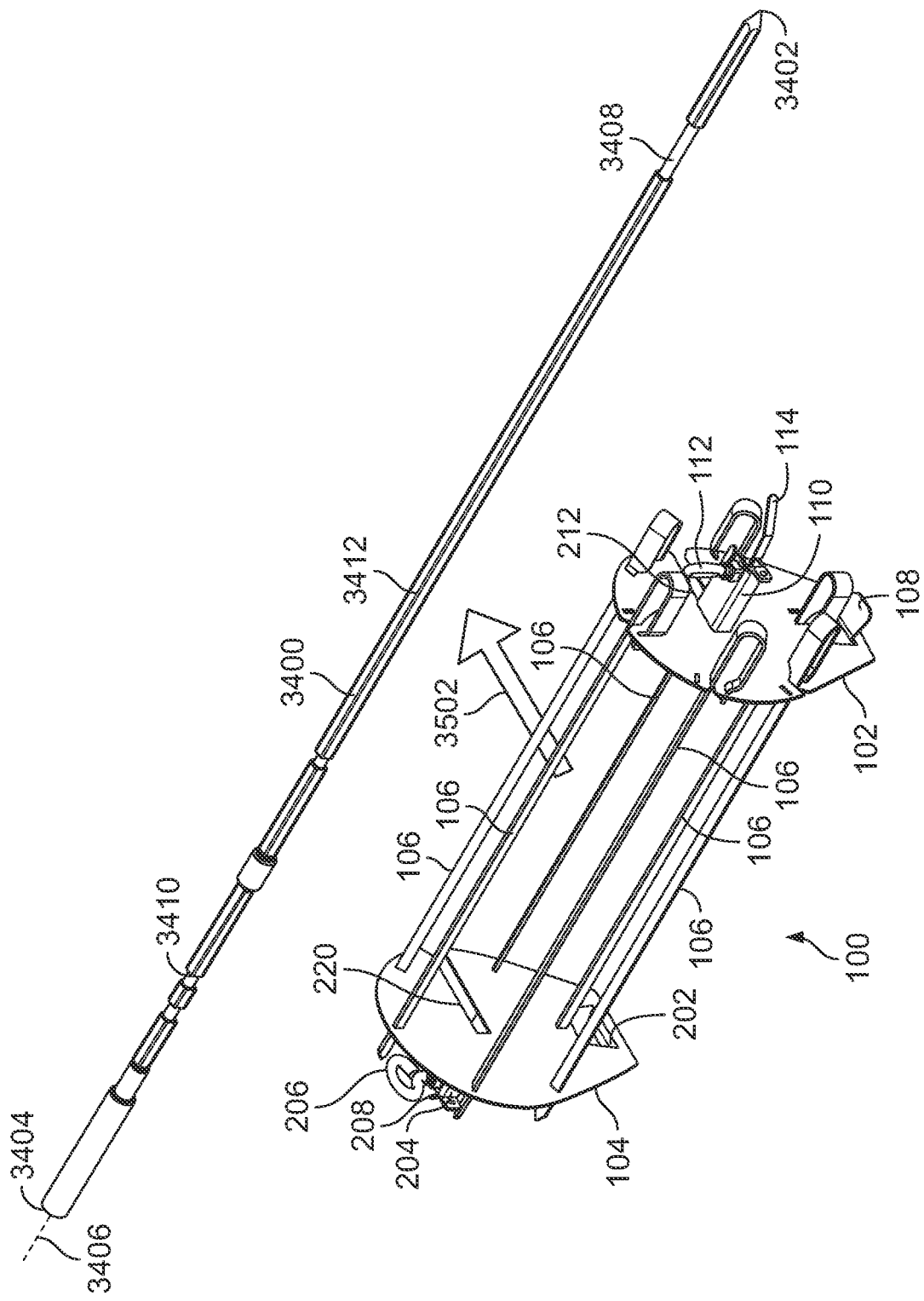
FIG. 35 is a perspective view of the rotisserie skewer rack of FIGS. 1-8 positioned for transverse loading onto the rotisserie spit of FIG. 34.
Figure 36:
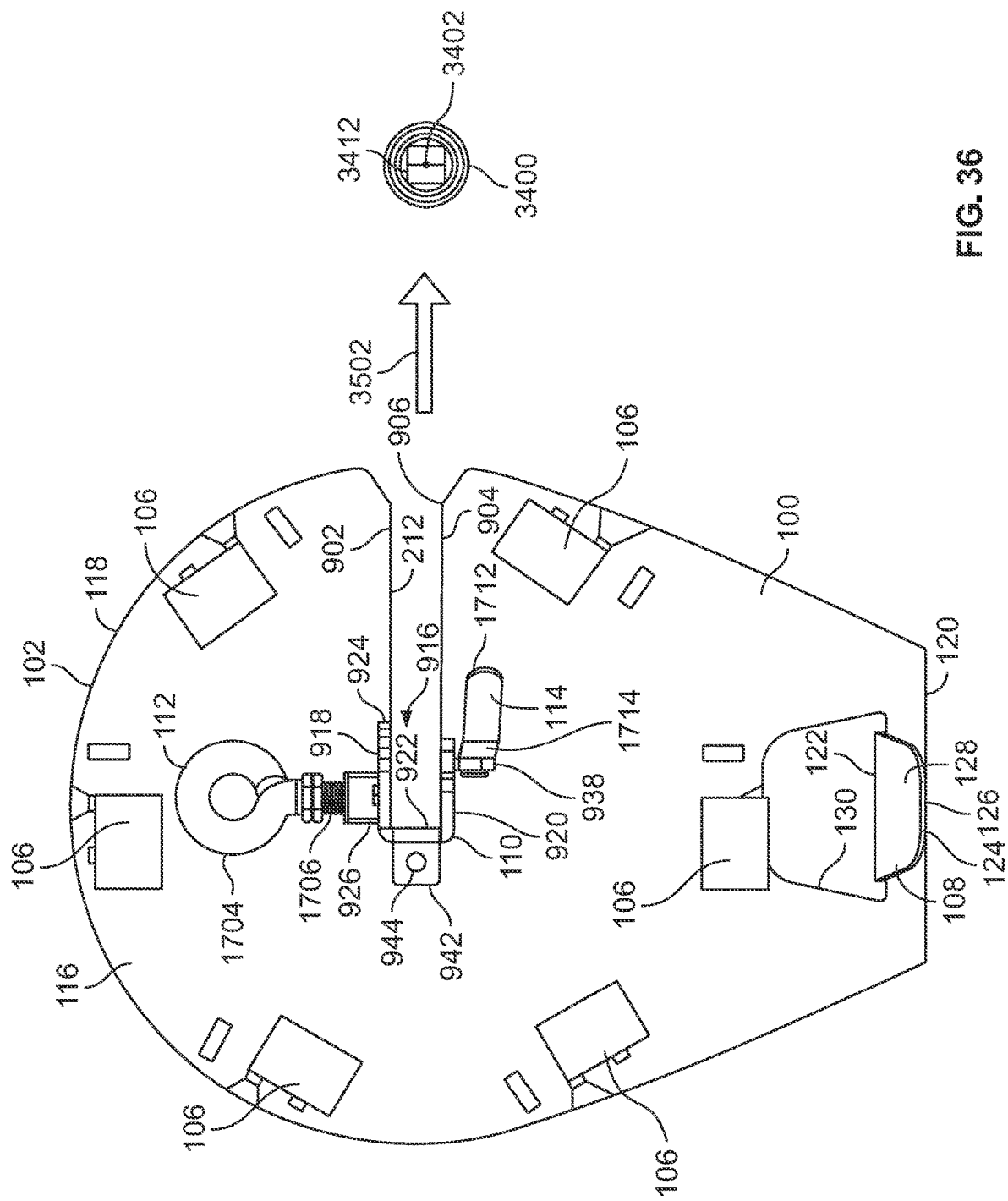
FIG. 36 is a right side view of the rotisserie skewer rack of FIGS. 1-8 and 35 positioned for transverse loading onto the rotisserie spit of FIGS. 34 and 35.
Figure 37:
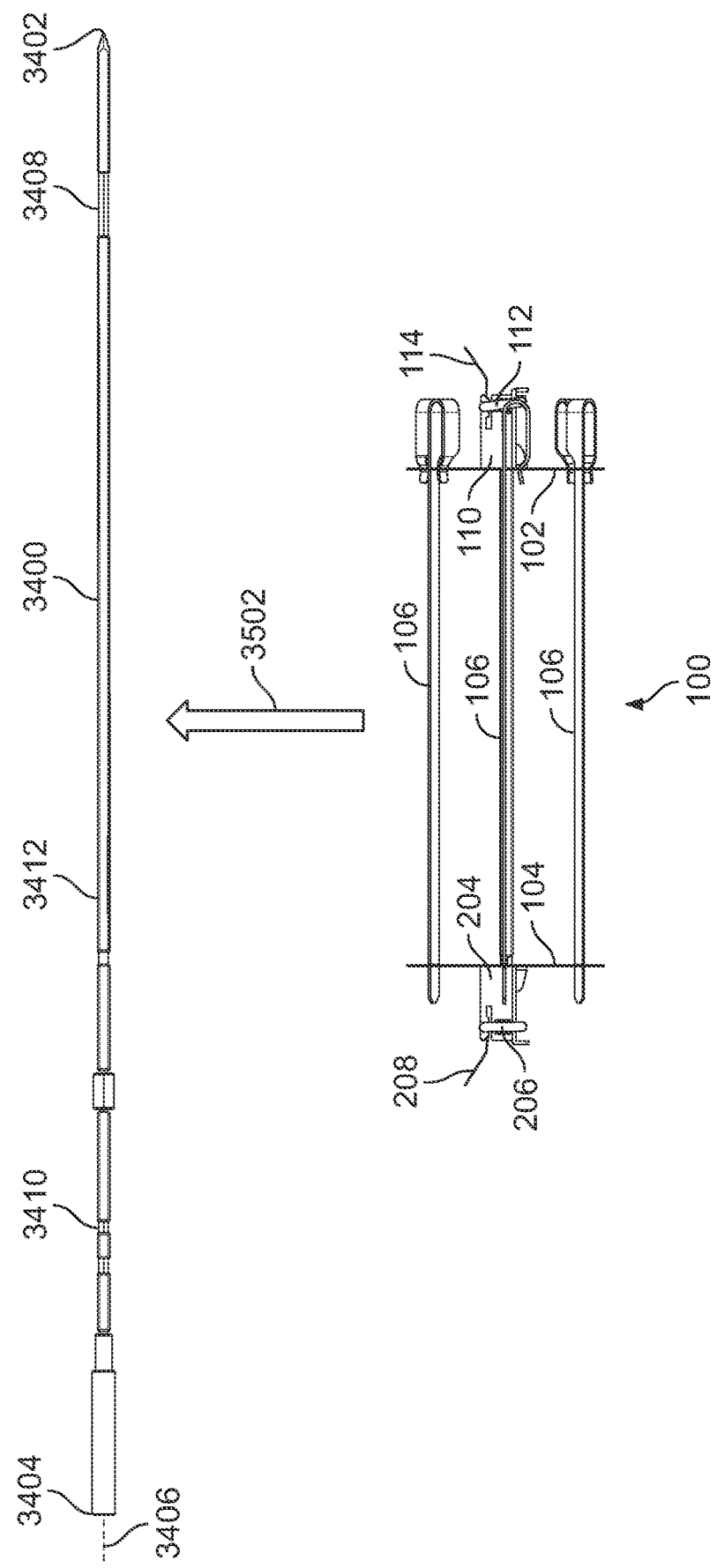
FIG. 37 is a top view of the rotisserie skewer rack of FIGS. 1-8, 35 and 36 positioned for transverse loading onto the rotisserie spit of FIGS. 34-36.

FIG. 35 is a perspective view of the rotisserie skewer rack 100 of FIGS. 1-8 positioned for transverse loading onto the rotisserie spit 3400 of FIG. 34. FIG. 36 is a right side view of the rotisserie skewer rack 100 of FIGS. 1-8 and 35 positioned for transverse loading onto the rotisserie spit 3400 of FIGS. 34 and 35. FIG. 37 is a top view of the rotisserie skewer rack 100 of FIGS. 1-8, 35 and 36 positioned for transverse loading onto the rotisserie spit 3400 of FIGS. 34-36. In the illustrated example of FIGS. 35-37, the rotisserie skewer rack 100 is located forward of the rotisserie spit 3400, with the rear opening 906 of the plate channel 212 of the first support plate 102, the rear opening 924 of the mounting channel 916 of the first mounting bracket 110, the rear opening 2106 of the plate channel 220 of the second support plate 104, and the rear opening 2124 of the mounting channel 2116 of the second mounting bracket 204 being respectively oriented toward the rotisserie spit 3400. The plate channel 212 of the first support plate 102, the mounting channel 916 of the first mounting bracket 110, the plate channel 220 of the second support plate 104, and the mounting channel 2116 of the second mounting bracket 204 are laterally (e.g., axially) aligned with one another to advantageously enable concurrent transverse loading of the first support plate 102, the first mounting bracket 110, the second support plate 104, and the second mounting bracket 204 of the rotisserie skewer rack 100 onto the rotisserie spit 3400.

As further shown in FIGS. 35-37, the first fastener 112 of the first support plate 102 is positioned in an unlocked position (e.g., the unlocked position 1900 of FIGS. 19 and 20) and the first clip 114 of the first support plate 102 is positioned in an open position (e.g., the open position 1902 of FIGS. 19 and 20) such that the first fastener 112 and the first clip 114 are not blocking any portion of the mounting channel 916 of the first mounting bracket 110 of the first support plate 102 in preparation of the first mounting bracket 110 being transversely loaded onto the rotisserie spit 3400. Similarly, the second fastener 206 of the second support plate 104 is positioned in an unlocked position (e.g., the unlocked position 3100 of FIGS. 31 and 32) and the second clip 208 of the second support plate 104 is positioned in an open position (e.g., the open position 3102 of FIGS. 31 and 32) such that the second fastener 206 and the second clip 208 are not blocking any portion of the mounting channel 2116 of the second mounting bracket 204 of the second support plate 104 in preparation of the second mounting bracket 204 being transversely loaded onto the rotisserie spit 3400. With the first fastener 112 and the first clip 114 of the first support plate 102 and the second fastener 206 and the second clip 208 of the second support plate 104 being respectively positioned in the aforementioned manner, the first support plate 102, the first mounting bracket 110, the second support plate 104, the second mounting bracket 204, and/or, more generally, the rotisserie skewer rack 100 can be transversely loaded onto the rotisserie spit 3400 by moving the first support plate 102, the first mounting bracket 110, the second support plate 104, the second mounting bracket 204, and/or, more generally, the rotisserie skewer rack 100 away from the position shown in FIGS. 35-37 in and/or along an example transverse direction 3502 (e.g., a rearward direction) that is generally orthogonal relative to the longitudinal axis 3406 of the rotisserie spit 3400. The transverse loading of the first support plate 102, the first mounting bracket 110, the second support plate 104, the second mounting bracket 204, and/or, more generally, the rotisserie skewer rack 100 onto the rotisserie spit 3400 can advantageously be carried out and/or completed while the skewers 106 of the rotisserie skewer rack 100 remain coupled to the first support plate 102 and the second support plate 104 of the rotisserie skewer rack 100.

Figure 38:
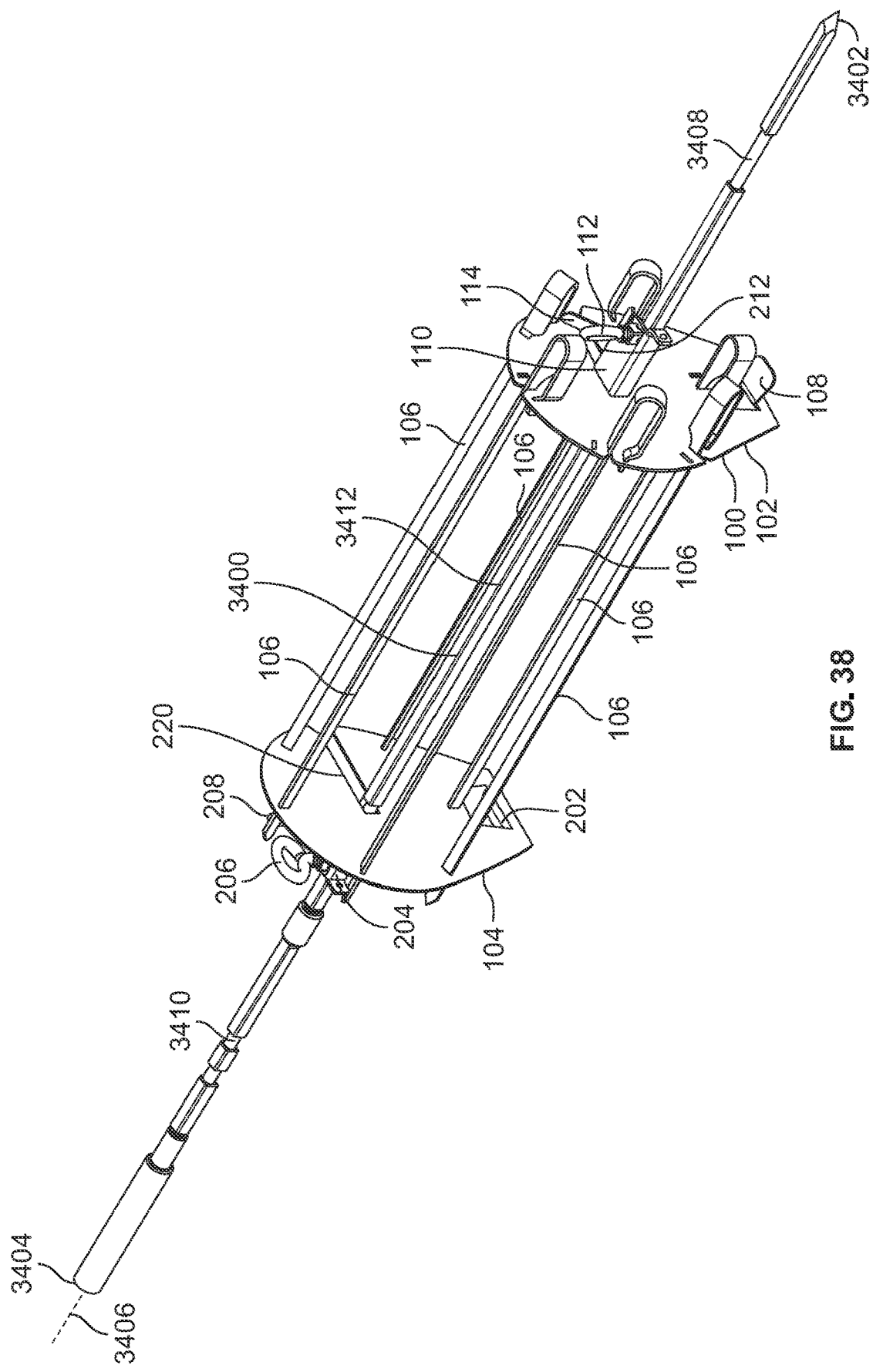
FIG. 38 is a perspective view of the rotisserie skewer rack of FIGS. 1-8 and 35-37 transversely loaded onto the rotisserie spit of FIGS. 34-37.
Figure 39:
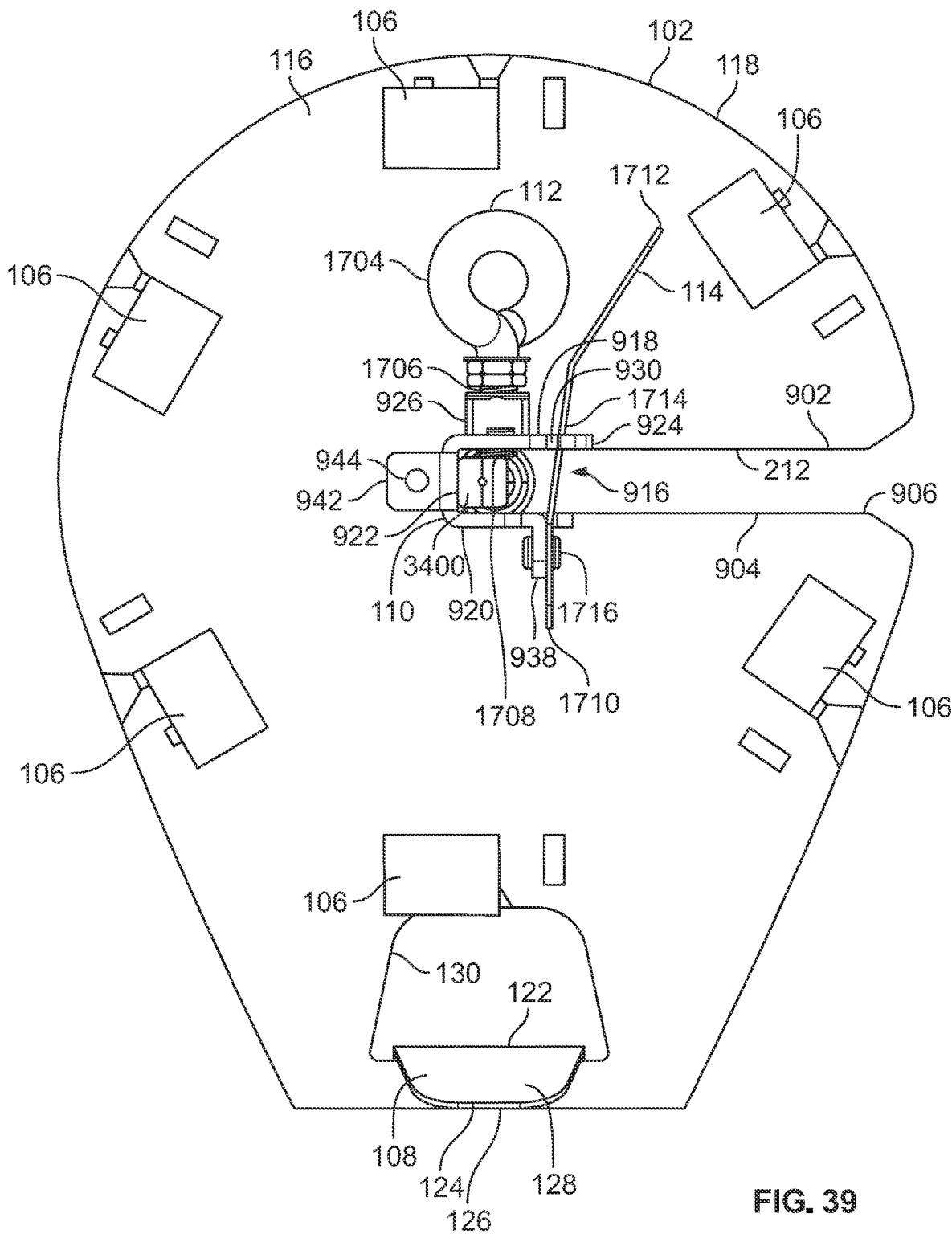
FIG. 39 is a right side view of the rotisserie skewer rack of FIGS. 1-8 and 35-38 transversely loaded onto the rotisserie spit of FIGS. 34-38.
Figure 40:
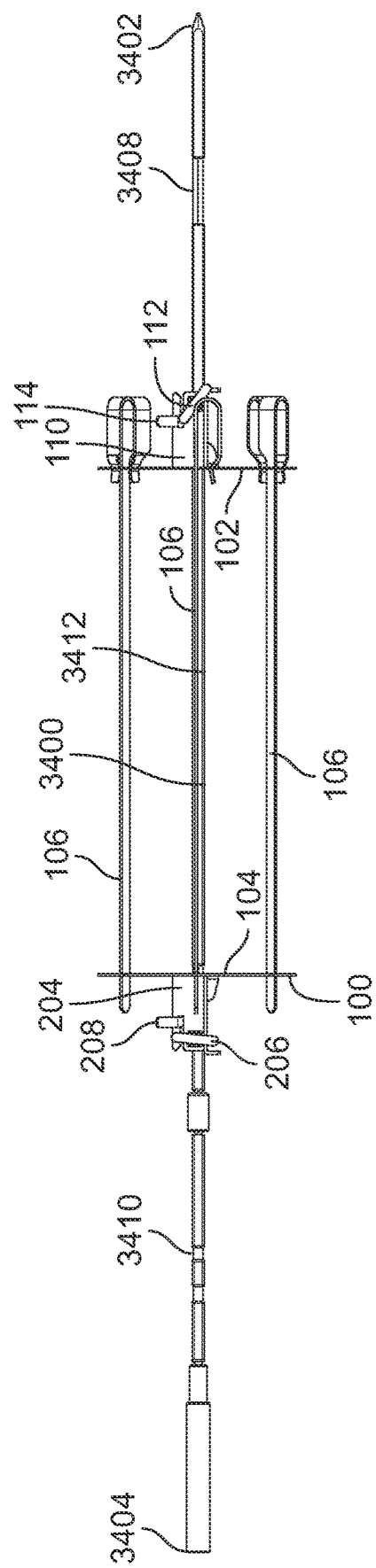
FIG. 40 is a top view of the rotisserie skewer rack of FIGS. 1-8 and 35-39 transversely loaded onto the rotisserie spit of FIGS. 34-39.

FIG. 38 is a perspective view of the rotisserie skewer rack 100 of FIGS. 1-8 and 35-37 transversely loaded onto the rotisserie spit 3400 of FIGS. 34-37. FIG. 39 is a right side view of the rotisserie skewer rack 100 of FIGS. 1-8 and 35-38 transversely loaded onto the rotisserie spit 3400 of FIGS. 34-38. FIG. 40 is a top view of the rotisserie skewer rack 100 of FIGS. 1-8 and 35-39 transversely loaded onto the rotisserie spit 3400 of FIGS. 34-39. In the illustrated example of FIGS. 38-40, the first support plate 102, the first mounting bracket 110, the second support plate 104, the second mounting bracket 204, and/or, more generally, the rotisserie skewer rack 100 has/have been transversely loaded onto the rotisserie spit 3400 by moving the first support plate 102, the first mounting bracket 110, the second support plate 104, the second mounting bracket 204, and/or, more generally, the rotisserie skewer rack 100 away from the position shown in FIGS. 35-37 and onto the rotisserie spit 3400 in and/or along the transverse direction 3502 shown in FIGS. 35-37. Transversely loading the first support plate 102, the first mounting bracket 110, the second support plate 104, the second mounting bracket 204, and/or, more generally, the rotisserie skewer rack 100 onto the rotisserie spit 3400 as shown in FIGS. 38-40 results in the rotisserie spit 3400 (e.g., the third axial segment 3412 of the rotisserie spit 3400) being located within and extending laterally (e.g., axially) through the plate channel 212 of the first support plate 102, the mounting channel 916 of the first mounting bracket 110, the plate channel 220 of the second support plate 104, and the mounting channel 2116 of the second mounting bracket 204 of the rotisserie skewer rack 100.

In the illustrated example of FIGS. 38-40, the first fastener 112 has been moved from the unlocked position 1900 (e.g., as shown in FIGS. 19, 20, and 35-37) into the locked position 1700 (e.g., as shown in FIGS. 17 and 18), the first clip 114 has been moved from the open position 1902 (e.g., as shown in FIGS. 19, 20, and 35-37) into the closed position 1702 (e.g., as shown in FIGS. 17 and 18), the second fastener 206 has been moved from unlocked position 3100 (e.g., as shown in FIGS. 31, 32, and 35-37) into the locked position 2900 (e.g., as shown in FIGS. 29 and 30), and the second clip 208 has been moved from open position 3102 (e.g., as shown in FIGS. 31, 32, and 35-37) into the closed position 2902 (e.g., as shown in FIGS. 29 and 30). Positioning the first fastener 112 in the locked position 1700 securely couples the first mounting bracket 110 and/or, more generally, the first support plate 102 to the rotisserie spit 3400 (e.g., to the third axial segment 3412 of the rotisserie spit 3400) such that the first mounting bracket 110 and/or, more generally, the first support plate 102 rotate(s) along with the rotation (e.g., the motor-driven rotation) of the rotisserie spit 3400. Positioning the first clip 114 in the closed position 1702 provides a mechanical failsafe that prevents the first mounting bracket 110 and/or, more generally, the first support plate 102 from inadvertently being transversely removed from the rotisserie spit 3400. Positioning the second fastener 206 in the locked position 2900 securely couples the second mounting bracket 204 and/or, more generally, the second support plate 104 to the rotisserie spit 3400 (e.g., to the third axial segment 3412 of the rotisserie spit 3400) such that the second mounting bracket 204 and/or, more generally, the second support plate 104 rotate(s) along with the rotation (e.g., the motor-driven rotation) of the rotisserie spit 3400. Positioning the second clip 208 in the closed position 2902 provides a mechanical failsafe that prevents the second mounting bracket 204 and/or, more generally, the second support plate 104 from inadvertently being transversely removed from the rotisserie spit 3400.

Figure 41:
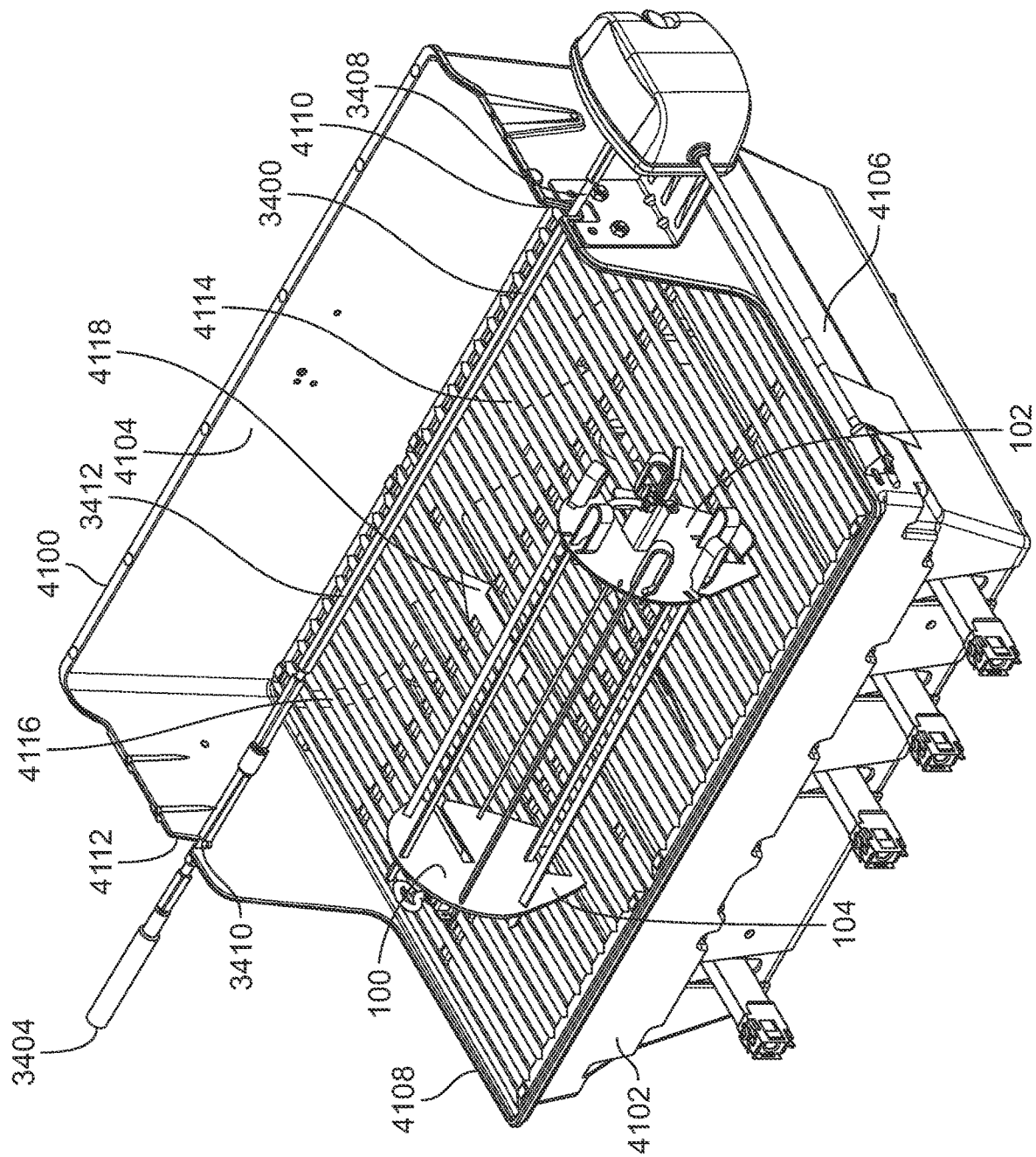
FIG. 41 is a perspective view of a cookbox of a grill, showing the rotisserie skewer rack of FIGS. 1-8 and 35-40 positioned for transverse loading onto the rotisserie spit of FIGS. 34-40.

FIG. 41 is a perspective view of an example cookbox 4100 of a grill, showing the rotisserie skewer rack 100 of FIGS. 1-8 and 35-40 positioned for transverse loading onto the rotisserie spit 3400 of FIGS. 34-40. The cookbox 4100 of FIG. 41 includes an example front wall 4102, an example rear wall 4104 located opposite the front wall 4102, an example right sidewall 4106 extending between the front wall 4102 and the rear wall 4104, and an example left sidewall 4108 located opposite the right sidewall 4106 and extending between the front wall 4102 and the rear wall 4104. The right sidewall 4106 of the cookbox 4100 includes an example first notched portion 4110 configured to support the first axial segment 3408 of the rotisserie spit 3400. The left sidewall 4108 of the cookbox 4100 includes an example second notched portion 4112 that is laterally (e.g., axially) aligned with the first notched portion 4110 of the right sidewall 4106 of the cookbox 4100 and configured to support the second axial segment 3410 of the rotisserie spit 3400. The rotisserie spit 3400 is accordingly configured to extend laterally (e.g., axially) from the right sidewall 4106 of the cookbox 4100 to the left sidewall 4108 of the cookbox 4100, with the third axial segment 3412 of the rotisserie spit 3400 being located between the right sidewall 4106 of the cookbox 4100 and the left sidewall 4108 of the cookbox 4100.

In the illustrated example of FIG. 41, the cookbox 4100 carries, supports, contains, houses, and/or otherwise includes one or more burner tube(s) configured to generate and/or emit heat-producing gas flames. As shown in FIG. 41, the cookbox 4100 is configured to include four burner tubes. In other examples, the cookbox 4100 can instead include a different number (e.g., 2, 3, 5, etc.) of burner tubes. Furthermore, although FIG. 41 illustrates burner tubes of a cookbox of a gas grill, in other examples the cookbox 4100 can instead be configured to include a burn pot of a pellet grill, an electric heating element of an electric grill, a charcoal rack or bin of a charcoal grill, etc. It should accordingly be understood that the cookbox 4100 shown in FIG. 41 represents one particular cookbox configuration and/or grill type from among many cookbox configurations and/or grill types with which the rotisserie skewer rack 100 disclosed herein can be used.

The cookbox 4100 of FIG. 41 also carries, supports, contains, houses, and/or otherwise includes one or more grease deflection bar(s) configured to have an inverted V-shaped profile. As one or more food item(s) is/are cooked within the cookbox 4100, grease produced by the cooking food item(s) falls downward onto the grease deflection bar(s). The inverted V-shaped profile of each grease deflection bar directs such grease to a further downward location within the cookbox 4100, while in some instances also shielding an underlying one of the aforementioned burner tubes of the cookbox 4100 from being exposed to such grease. The cookbox 4100 of FIG. 41 also carries, supports, contains, houses, and/or otherwise includes one or more cooking grate(s) configured to form and/or define a substantially flat, planar cooking surface for cooking one or more food item(s) placed thereon. For example, as shown in FIG. 41, the cookbox 4100 carries, supports, contains, houses, and/or otherwise includes an example first cooking grate 4114 and an example second cooking grate 4116, with the second cooking grate 4116 being positioned in a side-by-side arrangement relative to the first cooking grate 4114.

In the illustrated example of FIG. 41, the rotisserie spit 3400 and the rotisserie skewer rack 100 are respectively positioned on and/or within the cookbox 4100 above and/or over the first cooking grate 4114 and the second cooking grate 4116. The first cooking grate 4114 and the second cooking grate 4116 are respectively positioned within the cookbox 4100 above and/or over the grease deflection bar(s). The grease deflection bar(s) is/are positioned within the cookbox 4100 above and/or over the burner tube(s). In other examples, the first cooking grate 4114 and/or the second cooking grate 4116 can be removed from the cookbox 4100 to provide additional clearance for the rotisserie spit 3400 and/or the rotisserie skewer rack 100 within the cookbox 4100.

In the illustrated example of FIG. 41, the rotisserie skewer rack 100 is located forward of the rotisserie spit 3400, with the rear opening 906 of the plate channel 212 of the first support plate 102, the rear opening 924 of the mounting channel 916 of the first mounting bracket 110, the rear opening 2106 of the plate channel 220 of the second support plate 104, and the rear opening 2124 of the mounting channel 2116 of the second mounting bracket 204 being respectively oriented toward the rotisserie spit 3400. The plate channel 212 of the first support plate 102, the mounting channel 916 of the first mounting bracket 110, the plate channel 220 of the second support plate 104, and the mounting channel 2116 of the second mounting bracket 204 are laterally (e.g., axially) aligned with one another to advantageously enable concurrent transverse loading of the first support plate 102, the first mounting bracket 110, the second support plate 104, and the second mounting bracket 204 of the rotisserie skewer rack 100 onto the rotisserie spit 3400.

In the illustrated example of FIG. 41, the first fastener 112 of the first support plate 102 is positioned in an unlocked position (e.g., the unlocked position 1900 of FIGS. 19 and 20) and the first clip 114 of the first support plate 102 is positioned in an open position (e.g., the open position 1902 of FIGS. 19 and 20) such that the first fastener 112 and the first clip 114 are not blocking any portion of the mounting channel 916 of the first mounting bracket 110 of the first support plate 102 in preparation of the first mounting bracket 110 and/or, more generally, the first support plate 102 being transversely loaded onto the rotisserie spit 3400. Similarly, the second fastener 206 of the second support plate 104 is positioned in an unlocked position (e.g., the unlocked position 3100 of FIGS. 31 and 32) and the second clip 208 of the second support plate 104 is positioned in an open position (e.g., the open position 3102 of FIGS. 31 and 32) such that the second fastener 206 and the second clip 208 are not blocking any portion of the mounting channel 2116 of the second mounting bracket 204 of the second support plate 104 in preparation of the second mounting bracket 204 and/or, more generally, the second support plate 104 being transversely loaded onto the rotisserie spit 3400. With the first fastener 112 and the first clip 114 of the first support plate 102 and the second fastener 206 and the second clip 208 of the second support plate 104 being respectively positioned in the aforementioned manner, the first support plate 102, the first mounting bracket 110, the second support plate 104, the second mounting bracket 204, and/or, more generally, the rotisserie skewer rack 100 can be transversely loaded onto the rotisserie spit 3400 by moving the first support plate 102, the first mounting bracket 110, the second support plate 104, the second mounting bracket 204, and/or, more generally, the rotisserie skewer rack 100 in and/or along an example transverse direction 4118 (e.g., away from the front wall 4102 of the cookbox 4100 and toward the rear wall 4104 of the cookbox 4100) that is generally orthogonal relative to the longitudinal axis 3406 of the rotisserie spit 3400.

The transverse loading of the first support plate 102, the first mounting bracket 110, the second support plate 104, the second mounting bracket 204, and/or, more generally, the rotisserie skewer rack 100 onto the rotisserie spit 3400 can advantageously be carried out and/or completed while the skewers 106 of the rotisserie skewer rack 100 remain coupled to the first support plate 102 and the second support plate 104 of the rotisserie skewer rack 100. The transverse loading of the first support plate 102, the first mounting bracket 110, the second support plate 104, the second mounting bracket 204, and/or, more generally, the rotisserie skewer rack 100 onto the rotisserie spit 3400 can also advantageously be carried out and/or completed while the rotisserie spit 3400 remains positioned on the cookbox 4100 (e.g., while the first axial segment 3408 of the rotisserie spit 3400 remains positioned within the first notched portion 4110 of the right sidewall 4106 of the cookbox 4100, and while the second axial segment 3410 of the rotisserie spit 3400 remains positioned within the second notched portion 4112 of the left sidewall 4108 of the cookbox 4100).

Figure 42:
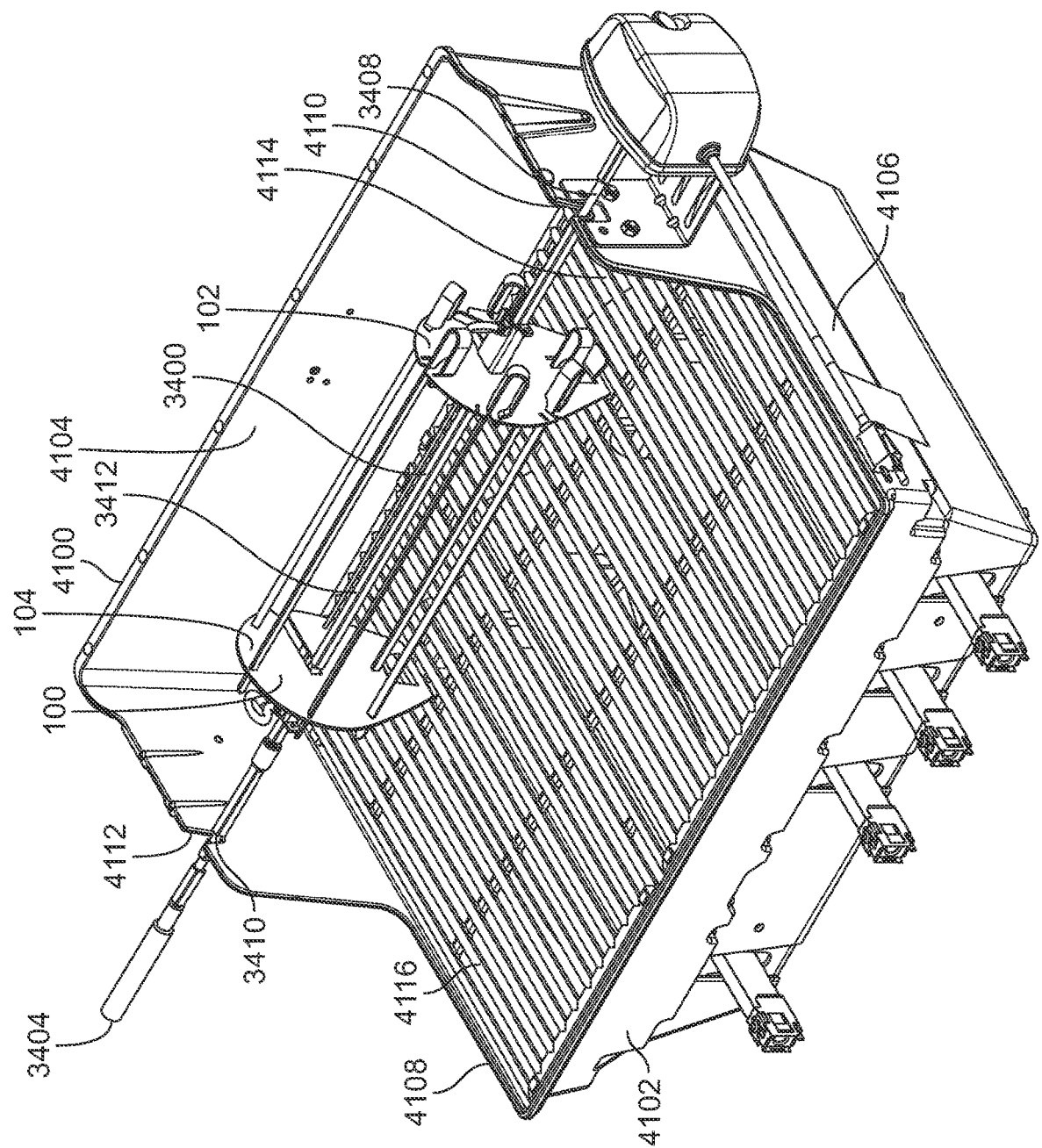
FIG. 42 is a perspective view of the cookbox of the grill of FIG. 41, showing the rotisserie skewer rack of FIGS. 1-8 and 35-41 transversely loaded onto the rotisserie spit of FIGS. 34-41.

FIG. 42 is a perspective view of the cookbox 4100 of the grill of FIG. 41, showing the rotisserie skewer rack 100 of FIGS. 1-8 and 35-41 transversely loaded onto the rotisserie spit 3400 of FIGS. 34-41. In the illustrated example of FIG. 42, the first support plate 102, the first mounting bracket 110, the second support plate 104, the second mounting bracket 204, and/or, more generally, the rotisserie skewer rack 100 has/have been transversely loaded onto the rotisserie spit 3400 by moving the first support plate 102, the first mounting bracket 110, the second support plate 104, the second mounting bracket 204, and/or, more generally, the rotisserie skewer rack 100 away from the position shown in FIG. 41 and onto the rotisserie spit 3400 in and/or along the transverse direction 4118 shown in FIG. 41. Transversely loading the first support plate 102, the first mounting bracket 110, the second support plate 104, the second mounting bracket 204, and/or, more generally, the rotisserie skewer rack 100 onto the rotisserie spit 3400 as shown in FIG. 42 results in the rotisserie spit 3400 (e.g., the third axial segment 3412 of the rotisserie spit 3400) being located within and extending laterally (e.g., axially) through the plate channel 212 of the first support plate 102, the mounting channel 916 of the first mounting bracket 110, the plate channel 220 of the second support plate 104, and the mounting channel 2116 of the second mounting bracket 204 of the rotisserie skewer rack 100.

In the illustrated example of FIG. 42, the first fastener 112 has been moved from the unlocked position 1900 (e.g., as shown in FIGS. 19, 20, 35-37, and 41) into the locked position 1700 (e.g., as shown in FIGS. 17, 18, and 38-40), the first clip 114 has been moved from the open position 1902 (e.g., as shown in FIGS. 19, 20, 35-37, and 41) into the closed position 1702 (e.g., as shown in FIGS. 17, 18, and 38-40), the second fastener 206 has been moved from unlocked position 3100 (e.g., as shown in FIGS. 31, 32, 35-37, and 41) into the locked position 2900 (e.g., as shown in FIGS. 29, 30, and 38-40), and the second clip 208 has been moved from open position 3102 (e.g., as shown in FIGS. 31, 32, 35-37, and 41) into the closed position 2902 (e.g., as shown in FIGS. 29, 30, and 38-40). Positioning the first fastener 112 in the locked position 1700 securely couples the first mounting bracket 110 and/or, more generally, the first support plate 102 to the rotisserie spit 3400 (e.g., to the third axial segment 3412 of the rotisserie spit 3400) such that the first mounting bracket 110 and/or, more generally, the first support plate 102 rotate(s) along with the rotation (e.g., the motor-driven rotation) of the rotisserie spit 3400. Positioning the first clip 114 in the closed position 1702 provides a mechanical failsafe that prevents the first mounting bracket 110 and/or, more generally, the first support plate 102 from inadvertently being transversely removed from the rotisserie spit 3400. Positioning the second fastener 206 in the locked position 2900 securely couples the second mounting bracket 204 and/or, more generally, the second support plate 104 to the rotisserie spit 3400 (e.g., to the third axial segment 3412 of the rotisserie spit 3400) such that the second mounting bracket 204 and/or, more generally, the second support plate 104 rotate(s) along with the rotation (e.g., the motor-driven rotation) of the rotisserie spit 3400. Positioning the second clip 208 in the closed position 2902 provides a mechanical failsafe that prevents the second mounting bracket 204 and/or, more generally, the second support plate 104 from inadvertently being transversely removed from the rotisserie spit 3400.

Example transversely-loadable rotisserie skewer racks are disclosed. In some disclosed examples, a rotisserie skewer rack comprises a first support plate and a second support plate spaced apart from the first support plate. In some disclosed examples, the rotisserie skewer rack further comprises a plurality of skewers extending between the first support plate and the second support plate. In some disclosed examples, the rotisserie skewer rack further comprises a first mounting bracket coupled to the first support plate and a second mounting bracket coupled to the second support plate. In some disclosed examples, the first mounting bracket and the second mounting bracket are respectively configured to be transversely loadable onto a rotisserie spit.

In some disclosed examples, the first support plate is coupled to the second support plate via respective ones of the skewers.

In some disclosed examples, the first mounting bracket and the second mounting bracket are respectively configured to be transversely loadable onto the rotisserie spit while the first support plate is coupled to the second support plate via the respective ones of the skewers.

In some disclosed examples, the first support plate is coupled to the second support plate by no structure other than the respective ones of the skewers.

In some disclosed examples, the first support plate includes a plate channel having an upper surface, a lower surface, a front surface, and a rear opening. In some disclosed examples, the plate channel of the first support plate is configured to transversely receive the rotisserie spit via the rear opening of the plate channel of the first support plate.

In some disclosed examples, the first mounting bracket includes a mounting channel having an upper wall, a lower wall, a front wall, and a rear opening. In some disclosed examples, the mounting channel of the first mounting bracket is configured to transversely receive the rotisserie spit via the rear opening of the mounting channel of the first mounting bracket.

In some disclosed examples, the mounting channel of the first mounting bracket is laterally aligned with the plate channel of the first support plate.

In some disclosed examples, the second support plate includes a plate channel having an upper surface, a lower surface, a front surface, and a rear opening. In some disclosed examples, the plate channel of the second support plate is configured to transversely receive the rotisserie spit via the rear opening of the plate channel of the second support plate.

In some disclosed examples, the second mounting bracket includes a mounting channel having an upper wall, a lower wall, a front wall, and a rear opening. In some disclosed examples, the mounting channel of the second mounting bracket is configured to transversely receive the rotisserie spit via the rear opening of the mounting channel of the second mounting bracket.

In some disclosed examples, the mounting channel of the second mounting bracket is laterally aligned with the plate channel of the second support plate.

In some disclosed examples, the mounting channel of the second mounting bracket is laterally aligned with the mounting channel of the first mounting bracket, and the plate channel of the second support plate is laterally aligned with the plate channel of the first support plate.

In some disclosed examples, the plate channel of the first support plate, the mounting channel of the first mounting bracket, the plate channel of the second support plate, and the mounting channel of the second mounting bracket are respectively configured to transversely receive an axial segment of the rotisserie spit. In some disclosed examples, the axial segment has a rectangular cross-sectional profile.

In some disclosed examples, the rotisserie skewer rack further comprises a first fastener configured to be threadedly coupled to the first mounting bracket. In some disclosed examples, the rotisserie skewer rack forth comprises a second fastener configured to the threadedly coupled to the second mounting bracket.

In some disclosed examples, the first fastener is tethered to the first mounting bracket via a first cable extending between the first fastener and the first mounting bracket, and the second fastener is tethered to the second mounting bracket via a second cable extending between the second fastener and the second mounting bracket.

In some disclosed examples, the first fastener is movable relative to the first mounting bracket between a locked position that partially obstructs a forward portion of the mounting channel of the first mounting bracket and an unlocked position that does not obstruct the forward portion of the mounting channel of the first mounting bracket. In some disclosed examples, the second fastener is movable relative to the second mounting bracket between a locked position that partially obstructs a forward portion of the mounting channel of the second mounting bracket and an unlocked position that does not obstruct the forward portion of the mounting channel of the second mounting bracket.

In some disclosed examples, the rotisserie skewer rack further comprises a first clip pivotably coupled to the first mounting bracket, the first clip including an engagement portion configured to be selectively positioned within a slot of the first mounting bracket. In some disclosed examples, the rotisserie skewer rack further comprises a second clip pivotably coupled to the second mounting bracket, the second clip including an engagement portion configured to be selectively positioned within a slot of the second mounting bracket.

In some disclosed examples, the first clip is movable relative to the first mounting bracket between a closed position that obstructs a rearward portion of the mounting channel of the first mounting bracket and an open position that does not obstruct the rearward portion of the mounting channel of the first mounting bracket. In some disclosed examples, the second clip is movable relative to the second mounting bracket between a closed position that obstructs a rearward portion of the mounting channel of the second mounting bracket and an open position that does not obstruct the rearward portion of the mounting channel of the second mounting bracket.

In some disclosed examples, the first support plate includes a peripheral edge having a flat portion.

In some disclosed examples, the rotisserie support rack further comprises a stabilization foot coupled to the first support plate. In some disclosed examples, the stabilization foot includes a flat portion spaced apart from and laterally aligned with the flat portion of the peripheral edge of the first support plate.

In some disclosed examples, the stabilization foot is formed by a cutout of the first support plate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A rotisserie skewer rack, comprising:
    a right support plate including a right side and a left side, the right support plate further including a plate channel having an upper surface, a lower surface, a front surface, and a rear opening, the plate channel of the right support plate configured to transversely receive a rotisserie spit via the rear opening of the plate channel of the first support plate;
    a left support plate spaced apart from the right support plate, the left support plate including a left side and a right side, the left support plate further including a plate channel having an upper surface, a lower surface, a front surface, and a rear opening, the plate channel of the left support plate configured to transversely receive the rotisserie spit via the rear opening of the plate channel of the left support plate;
    a plurality of skewers extending between the right support plate and the left support plate;
    a first mounting bracket coupled to the right support plate, the first mounting bracket oriented orthogonally relative to and extending laterally away from the right side of the right support plate, the first mounting bracket including a mounting channel having an upper wall, a lower wall, a front wall, and a rear opening, the mounting channel of the first mounting bracket configured to transversely receive the rotisserie spit via the rear opening of the mounting channel of the first mounting bracket;

a second mounting bracket coupled left support plate, the second mounting bracket oriented orthogonally relative to and extending laterally away from the left side of the left support plate, the second mounting bracket including a mounting channel having an upper wall, a lower wall, a front wall, and a rear opening, the mounting channel of the second mounting bracket configured to transversely receive the rotisserie spit via the rear opening of the mounting channel of the second mounting bracket, wherein the right support plate, the left support plate, the first mounting bracket, and the second mounting bracket are respectively configured to be transversely loaded onto the rotisserie spit;

a first fastener configured to be threadedly coupled to the first mounting bracket, the first fastener movable relative to the first mounting bracket between a locked position that partially obstructs a forward position of the mounting channel of the first mounting bracket and an unlocked position that does not obstruct the forward portion of the mounting channel of the first mounting bracket;

a second fastener configured to the threadedly coupled to the second mounting bracket, the second fastener movable relative to the second mounting bracket between a locked position that partially obstructs a forward portion of the mounting channel of the second mounting bracket and an unlocked position that does not obstruct the forward portion of the mounting channel of the second mounting bracket;

a first clip pivotably coupled to the first mounting bracket, the first clip including an engagement portion configured to be selectively positioned within a first slot formed in the upper wall of the mounting channel of the first mounting bracket, the first clip rotatable relative to the first mounting bracket between a closed position in which the engagement portion of the first clip is positioned within the first slot and in which the first clip obstructs a rearward portion of the mounting channel of the first mounting bracket, and an open position in which the engagement portion of the first clip in not positioned within the first slot and in which the first clip does not obstruct the rearward portion of the mounting channel of the first mounting bracket; and a second clip pivotably coupled to the second mounting bracket, the second clip including an engagement portion configured to be selectively positioned within a second slot formed in the upper wall of the mounting channel of the second mounting bracket, the second clip rotatable relative to the second mounting bracket between a closed position in which the engagement portion of the second clip is positioned within the second slot and in which the second clip obstructs a rearward portion of the mounting channel of the second mounting bracket, and an open position in which the engagement portion of the second clip in not positioned within the second slot and in which the second clip does not obstruct the rearward portion of the mounting channel of the second mounting bracket.

2. The rotisserie skewer rack of claim 1, wherein the right support plate is coupled to the left support plate via respective ones of the skewers.

3. The rotisserie skewer rack of claim 2, wherein the first mounting bracket and the second mounting bracket are respectively configured to be transversely loaded onto the rotisserie spit while the right support plate is coupled to the left support plate via the respective ones of the skewers.

4. The rotisserie skewer rack of claim 2, wherein the right support plate is coupled to the left support plate by no structure other than the respective ones of the skewers prior to the right support plate, the left support plate, the first mounting bracket, and the second mounting bracket being transversely loaded onto the rotisserie spit.

5. The rotisserie skewer rack of claim 1, wherein the mounting channel of the first mounting bracket is laterally aligned with the plate channel of the right support plate, and wherein the mounting channel of the second mounting bracket is laterally aligned with the plate channel of the left support plate.

6. The rotisserie skewer rack of claim 5, wherein the mounting channel of the second mounting bracket is laterally aligned with the mounting channel of the first mounting bracket, and the plate channel of the left support plate is laterally aligned with the plate channel of the right support plate.

7. The rotisserie skewer rack of claim 6, wherein the plate channel of the right support plate, the mounting channel of the first mounting bracket, the plate channel of the left support plate, and the mounting channel of the second mounting bracket are respectively configured to transversely receive an axial segment of the rotisserie spit, the axial segment having a rectangular cross-sectional profile.

8. The rotisserie skewer rack of claim 1, wherein the first fastener is tethered to the first mounting bracket via a first cable extending between the first fastener and the first mounting bracket, and the second fastener is tethered to the second mounting bracket via a second cable extending between the second fastener and the second mounting bracket.

9. The rotisserie skewer rack of claim 1, wherein the right support plate and the left support plate respectively include a peripheral edge having a flat portion located along a bottom of the peripheral edge.

10. The rotisserie skewer rack of claim 9, further comprising:

a first a stabilization foot coupled to the right support plate, the first stabilization foot extending at a downward angle laterally away from the right side of the right support plate, the first stabilization foot including a flat portion spaced apart from and located at a same vertical position as the flat portion of the peripheral edge of the right support plate; and a second stabilization foot coupled to the left support plate, the second stabilization foot extending at a downward angle laterally away from the left side of the left support plate, the second stabilization foot including a flat portion spaced apart from and located at a same vertical position as the flat portion of the peripheral edge of the left support plate.

11. The rotisserie skewer rack of claim 10, wherein the first stabilization foot is formed by a cutout of the right support plate and the second stabilization foot is formed by a cutout of the left support plate.

12. The rotisserie skewer rack of claim 1, wherein the first slot includes an expansion notch located at a closed end of the first slot, the engagement portion of the first clip being biased into the expansion notch of the first slot when the first clip is positioned within the first slot at the closed end of the first slot, and wherein the second slot includes an expansion notch located at a closed end of the second slot, the engagement portion of the second clip being biased into the expansion notch of the second slot when the second clip is positioned within the second slot at the closed end of the second slot.

13. A rotisserie skewer rack, comprising:
- a right support plate include a right side and a left side, the right support plate further including a plate channel having an up-per surface, a lower surface, a front surface, and a rear opening, the plate channel of the right support plate configured to transversely receive a rotisserie spit via the rear opening of the plate channel of the first support plate;
- a left support plate spaced apart from the right support plate, the left support plate including a left side and a right side, the left support plate further including a plate channel having an upper surface, a lower surface, a front surface, and a rear opening, the plate channel of the left support plate configured to transversely receive the rotisserie spit via the rear opening of the plate channel of the left support plate;
- a plurality of skewers extending between the right support plate and the left support plate;
- a first mounting bracket coupled to the right support plate, the first mounting bracket oriented orthogonally relative to and extending laterally away from the right support plate, the first mounting bracket including a mounting channel having an upper wall, a lower wall, a front wall, and a rear opening, the mounting channel of the first mounting bracket configured to transversely receive the rotisserie spit via the rear opening of the mounting channel of the first mounting bracket;
- a second mounting bracket integrally formed with the left support plate, the second mounting bracket oriented orthogonally relative to and extending laterally away from the left side of the left support plate, the second mounting bracket including a mounting channel having an upper wall, a lower wall, a front wall, and a rear opening, the mounting channel of the second mounting bracket configured to transversely receive the rotisserie spit via the rear opening of the mounting channel of the second mounting bracket, wherein the right support plate, the left support plate, the first mounting bracket, and the second mounting bracket are respectively configured to be transversely loaded onto the rotisserie spit;
- a first fastener configured to be threadedly coupled to the first mounting bracket, the first fastener movable relative to the first mounting bracket between a locked position that partially obstructs a forward position of the mounting channel of the first mounting bracket and an unlocked position that does not obstruct the forward portion of the mounting channel of the first mounting bracket;
- a second fastener configured to the threadedly coupled to the second mounting bracket, the second fastener movable relative to the second mounting bracket between a locked position that partially obstructs a forward portion of the mounting channel of the second mounting bracket and an unlocked position that does not obstruct the forward portion of the mounting channel of the second mounting bracket;
- a first clip pivotably coupled to the first mounting bracket, the first clip including an engagement portion configured to be selectively positioned within a first slot formed in the upper wall of the mounting channel of the first mounting bracket, the first clip rotatable relative to the first mounting bracket between a closed position in which the engagement portion of the first clip is positioned within the first slot and in which the first clip obstructs a rearward portion of the mounting channel of the first mounting bracket, and an open position in which the engagement portion of the first clip in not positioned within the first slot and in which the first clip does not obstruct the rearward portion of the mounting channel of the first mounting bracket; and
- a second clip pivotably coupled to the second mounting bracket, the second clip including an engagement portion configured to be selectively positioned within a second slot formed in the upper wall of the mounting channel of the second mounting bracket, the second clip rotatable relative to the second mounting bracket between a closed position in which the engagement portion of the second clip is positioned within the second slot and in which the second clip obstructs a rearward portion of the mounting channel of the second mounting bracket, and an open position in which the engagement portion of the second clip in not positioned within the second slot and in which the second clip does not obstruct the rearward portion of the mounting channel of the second mounting bracket.

14. The rotisserie skewer rack of claim 13, wherein the right support plate is coupled to the left support plate via respective ones of the skewers.

15. The rotisserie skewer rack of claim 14, wherein the first mounting bracket and the second mounting bracket are respectively configured to be transversely loaded onto the rotisserie spit while the right support plate is coupled to the left support plate via the respective ones of the skewers.

16. The rotisserie skewer rack of claim 14, wherein the right support plate is coupled to the left support plate by no structure other than the respective ones of the skewers prior to the right support plate, the left support plate, the first mounting bracket, and the second mounting bracket being transversely loaded onto the rotisserie spit.

17. The rotisserie skewer rack of claim 13, wherein the first slot includes an expansion notch located at a closed end of the first slot, the engagement portion of the first clip being biased into the expansion notch of the first slot when the first clip is positioned within the first slot at the closed end of the first slot, and wherein the second slot includes an expansion notch located at a closed end of the second slot, the engagement portion of the second clip being biased into the expansion notch of the second slot when the second clip is positioned within the second slot at the closed end of the second slot.

18. The rotisserie skewer rack of claim 13, wherein the right support plate and the left support plate respectively include a peripheral edge having a flat portion located along a bottom of the peripheral edge.

19. The rotisserie skewer rack of claim 18, further comprising:
- a first stabilization foot integrally formed with the right support plate, the first stabilization foot extending at a downward angle laterally away from the right side of the right support plate, the first stabilization foot including a flat portion spaced apart form and located at a same vertical position as the flat portion of the peripheral edge of the right support plate; and
- a second stabilization foot integrally formed with the left support plate, the second stabilization foot extending at a downward angle laterally away from the left side of the left support plate, the second stabilization foot including a flat portion spaced apart form and located at a same vertical position as the flat portion of the peripheral edge of the left support plate.

20. The rotisserie skewer rack of claim 19, wherein the first stabilization foot is formed by a cutout of the right support plate and the second stabilization foot is formed by a cutout of the left support plate.

* * * * *

UNITED STATES PATENT AND TRADEMARK OFFICE
CERTIFICATE OF CORRECTION

PATENT NO. : 12,433,446 B2  
APPLICATION NO. : 17/834718  
DATED : October 7, 2025  
INVENTOR(S) : Hyde et al.

Page 1 of 1

It is certified that error appears in the above-identified patent and that said Letters Patent is hereby corrected as shown below:

In the Claims

Column 33, Line 20 (Claim 1): replace "forward position" with --forward portion--.

Column 33, Line 25 (Claim 1): replace "to the threadedly" with --to be threadedly--.

Column 33, Line 43 (Claim 1): replace "in not" with --is not--.

Column 33, Line 58 (Claim 1): replace "in not" with --is not--.

Column 34, Line 42 (Claim 10): replace "a first a stabilization" with --a first stabilization--.

Column 35, Line 7 (Claim 13): replace "up-per" with --upper--.

Column 35, Line 22 (Claim 13): replace "coupled to" with --integrally formed with--.

Column 35, Lines 24-25 (Claim 13): replace "from the right support plate" with --from the right side of the right support plate--.

Column 35, Line 48 (Claim 13): replace "forward position" with --forward portion--.

Column 35, Line 53 (Claim 13): replace "to the threadedly" with --to be threadedly--.

Column 36, Line 4 (Claim 13): replace "in not" with --is not--.

Column 36, Line 19 (Claim 13): replace "in not" with --is not--.

Signed and Sealed this  
Eleventh Day of November, 2025

John A. Squires  
*Director of the United States Patent and Trademark Office*